United States Patent
Su et al.

(10) Patent No.: US 10,663,483 B2
(45) Date of Patent: May 26, 2020

(54) METHOD AND APPARATUS OF USING PEAK FORCE TAPPING MODE TO MEASURE PHYSICAL PROPERTIES OF A SAMPLE

(71) Applicant: Bruker Nano, Inc., Santa Barbara, CA (US)

(72) Inventors: Chanmin Su, Ventura, CA (US); Jian Shi, Ventura, CA (US); Yan Hu, Ventura, CA (US); Shuiqing Hu, Santa Barbara, CA (US); Ji Ma, Thousand Oaks, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 45 days.

(21) Appl. No.: 16/006,551

(22) Filed: Jun. 12, 2018

(65) Prior Publication Data
US 2019/0018040 A1    Jan. 17, 2019

Related U.S. Application Data

(60) Division of application No. 15/077,708, filed on Mar. 22, 2016, now Pat. No. 9,995,765, which is a division of application No. 14/178,076, filed on Feb. 11, 2014, now Pat. No. 9,291,640, which is a division of application No. 13/306,867, filed on Nov. 29, 2011, now Pat. No. 8,650,660, which is a continuation-in-part of application No. 12/618,641, filed on Nov. 13, 2009, now Pat. No. 8,739,309.

(60) Provisional application No. 61/114,399, filed on Nov. 13, 2008, provisional application No. 61/417,837, filed on Nov. 29, 2010.

(51) Int. Cl.
| G01Q 20/04 | (2010.01) |
| G01Q 10/06 | (2010.01) |
| G01Q 60/32 | (2010.01) |
| G01Q 20/00 | (2010.01) |

(52) U.S. Cl.
CPC .......... *G01Q 20/04* (2013.01); *G01Q 10/065* (2013.01); *G01Q 20/00* (2013.01); *G01Q 60/32* (2013.01)

(58) Field of Classification Search
None
See application file for complete search history.

(56) References Cited

U.S. PATENT DOCUMENTS 4,724,318 A * 2/1988 Bennig ............... G01Q 20/00
                                                         250/307
RE33,387 E * 10/1990 Binnig ............... B82Y 35/00
                                                         250/306

(Continued)

*Primary Examiner* — Andrew Smyth
(74) *Attorney, Agent, or Firm* — Boyle Fredrickson S.C.

(57) ABSTRACT

Methods and apparatuses are provided for automatically controlling and stabilizing aspects of a scanning probe microscope (SPM), such as an atomic force microscope (AFM), using Peak Force Tapping (PFT) Mode. In an embodiment, a controller automatically controls periodic motion of a probe relative to a sample in response to a substantially instantaneous force determined and automatically controls a gain in a feedback loop. A gain control circuit automatically tunes a gain based on separation distances between a probe and a sample to facilitate stability. Accordingly, instability onset is quickly and accurately determined during scanning, thereby eliminating the need of expert user tuning of gains during operation.

3 Claims, 32 Drawing Sheets

(56) References Cited

U.S. PATENT DOCUMENTS

| | | | | |
|---|---|---|---|---|
| 5,060,248 A * | 10/1991 | Dumoulin | G01Q 30/02 | 250/308 |
| 5,436,448 A * | 7/1995 | Hosaka | B82Y 10/00 | 250/307 |
| 5,538,898 A * | 7/1996 | Wickramasinghe | C12Q 1/6869 | 422/82.01 |
| 5,753,814 A * | 5/1998 | Han | B82Y 35/00 | 73/105 |
| 6,196,061 B1 * | 3/2001 | Adderton | B82Y 35/00 | 73/105 |
| 6,281,495 B1 * | 8/2001 | Kitamura | B82Y 35/00 | 250/307 |
| 6,519,221 B1 * | 2/2003 | Manalis | B82Y 10/00 | 369/126 |
| 6,690,008 B2 * | 2/2004 | Hantschel | G01Q 60/34 | 73/105 |
| 6,935,167 B1 * | 8/2005 | Sahin | B82Y 35/00 | 73/105 |
| 7,395,698 B2 * | 7/2008 | Degertekin | B82Y 35/00 | 33/561 |
| 7,441,447 B2 * | 10/2008 | Degertekin | B82Y 35/00 | 73/105 |
| 7,448,798 B1 * | 11/2008 | Wang | G01N 25/4833 | 374/163 |
| 7,461,543 B2 * | 12/2008 | Degertekin | G01Q 20/04 | 250/306 |
| 7,464,583 B1 * | 12/2008 | Kowalewski | G01Q 30/04 | 73/105 |
| 7,550,963 B1 * | 6/2009 | Xiang | G01Q 60/22 | 324/635 |
| 7,552,625 B2 * | 6/2009 | Degertekin | B82Y 35/00 | 73/105 |
| 7,555,940 B2 * | 7/2009 | Su | B82Y 35/00 | 73/105 |
| 7,584,653 B2 * | 9/2009 | Su | B82Y 35/00 | 73/105 |
| 7,617,719 B2 * | 11/2009 | Su | B82Y 35/00 | 73/105 |
| 7,637,149 B2 * | 12/2009 | Degertekin | G01Q 60/38 | 73/105 |
| 7,707,873 B2 * | 5/2010 | Degertekin | B82Y 35/00 | 73/105 |
| 8,220,318 B2 * | 7/2012 | Degertekin | G01N 29/2406 | 73/105 |
| 2002/0084410 A1 * | 7/2002 | Colbert | B82Y 10/00 | 250/306 |
| 2005/0266586 A1 * | 12/2005 | Linder | G03F 1/72 | 438/4 |
| 2006/0260388 A1 * | 11/2006 | Su | G01Q 60/34 | 73/105 |
| 2006/0283338 A1 * | 12/2006 | Degertekin | B82Y 35/00 | 99/486 |
| 2007/0012094 A1 * | 1/2007 | Degertekin | G01Q 20/02 | 73/105 |
| 2007/0082459 A1 * | 4/2007 | Faris | C12Q 1/6825 | 438/455 |
| 2007/0089496 A1 * | 4/2007 | Degertekin | B82Y 35/00 | 73/104 |
| 2007/0103697 A1 * | 5/2007 | Degertekin | G01Q 20/02 | 356/501 |
| 2007/0107502 A1 * | 5/2007 | Degertekin | G01Q 20/04 | 73/105 |
| 2007/0295064 A1 * | 12/2007 | Degertekin | B82Y 35/00 | 73/105 |
| 2008/0049223 A1 * | 2/2008 | Iyoki | B82Y 35/00 | 356/369 |
| 2008/0049236 A1 * | 2/2008 | Iyoki | B82Y 35/00 | 356/614 |
| 2008/0127722 A1 * | 6/2008 | Su | B82Y 35/00 | 73/105 |
| 2008/0257024 A1 * | 10/2008 | Watanabe | B82Y 35/00 | 73/105 |
| 2008/0277582 A1 * | 11/2008 | Shi | B82Y 35/00 | 250/309 |
| 2008/0295584 A1 * | 12/2008 | Cantrell | G01Q 60/32 | 73/105 |
| 2008/0307865 A1 * | 12/2008 | Degertekin | B82Y 35/00 | 73/105 |
| 2009/0032706 A1 * | 2/2009 | Prater | G01Q 10/04 | 250/307 |
| 2009/0261249 A1 * | 10/2009 | Kobayashi | G01Q 60/32 | 250/306 |
| 2010/0039919 A1 * | 2/2010 | Chou | G11B 9/02 | 369/126 |
| 2010/0042356 A1 * | 2/2010 | Kjoller | B82Y 35/00 | 702/136 |
| 2010/0045970 A1 * | 2/2010 | Raschke | G01J 3/02 | 356/51 |
| 2011/0170108 A1 * | 7/2011 | Degertekin | G01N 29/2406 | 356/454 |

* cited by examiner

Before Background Subtraction

Subtracted Background

After Background Subtraction

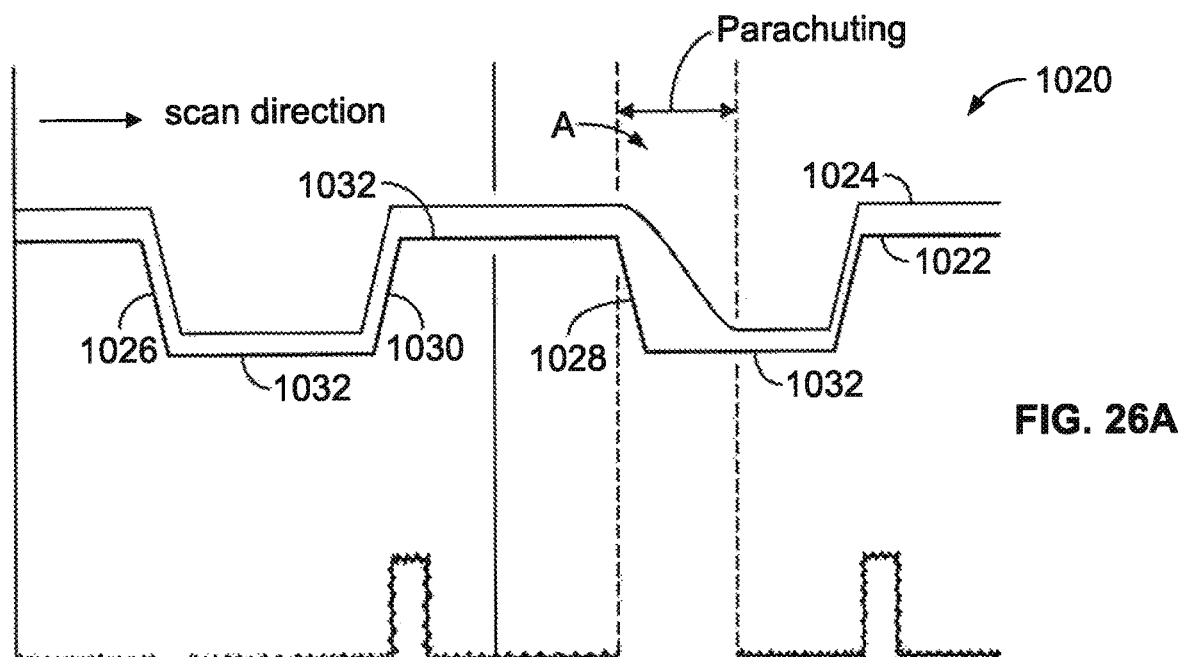
FIG. 26A
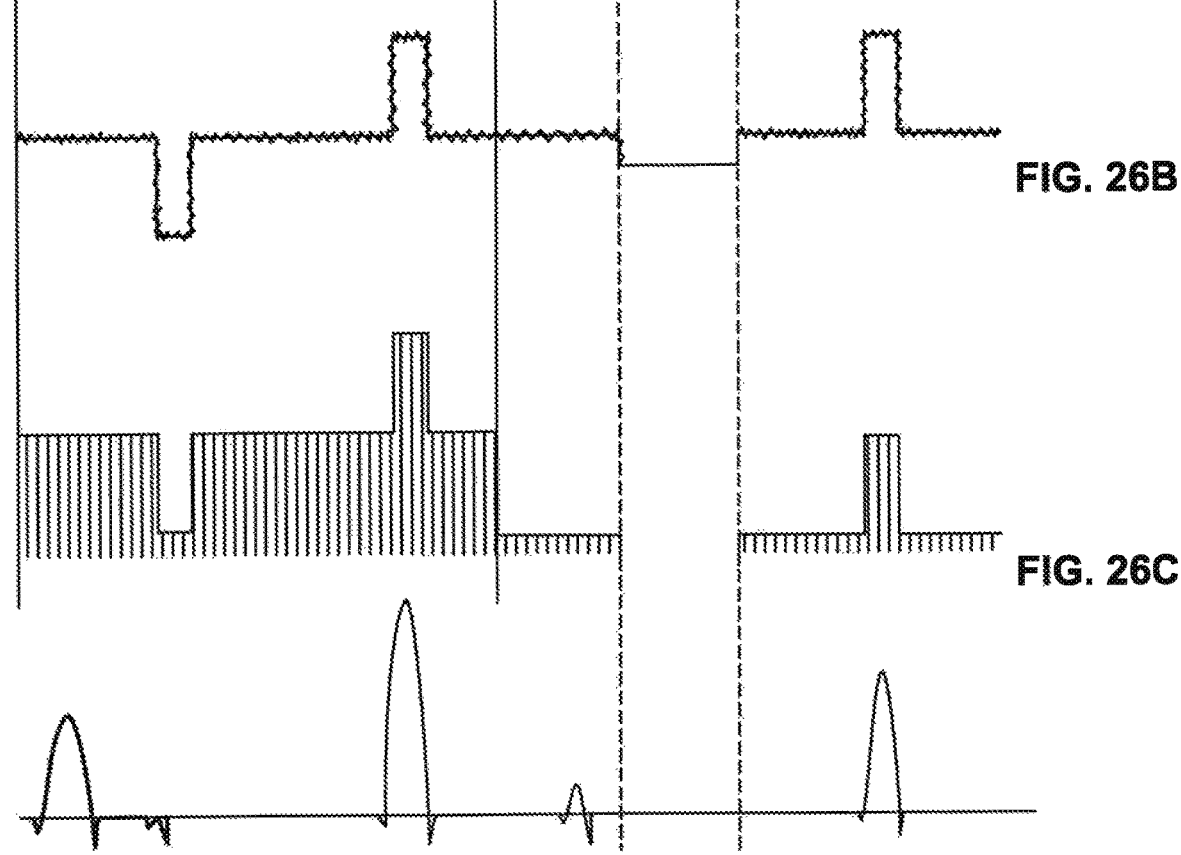
FIG. 26B
FIG. 26C
FIG. 26D

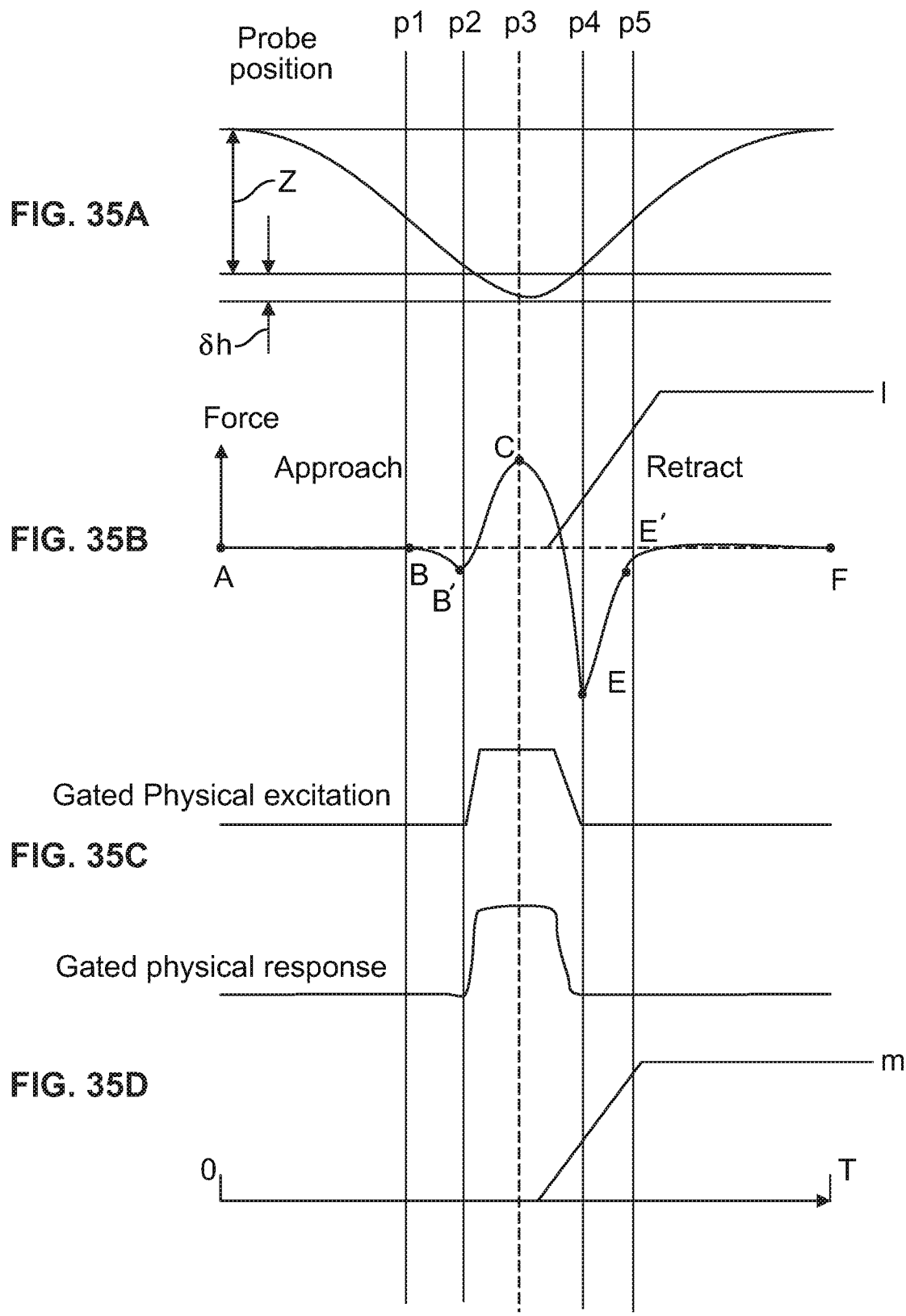

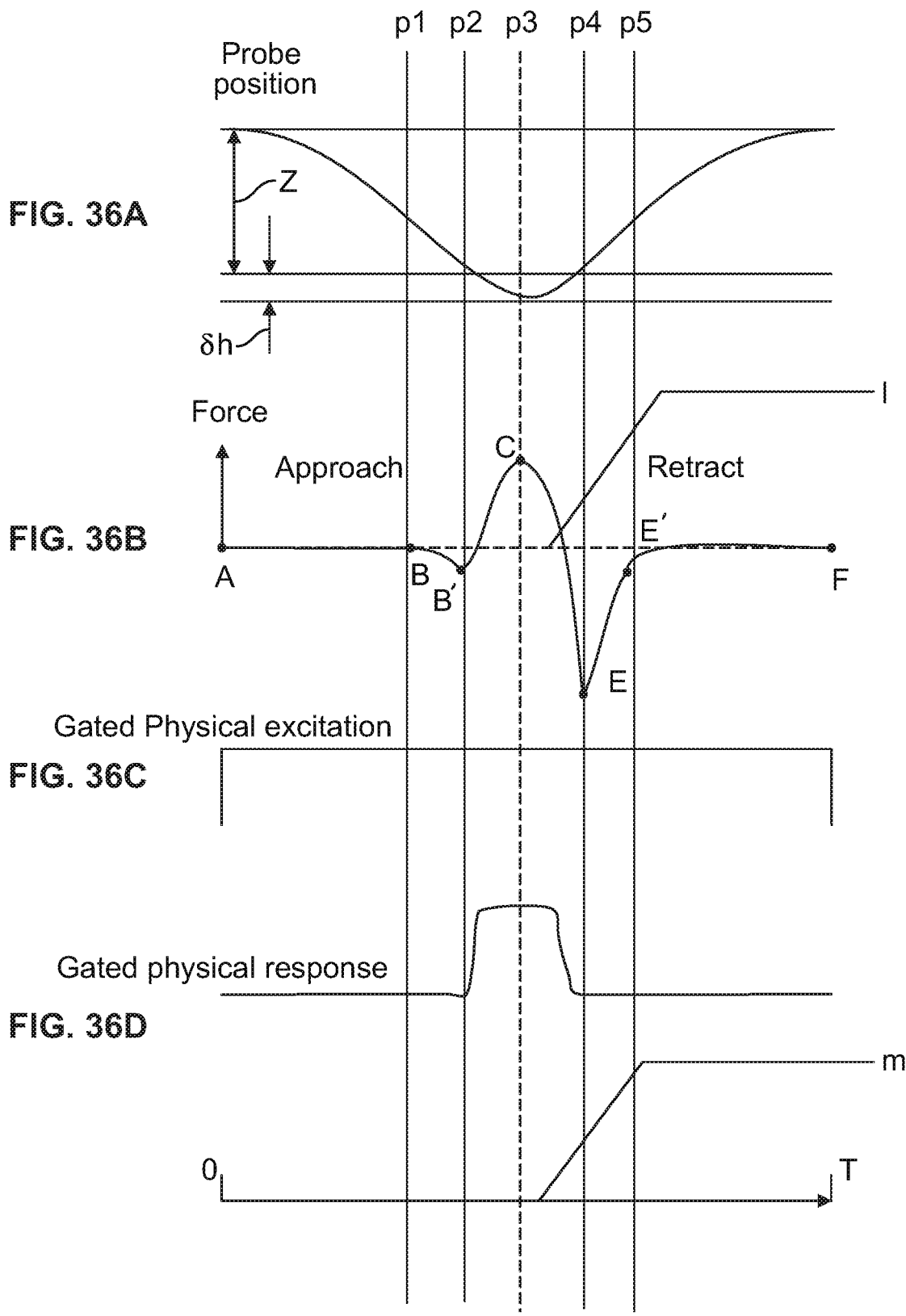

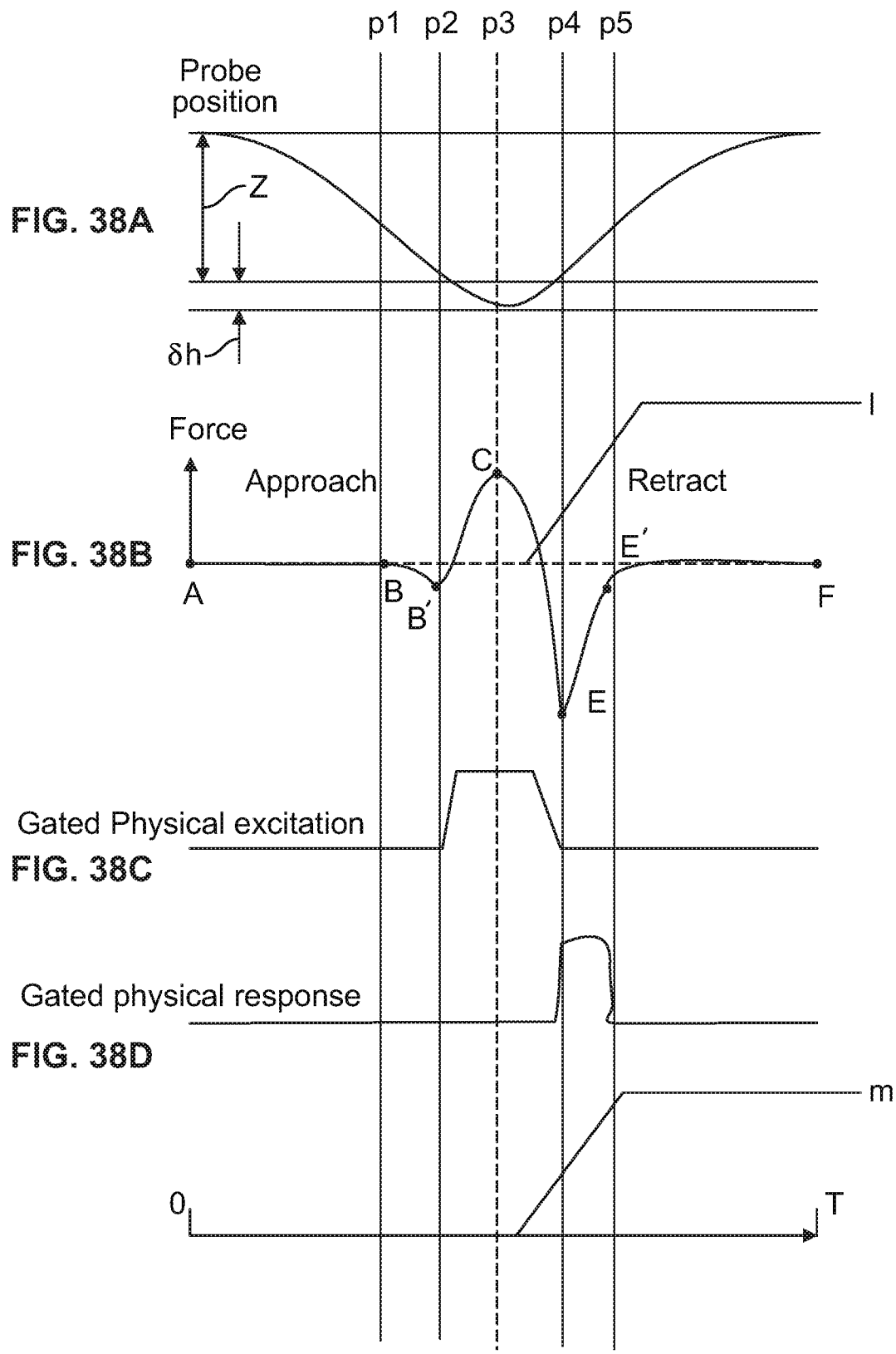

METHOD AND APPARATUS OF USING PEAK FORCE TAPPING MODE TO MEASURE PHYSICAL PROPERTIES OF A SAMPLE

CROSS-REFERENCE TO RELATED APPLICATIONS

This application is a divisional of U.S. patent application Ser. No. 15/077,708, filed on Mar. 22, 2016 (and issued as U.S. Pat. No. 9,995,765 on Jun. 12, 2018), which in turn is a divisional of U.S. patent application Ser. No. 14/178,076, filed on Feb. 11, 2014 (and issued as U.S. Pat. No. 9,291,640 on Mar. 22, 2016), which in turn is a divisional of U.S. patent application Ser. No. 13/306,867, filed on Nov. 29, 2011 (and issued as U.S. Pat. No. 8,650,660 on Feb. 11, 2014), which, in turn, claims priority under 35 USC § 1.119(e) to U.S. Provisional Patent Application Ser. No. 61/417,837, filed on Nov. 29, 2010, each entitled Method and Apparatus of Using Peak Force Tapping Mode to Measure Physical Properties of a Sample. U.S. patent application Ser. No. 13/306,867 is also a continuation-in-part of U.S. patent application Ser. No. 12/618,641, filed on Nov. 13, 2009 (and issued U.S. Pat. No. 8,739,309 on May 27, 2014), entitled Method and Apparatus of Operating a Scanning Probe Microscope, which in turn, claims priority under 35 USC § 1.119(e) to U.S. Provisional Patent Application Ser. No. 61/114,399, filed Nov. 13, 2008. The subject matter of these applications is hereby incorporated by reference in their entirety.

BACKGROUND OF THE INVENTION

Field of the Invention

The present invention is directed to scanning probe microscopes (SPMs), including atomic force microscopes (AFMs), and more particularly, to using Peak Force Tapping® (PFT) (Peak Force Tapping is a registered trademark of Bruker Nano, Inc.) mode of AFM operation, as described in the above-identified applications, to measure sample properties using PFT mode and at least one of electrical, thermal, microwave and optical sample excitation, for example.

Description of Related Art

Scanning probe microscopes (SPMs), such as the atomic force microscope (AFM), are devices which typically employ a probe having a tip and which cause the tip to interact with the surface of a sample with low forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample, and a corresponding map of the sample can be generated.

A typical AFM system is shown schematically in FIG. 1. An AFM 10 employs a probe device 12 including a probe 12 having a cantilever 15. A scanner 24 generates relative motion between the probe 12 and a sample 22 while the probe-sample interaction is measured. In this way, images or other measurements of the sample can be obtained. Scanner 24 is typically comprised of one or more actuators that usually generate motion in three mutually orthogonal directions (XYZ). Often, scanner 24 is a single integrated unit that includes one or more actuators to move either the sample or the probe in all three axes, for example, a piezoelectric tube actuator. Alternatively, the scanner may be a conceptual or physical combination of multiple separate actuators. Some AFMs separate the scanner into multiple components, for example an XY actuator that moves the sample and a separate Z-actuator that moves the probe. The instrument is thus capable of creating relative motion between the probe and the sample while measuring the topography or some other property of the sample as described, e.g., in Hansma et al. U.S. Pat. No. RE 34,489; Elings et al. U.S. Pat. No. 5,266,801; and Elings et al. U.S. Pat. No. 5,412,980.

Notably, scanner 24 often comprises a piezoelectric stack (often referred to herein as a "piezo stack") or piezoelectric tube that is used to generate relative motion between the measuring probe and the sample surface. A piezo stack is a device that moves in one or more directions based on voltages applied to electrodes disposed on the stack. Piezo stacks are often used in combination with mechanical flexures that serve to guide, constrain, and/or amplify the motion of the piezo stacks. Additionally, flexures are used to increase the stiffness of actuator in one or more axis, as described in application Ser. No. 11/687,304, filed Mar. 16, 2007, entitled "Fast-Scanning SPM Scanner and Method of Operating Same." Actuators may be coupled to the probe, the sample, or both. Most typically, an actuator assembly is provided in the form of an XY-actuator that drives the probe or sample in a horizontal, or XY-plane and a Z-actuator that moves the probe or sample in a vertical or Z-direction.

In a common configuration, probe 17 is often coupled to an oscillating actuator or drive 16 that is used to drive probe 12 to oscillate at or near a resonant frequency of cantilever 15. Alternative arrangements measure the deflection, torsion, or other characteristic of cantilever 15. Probe 17 is often a microfabricated cantilever with an integrated tip 17.

Commonly, an electronic signal is applied from an AC signal source 18 under control of an SPM controller 20 to cause actuator 16 (or alternatively scanner 24) to drive the probe 12 to oscillate. The probe-sample interaction is typically controlled via feedback by controller 20. Notably, the actuator 16 may be coupled to the scanner 24 and probe 12 but may be formed integrally with the cantilever 15 of probe 12 as part of a self-actuated cantilever/probe.

Often, a selected probe 12 is oscillated and brought into contact with sample 22 as sample characteristics are monitored by detecting changes in one or more characteristics of the oscillation of probe 12, as described above. In this regard, a deflection detection apparatus 25 is typically employed to direct a beam towards the backside of probe 12, the beam then being reflected towards a detector 26, such as a four quadrant photodetector. The deflection detector is often an optical lever system such as described in Hansma et al. U.S. Pat. No. Re. 34,489, but may be some other deflection detector such as strain gauges, capacitance sensors, etc. The sensing light source of apparatus 25 is typically a laser, often a visible or infrared laser diode. The sensing light beam can also be generated by other light sources, for example a He—Ne or other laser source, a superluminescent diode (SLD), an LED, an optical fiber, or any other light source that can be focused to a small spot. As the beam translates across detector 26, appropriate signals are processed by a signal processing block 28 (e.g., to determine the RMS deflection of probe 12). The interaction signal (e.g., deflection) is then transmitted to controller 20, which processes the signals to determine changes in the oscillation of probe 12. In general, controller 20 determines an error at Block 30, then generates control signals (e.g., using a PI gain control Block 32) to maintain a relatively constant interaction between the tip and sample (or deflection of the lever 15), typically to maintain a setpoint characteristic of the oscillation of probe 12. The control signals are typically amplified by a high voltage amplifier 34 prior to, for example, driving scanner 24. For example, controller 20 is often used to maintain the oscillation amplitude at a setpoint value, $A_S$, to insure a generally constant force between the tip and sample. Alternatively, a setpoint phase or frequency may be used. Controller 20 is also referred to generally as feedback where the control effort is to maintain a constant target value defined by setpoint.

A workstation 40 is also provided, in the controller 20 and/or in a separate controller or system of connected or stand-alone controllers, that receives the collected data from the controller and manipulates the data obtained during scanning to perform data manipulation operations such as point selection, curve fitting, and distance determining operations. The workstation can store the resulting information in memory, use it for additional calculations, and/or display it on a suitable monitor, and/or transmit it to another computer or device by wire or wirelessly. The memory may comprise any computer readable data storage medium, examples including, but not limited to, a computer RAM, hard disk, network storage, a flash drive, or a CD ROM.

AFMs may be designed to operate in a variety of modes, including contact mode and oscillating mode. Operation is accomplished by moving the sample and/or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature, and tilt that deviate from a flat plane, hence the use of the term "generally parallel." In this way, the data associated with this vertical motion can be stored and then used to construct an image of the sample surface corresponding to the sample characteristic being measured, e.g., surface topography. In one practical mode of AFM operation, known as TappingMode™ AFM (TappingMode™ is a trademark of the present assignee), the tip is oscillated at or near a resonant frequency of the associated cantilever of the probe, or harmonic thereof. A feedback loop attempts to keep the amplitude of this oscillation constant to minimize the "tracking force," i.e., the force resulting from tip/sample interaction, typically by controlling tip-sample separation. Alternative feedback arrangements keep the phase or oscillation frequency constant. As in contact mode, these feedback signals are then collected, stored and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research. Note that "SPM" and the acronyms for the specific types of SPMs, may be used herein to refer to either the microscope apparatus or the associated technique, e.g., "atomic force microscopy."

As with most measuring devices, AFMs often require a trade-off between resolution and acquisition speed. That is, some currently available AFMs can scan a surface with sub-angstrom resolution. These scanners are capable of scanning only relatively small sample areas, and even then, at only relatively low scan rates. Traditional commercial AFMs usually require a total scan time typically taking several minutes to cover an area of several microns at high resolution (e.g. 512×512 pixels) and low tracking force. The practical limit of AFM scan speed is a result of the maximum speed at which the AFM can be scanned while maintaining a tracking force that is low enough not to damage or cause minimal damage to the tip and/or sample. Great strides have been made in this area in which SPM has achieved video scan rates with high resolution for small samples and small scan sizes.

Nonetheless, given current limitations associated with known modes of operation, including both TappingMode™ AFM and contact mode, improvements have been desired. Again, in contact mode, lateral scanning of the tip creates large forces between the tip and sample that can compromise both. And when imaging soft samples such as biological samples and polymers, the surface can be destroyed, rendering the measurement useless, or at least deformed severely, thereby significantly compromising resolution. Note that "imaging" is used herein to indicate obtaining SPM data at multiple points of a sample surface, typically by providing relative scanning motion between the sample and probe and correspondingly interacting the sample and probe.

TappingMode™ AFM is a lower force technique and is the most widely used mode of AFM operation to map sample surfaces, especially for delicate samples. The typical force of the tip on the sample is about a few nN to tens of nN. Again, by oscillating the tip, rather than dragging the tip, the shear forces are minimized. That said, TappingMode™ AFM suffers from a drawback in that it is difficult to control the normal force acting on the sample surface. The user typically tries to select a setpoint that is only a small variation from the free air deflection/amplitude of the probe in order to minimize tip-sample interaction forces to get the best reproduction of the sample profile. The dilemma, especially for soft samples, is that if the imaging force is too low, the tip will not track the sample properly (i.e., maintain interaction with the sample during the scan), while if too high, damage/deformation of the sample may lead to an image that does not accurately reflect surface topography. Overall, the better this force can be controlled (i.e., the lower it can be maintained) the less chance of sample and/or tip damage, and thus resolution can be improved.

A review of the tip-sample forces in each of these modes provides insight in to the limitations of each. When a probe interacts with the surface through TappingMode™ AFM or Jumping Mode™ (see, e.g., U.S. Pat. Nos. 5,229,606, 5,266, 801 and 5,415,027, the entirety of which are incorporated by reference herein), the tip touches the surface periodically. FIG. 2A illustrates the physical process within one period "T" of the tip motion. FIG. 2A shows tip trajectory in reference to the sample surface position. FIG. 2B shows the corresponding interaction force at the same time for tip trajectory at various positions. At the peak positions $A_{max}$, the tip is farthest from the sample surface and not interacting with the sample. As the tip continues to move down toward the horizontal axis (zero tip-sample separation) it will experience a near-field Van der Waals force, $F_{a\_vdw}$, causing the tip to snap into contact with the sample through Van der Waals attraction. After touching the sample, the tip remains in repulsive interaction for time zone δT. During this time, the tip is continuously contacting the sample. The positions below zero represent that the tip may have deformed the sample, causing its position to be shown below the sample surface.

As the tip departs the surface after δT, an attractive force will develop a capillary meniscus, exhibiting a maximum adhesion force $F_{a\_max}$ right before the meniscus is broken away. The tip then enters into a non-interactive region and continues to a maximum departure position.

In the interaction free zone, when the probe is farther from the surface, the interaction force is zero or sufficiently near zero to form a baseline, as indicated in FIG. 2B. In FIG. 2B, the force above the horizontal axis is repulsive while those points below the horizontal axis represent a net attractive or adhesive force. The maximum repulsive force $F_{r\_max}$ usually corresponds to the lowest or smallest tip position or separation relative to the sample surface.

In prior known modes disclosed in TappingMode™ AFM and JumpingMode™ AFM, the amplitude $A_{max}$ or RMS of the tip oscillation amplitude is used as the feedback control parameter. An example of such feedback control apparatus is shown in FIG. 1.

In conventional control, typically implemented using a gain control feedback loop, positioning actuators and a cantilever response detection component (quadrant photodetector, for example), the AFM uses detected probe deflection or an RMS signal corresponding to cantilever (i.e., probe) motion as an indication of the tip-surface interaction and uses the feedback loop to maintain constant or RMS deflection.

Yet a major limitation of conventional AFM is its inability to acquire quantitative mechanical property information simultaneously with the high-resolution imaging. AFM has been primarily focused on topographical imaging. Little progress has been made in achieving quantitative mechanical mapping, including elasticity, plasticity, and work of adhesion.

Moreover, TappingMode™ control uses amplitude or phase of the measured deflection signal to control tip-surface interaction using feedback. Notably, both amplitude and phase are average properties of the probe/tip oscillation using at least one cycle of interaction. More specifically, the average pertains to probe/sample interactions occurring in all the positions in the tip trajectory (FIG. 2). Therefore, there is no possibility for the control feedback to be based on substantially instantaneous tip-sample interaction. Note that instantaneous interaction here refers to any point (for example, within two microseconds) of interaction in FIG. 2B (discussed further below).

In addition, it is important to note that TappingMode™ AFM was created to overcome what is known as the stick-in condition that occurs when probe touches the sample intermittently. As the probe touches the sample, capillary force will tend to catch the tip and prevent it from releasing. The amplitude of probe oscillation in TappingMode™ will drop to zero, thereby causing feedback oscillation. This problem was overcome when using TappingMode™ by using probes having a certain stiffness, usually 10 N/m (Newton/meter) to 60 N/m, with a nominal value of 40 N/m, while operating the TappingMode™ AFM at an oscillation amplitude higher than about 10 nm peak-to-peak. Under these conditions, as the probe touches surface, the kinetic energy of the tapping probe converts to enough static elastic energy to overcome the capillary force, assuring steady amplitude in each cycle. One drawback of this mode is that the kinetic energy stored in the probe is also proportional to the cantilever spring constant. When employing a lower spring constant cantilever, such as 1 N/m, TappingMode™ is impossible when measuring many materials because the cantilever cannot overcome the capillary adhesion forces using its own resonance oscillation energy. Consequently, most TappingMode™ applications are only possible when one uses a stiff cantilever generally know in the art as a lever.

In an alternate mode of operating an SPM, known as the pulsed-force mode or PFM (see, e.g., U.S. Pat. Nos. 6,880,386 and 7,129,486), the amplitude of the oscillation of the probe is adjusted so the tip goes in and out of contact during each cycle. In this mode, control is provided by monitoring tip-sample interaction forces. It operates based on properties associated with a force curve, another common measurement made in the AFM field to measure material properties at a particular location. Force measurements are common, and can be mapped over an entire sample to create what is known as a force-volume image.

In PFM, by analyzing the shape of the force-distance curve, and using the data to control the forces acting between the tip and the sample, the amount of data acquired is lessened compared to other modes of SPM operation. Importantly, PFM typically needs to operate at $F_{r\_i}$ (discussed below) or the peak pulse force, which substantially exceeds the adhesion induced deflection, as well as coupling induced deflections. As a result, a high repulsive force is needed as a control reference. Such high force could damage the sample or the tip, and thus prevent acquisition of high resolution images. Moreover, PFM has other limitations, particularly with respect to operating speed and resolution limitations, and thus, though it has been implemented to image soft samples, it has not been more widely adopted for all types of AFM imaging applications. In addition, imaging in a fluid environment presents a further challenge to PFM since viscous force in fluid produces large deflection even when the cantilever probe is not interacting with the sample.

More particularly, a main reason why imaging speed is limited in standard PFM AFM is illustrated in FIG. 2C. FIG. 2C is a graph of tip-sample interaction force versus time. The interaction force is plotted as snap-to-contact at "A", at which point repulsive force (sample on tip) initiates at "B." Peak repulsive force occurs at about "C" as adhesive forces pull on the tip until about point "D", the point at which the tip releases from the sample. Point E represents the deflection peak of the cantilever probe when it departs from the sample. Points C and E both present themselves as a peak in the deflection signal. In order to assure that feedback controls tip-sample interaction properly, the value of C should exceed E. In yet another constraint in PFM, a certain ringdown period (cycles of the probe oscillation at its resonance frequency) is required before it is possible to determine the baseline force needed to continue the scan. It is this waiting for the cantilever to "ringdown" (a free decay process, as in TappingMode™) that limits the modulation frequency, and thus scan speed. More particularly, modulation frequency is significantly less than the probe resonance frequency (for example, a fifth or more below the probe resonance frequency).

In addition to the above-noted issues, setup and operation of the relatively complex and versatile AFM can be time consuming and tricky, especially for a novice AFM operator and/or a scientist or engineer not familiar with complex metrology equipment. For example, setup and operating parameter values typically depend on factors such as the type of sample material, including whether it is hard or soft, conductive or non-conductive, and organic, synthetic or biological in nature, among other things.

In other measurement techniques such as scanning electron microscopy (SEM), a sample can readily be mounted in the instrument and a good image obtained with little user training or expertise. However, AFM is often the preferred technique given its ability to make a wide range of measurements including multidimensional topography and mechanical properties (elasticity, etc.). Nonetheless, AFM most often requires expert knowledge of the tool and the measurements to be made. In this regard, the user needs to locate a position of interest, introduce the tip of the probe to the sample (by moving either the sample or the probe). Then, once a measurement scan is initiated, the user needs to make sure the tip tracks the sample, typically by maintaining a stable feedback loop.

Moreover, once a measurement has been made, interpreting the data obtained is often a challenge. In general, these can be time consuming tasks that most often require the knowledge and experience of a physicist or electronics engineer, with the limitations attendant to relying on human judgment. Importantly, because AFM has the potential for wide applicability, it would be advantageous if the AFM did not rely so heavily on an expert's ability to perform. For example, given its ability to obtain unmatched material property measurements, including maps of samples, biologists and material science experts would more widely employ AFM if it were easier to use. In this regard, ease of use would be aided if the AFM and/or method of operation could minimize or eliminate the challenges associated with both a) maintaining feedback stability while making and preparing to make measurements and b) interpreting the data obtained.

To address these issues, the fundamental challenges presented by AFM and its currently preferred operating modes were considered. Initially, with respect to maintaining stability in known AFM modes, controller adjustment is critical. In most current commercial systems, the user must control both the set-point as well as the gain (I (integral) and P (proportional)). With respect to the set-point, control depends on the mode. In contact mode, the instrument attempts to maintain constant contact force between the tip and sample, which is relatively straightforward. However, in the most widely used mode of AFM operation, oscillating mode or TappingMode™ AFM described above, controlling the set-point (tapping amplitude or phase) is complicated because, most fundamentally, there is no straightforward relationship between the set-point and the tip-sample forces. The same set-point change can indicate either high or low tip-sample interaction force, with cantilever dynamics (fundamental resonant frequency, etc.) being highly influential, including with respect to imaging in varying environments (fluid v. atmosphere, for instance).

Stable and optimal feedback also requires applying appropriate gains. Generally, feedback will become unstable under high gain, and will have reduced tracking capability under low gain. P and I gain are adjusted with the user typically employing trial and error to make sure the feedback remains stable, while also providing sufficient tracking capability. However, in TappingMode™ AFM, the feedback dynamics are greatly influenced by set-point, i.e., the same gain may exhibit different feedback stability under different amplitude set-point. Because the gains do not operate independently, the process of gain optimization is particularly complicated.

Stable feedback also requires applying appropriate gain when a deviation in the oscillation from the set-point is detected. The gain must be adjusted to return oscillation back to the setpoint. P and I gain are adjusted with the user typically employing trial and error to make sure the feedback remains stable. And because the gains do not operate independently, the challenge is particularly complicated.

In response to the desire in the metrology field to have an AFM system that maintains stable feedback with less expert user participation, solutions have been proposed. Nonetheless, each has significant limitations.

In Rifai and Youcef-Toumi, entitled "On automating atomic force microscopes: An adaptive control approach," as well as in Schitter et al., entitled "Fast contact-mode atomic force microscopy on biological specimen by model-based control," higher order or model-based controllers are employed over a standard P/I controller. Such controllers are difficult to design and are inherently imperfect. Importantly, such controllers require information related to system dynamics prior to operation. Though they can be effective when operating the AFM in contact mode, they typically have difficulty working when the AFM is operated in TappingMode™ given that, as suggested above, system dynamics change with varying set-point.

In Astrom and Hagglund, a standard P/I controller is employed, but the tuning required for stable operation is automated. Astrom and Hagglund employ simple regulators using specifications on phase and amplitude margins. In this approach, the target system is most typically large plants with slow time response. In particular, the time scale of the response is usually minutes to hours. This characteristic is essentially in direct contrast to an AFM system in which response time is milliseconds and the Q of the response is high (low energy dissipation). In other words, automatic tuning of the controller as taught by Astrom and Hagglund (using simple regulators with slow response times) would not work for most AFM applications.

In another system, disclosed in Rice et al. (U.S. Pat. No. 7,513,142), the system works to detect the onset of instability, and then makes a correction. However, because the time period between the onset of instability and out of control instability (i.e., instability of a magnitude requiring stopping and restarting the measurement process) is so short, it is difficult to implement control before having to stop the measurement process. As understood in the art, hysteresis is primarily responsible when the system is not able to respond quickly enough. Moreover, in this solution the system makes a judgment based on the measured oscillation. An acceptable noise amplitude is defined, and if that amplitude is exceeded, the system adjusts the gain. One main issue concerns the fact that the noise amplitude is so complicated, particularly when operating the AFM in TappingMode™, and when measuring certain types of samples. In TappingMode™ AFM, the oscillation is a non-linear representation of the interaction force between the tip and sample. Therefore, controlling the tapping amplitude, for instance, provides an indirect control of the tip-sample interaction force. This indirect control of the interaction force is susceptible to the effects of variables such as oscillation harmonics and system oscillation, including from the piezo actuator itself and the mechanical components of the AFM. It is these TappingMode™ dynamics that make it extremely difficult to develop a robust control algorithm, particularly when imaging may occur in varying environments.

As a result, though this system does not require user input to make a judgment, its ability to decipher the measured oscillation and modify the control when the system is about to become unstable is limited. Again, in TappingMode™ AFM, system dynamics depend on both set-point (e.g., amplitude or phase) and gain, which severely complicate the ability to develop a control algorithm that can accommodate instabilities.

In sum, while past attempts have been made with AFMs to automatically adjust gain, this method also has not proven particularly effective. Known methods may not be able to handle both sample topography and operating parameters, such as setpoint, actuator hysteresis and tip shape, which can unpredictably and adversely impact any attempt to maintain stability through gain adjustment. As a result, automatic gain adjustment is largely ineffective.

Again, this is not surprising in view of the numerous scan parameters that must be taken into account in AFM setup and operation, along with those that can require adjustment during AFM operation. For example, a user may need to adjust such scan control parameters as setpoint, scan speed, proportional gain, integral gain, drive frequency, drive amplitude, and other parameters. Without great care, considerable experience, and sometimes a little luck, tip, cantilever or sample damage can occur, poor or unusable results can be obtained, and, in instances where everything appears to be operating well, operational inefficiencies can be so great that scanning time is nowhere near optimal, which is particularly problematic for high throughput applications such as those in the semiconductor industry.

At present, if the value of any one of the several manually selected control parameters is not at or within a reasonable range of its optimum, poor performance and unacceptable data will likely result. In addition, relatively complex interdependencies existing between certain AFM parameters often make setup a trial and error procedure, even for the most experienced AFM operators.

In performing AFM setup, the values for several control parameters must be set along with feedback loop gains for different operational modes and other instances where setting up such gains is required. Setup must take into account and configure for parameters such as scan size, pixels per line, number of scan lines, scan rate, tip scanning speed, digital-to-analog (D/A) resolution, Z-center position, i.e., Z-center voltage or the center of the Z piezo operation range, tip wear control, and sample damage minimization.

When an AFM is set-up to operate in an oscillatory mode, such as TappingMode™, setup must include choosing an amplitude and setpoint associated with the oscillation. Moreover, initial values for integral gain (I-gain), and proportional gain (P-gain) are also manually set. Selecting gain values can be tricky because it typically depends on factors such as the nature of the oscillatory mode being employed, sample topography, the hardness and/or roughness or any other mechanical characteristics of the sample and medium in which it is located, as well as other factors. For example, where gain is set too low, system response tends to be relatively slow, which can result in the tip not tracking the sample surface. Where gain is set too high, the feedback loop can start oscillating or backfeeding upon itself, which can undesirably add considerable noise to the sample image being generated.

In addition, the gain setup may be fine initially, only to be unsuitable later once some other factor, such as topography, changes. For instance, where the sample is relatively rough, gain typically should be set higher in order to image such high featured topography with any resulting increase in feedback oscillation noise being tolerable. Where the sample is relatively smooth or flat, gain should be set lower to minimize noise. By keeping noise low with low gain, better resolution of flat areas is achieved, thereby enabling the AFM to better image its finer details. However, as understood in the field, excessive noise can adversely affect imaging along flatter areas of the sample where an initially high gain setting ends up being too high when the sample flattens out. Conversely, an initial low gain setting frequently impedes imaging of higher features of the sample producing an image with such higher features being either distorted or missing.

These setup considerations become even more problematic when operating in TappingMode™ because the highest useable gains typically depend on cantilever dynamics. Cantilever dynamics are a function of the free air tapping amplitude and set-point and thus tuning the gains is very difficult, especially for the novice user. Indeed, factors such as cantilever dynamics and Z-actuator response speed can create such difficultly in setting the initial setpoint and gains, the operator often resorts to trial and error until the sample image starts to look good.

Unfortunately, because one can affect the other, trial and error can go on for a long time. For example, as setpoint is lowered, gain can be set higher and vice versa. However, while lower gains may permit a lower setpoint to be used, which typically increases cantilever response, it also increases error generation rate, which can undesirably blur or otherwise distort the image being produced during scanning.

In the end, what often results is the operator setting some initial parameter values, gains and setpoint and then manually adjusting the value of each, one-by-one until feedback oscillation occurs and then backs off. While this process may work reasonably well for experienced AFM operators, it is inefficient, time consuming, and quite often, less than optimal. In addition, it does nothing to address the dynamic nature of AFM imaging, which often requires an operator to either change certain settings on the fly during operation or to observe the image, etc., and go back and re-scan those parts of the sample that are poorly imaged with adjusted parameter values. Once again, this process can be extremely slow.

As a result, the field of scanning probe microscopy was in need of what one might call a "point and shoot" solution for imaging and mechanical property measurement on a wide array of samples that preferably is easy to use, as well as capable of minimizing the forces generated by tip-sample interaction while also maintaining fast imaging speeds.

Moreover, given the limitations of popular AFM modes, including TappingMode™ in which the output is averaged, thus making certain physical property measurements impossible (or at the very least very limited using small tapping amplitudes and only flat samples to allow the tip to operate in a very narrow interaction region), a solution was desired that could provide the ability to measure a variety of physical properties over a wide range of samples.

SUMMARY OF THE INVENTION

The preferred embodiments take advantage of the new mode of AFM operation known as Peak Force Tapping Mode®, in its design of a control scheme that minimizes the need for a skilled and experienced user. PFT Mode essentially eliminates the need for the user to tune the gain while imaging. Moreover, PFT Mode enables further ease of use of an AFM by providing the ability to automatically control operating parameters such as the setpoint, Z-limit and scan rate. In this case, in particular, physical property measurements of a sample can be performed over a wide range of samples, using a variety of probe/sample excitation techniques (electrical, electromagnetic, optical, etc. excitation).

Fundamentally, the preferred embodiments are directed to an AFM that limits the need for an expert user and are realized by employing PFT Mode which operates to move the tip substantially perpendicularly to the sample surface to cause the tip to interact with the sample, and then depart from the sample. The feedback circuit uses instantaneous interaction force (e.g., substantially orthogonal to the sample surface) at any interaction point, preferably using the maximum repulsive force. This new mode of operation takes advantage of the instantaneous response of the probe upon tip-sample interaction (no need to wait for ringdown like prior techniques, the present technique determines a baseline or zero force reference and forcefully substantially instantaneously brings the tip back to the surface), using the feedback loop to maintain a steady state interaction, and to control tracking of the tip on the sample. By moving the tip perpendicularly to the sample surface, this mode shares the advantages of TappingMode™ AFM to at least substantially eliminate friction forces during raster scanning or other relative probe sample motion in the XY plane. In addition, the implementation of this mode minimizes parasitic coupling so that a far more sensitive force control than PFM and TappingMode™ AFM can be accomplished (at least three (3) orders magnitude). In doing so, the lowest force imaging (using alternating force) known in the AFM art is realized and directly controlled, thus allowing the AFM to provide improved high resolution images exceeding Tapping-Mode™ AFM at speeds exceeding typical TappingMode™ AFM speeds (TappingMode™ bandwidth is below 1 kHz).

An added benefit of PFT mode is that each cycle of the vertical movement produces a force curve, or multiple force curves at each pixel, allowing simultaneous acquisition and mapping of height and mechanical property data. This method is therefore called Peak Force Tapping® (PFT) mode since it generates and analyzes each and every individual force curve, then measures and controls the AFM based on the corresponding peak interaction forces during each instance of the tip tapping on the sample, with imaging speed higher than TappingMode™ imaging speed.

In accordance with a first aspect of the invention, a method of operating a SPM includes generating relative motion between a probe and a sample and detecting motion of the probe. The method recovers, from the detected probe motion, a probe-sample interaction that is substantially independent of parasitic probe deflection (i.e., parasitic cantilever motion).

In another aspect of the invention, a method of operating a SPM includes generating an image while maintaining a maximum repulsive probe-sample interaction force of no more than about 10 pN during each cycle of substantially perpendicular cyclical movement of the tip relative to the sample. Such interaction force can be directly controlled and accurately calibrated.

According to another aspect of the invention, a method of operating an SPM includes generating an image for at least 1 hour with peak force of less than 5 nN, without user intervention, while maintaining an image resolution better than 5 nanometers regardless of environment, including ambient, gaseous, fluid and vacuum.

In another aspect of the invention, a method of operating an SPM includes generating at least one force-distance curve for each imaging pixel. The force-distance curve can be used to produce accurate measurement of one or more of Van der Waals adhesion, elasticity, work of adhesion of tip-sample interface, plasticity such as hardness and viscoelasticity.

According to another aspect of the invention, the Peak Force Tapping® method of operating an SPM includes using cantilevers with spring constants equal to about 0.01 N/m to 1000 N/m (which can enable the capability to map mechanical properties over a range from about 10 kPa to 100 GPa). This range of applicable cantilevers is several orders of magnitude wider than cantilevers generally applicable to ContactMode AFM (0.01-1 N/m) and TappingMode™ AFM (1 N/m-40 N/m).

A SPM configured in accordance with the invention could be used to scan a wide variety of samples, including patterned wafers, biological samples in ambient and fluid, polymers, thin films, and data storage device component.

According to a further aspect of the invention, a method of operating a SPM includes interacting a tip of a probe with a sample, then terminating the interaction, resulting in a decaying probe oscillation. Thereafter, the method repeats the interaction before ringdown of the decaying probe oscillation is substantially complete, and detects the motion of the probe.

In another aspect of the invention, a method of operating a scanning probe microscope (SPM) includes generating relative motion between a probe and a sample, and then detecting motion of the probe. In addition, the method includes recovering, from the detected probe motion, a substantially instantaneous force between the tip and sample. Preferably, the method also automatically controls the generating step to maintain a feedback setpoint.

In another aspect of the invention the control loop controls the interaction force at a pre-determined synchronization distance. Synchronization distance is defined as the time from the start of a modulation period to the time corresponding to the point chosen to control feedback. The instantaneous force occurring at this time point is used as the feedback control parameter, usually chosen as the point where the peak repulsive force occurs.

Again, TappingMode™ is complicated by a) indirect force control and b) cantilever resonance dynamics of multiple harmonics modes. Another major drawback is that neither amplitude nor phase of the probe oscillation during data acquisition has a monotonous relationship with tip-sample interaction force. As a result of these complications, subjective judgment must be employed in the feedback optimization process to acquire a desired image, which often means that the user must be an AFM expert to achieve a high quality image, with minimal interaction force, and with the best stabilized (most robust) feedback. The synchronized peak force control of the preferred embodiments (PFT Mode) eliminates the complications due to cantilever dynamics, as well as the complications induced by cantilever resonance and its harmonics. Also, for the first time, PFT Mode uses interaction force directly as the feedback control parameter. Even in contact mode AFM, constant drift of the cantilever deflection due to thermal or other system factors makes accurate force control impossible. In Peak Force Tapping® Mode, the system re-establishes the non-interacting baseline by moving the probe far from the sample in each interaction period. This process allows accurate determination of the interaction force every time the probe interacts with the sample. Through direct force control and elimination of the complications due to cantilever dynamics, the criteria required to achieve the highest quality images became monotonous. As a result, automation of the control loop can be implemented by designing an appropriate computer program. The subjective judgment of an expert user, based on her past experience of, for example, imaging a similar sample, to optimize feedback performance is also eliminated.

In yet another aspect of the invention, the automatically controlling step includes automatically determining a minimum interaction force required for control based on the noise background of the system. It is this minimum interaction force that can be used as the set-point in the control feedback loop.

In yet another aspect of the invention, the automatically controlling step includes determining feedback instability within less than 5 tip-sample interaction periods (for example, 2.5 ms), about 100 times faster than an expert's visual judgment.

In yet another aspect of the invention, the automatically controlling step includes automatically controlling a gain in a corresponding feedback loop.

In a further aspect of the invention, the method includes automatic Z limit control, and preferably automatic scan rate control.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIGS. 26A-D are a series of schematic graphs illustrating parachuting detection indicating that the tip-sample interaction force is at about the baseline during a parachuting event;

FIGS. 35A-35D illustrate a series of plots for using PFT Mode to measure physical properties of samples;

FIGS. 36A-36D illustrate a series of plots similar to FIGS. 35A-35D, wherein the excitation signal remains constant;

FIGS. 38A-38D illustrate a series of plots similar to FIGS. 35A-35D, using another alternative gated region;

DETAILED DESCRIPTION OF THE PREFERRED EMBODIMENTS

The preferred embodiments are directed to a Peak Force Tapping® (PFT) Mode of AFM operation in which the interaction force between the probe (tip) and sample is monitored and used to control tip-sample separation at very low forces, yet without compromising scanning speed. The techniques described herein provide high resolution by maintaining probe tip-sample forces low, and realize essentially real-time property mapping of sample surfaces. The preferred embodiments are inherently stable and thus facilitate long-term force control while maintaining the ability to acquire high integrity data (improved resolution). Moreover, because tuning is not required, unlike conventional Tapping-Mode™ AFM, the AFM setup is faster and easier than with other AFM modes. The key concepts driving the PFT Mode are illustrated graphically and discussed herein.

Practically, there were three major issues to be resolved before AFM control using instantaneous interaction force could be implemented. These issues were 1) accommodation of deflection background due to coupling; 2) determination of a baseline; and 3) determination of the instantaneous force, as defined herein.

Figure 2A:
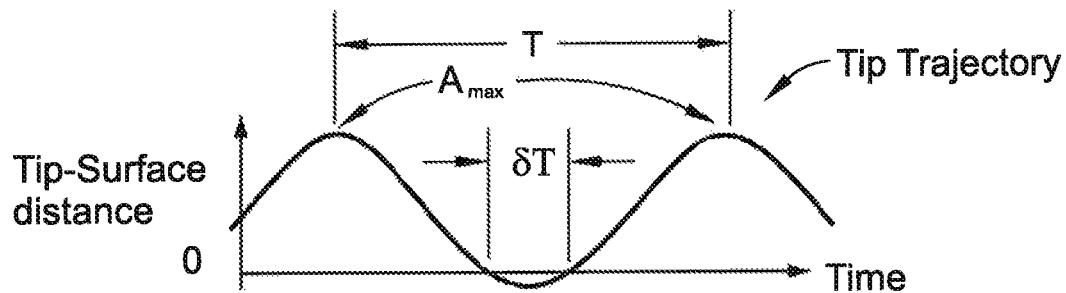
FIG. 2A is a graph of tip-sample separation versus time in oscillation AFM modes.

In FIG. 2A, a cycle of modulation that approaches and separates the probe from the sample (for example, using a drive to cyclically modulate probe-sample separation) is represented by a period T. The zero position (horizontal axis) represents the surface while the vertical axis is the separation. When the probe-sample separation crosses the horizontal zero line, the tip is in direct contact with the sample, as represented by region δT (the window of tip-sample contact). The interaction force corresponding to this region is plotted in FIG. 2B.

Figure 2B:
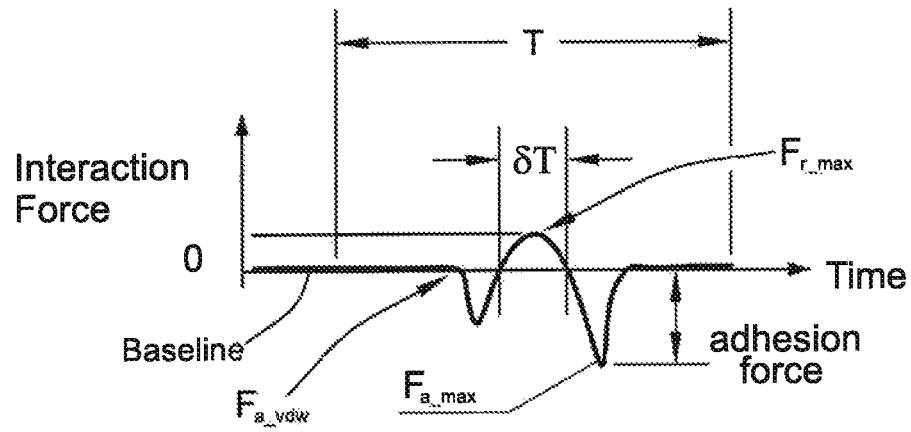
FIG. 2B is a graph of interaction force versus time in oscillation AFM modes.

With further reference to FIGS. 2A and 2B, $A_{max}$ is the maximum separation of the tip apex from the sample; $F_{a\_vdw}$ is the Van der Waals adhesion force; and $F_{a\_max}$ is the maximum adhesion due to capillary interaction and work of adhesion between the tip and the sample surface. Both repulsive force and adhesive force are calculated relative to the baseline as shown in FIG. 2B. It should be noted that the force referenced here is the total force acting on the entire tip which is typically, pyramidal-shaped. In fact, the very apex portion can enter the repulsive zone while the total force remains attractive. In this case, the feedback can still use the apex repulsive interaction force at the predefined synchronization position (defined as discussed below) for feedback, even though the total force at this point is attractive. This provides the benefit of operating with the minimum interaction force with the highest imaging resolution since the control is determined by the apex repulsive interaction which arises from the Pauli and ionic repulsions between the atoms of very apex of probes and the atoms or molecular of samples.

Figure 2C:
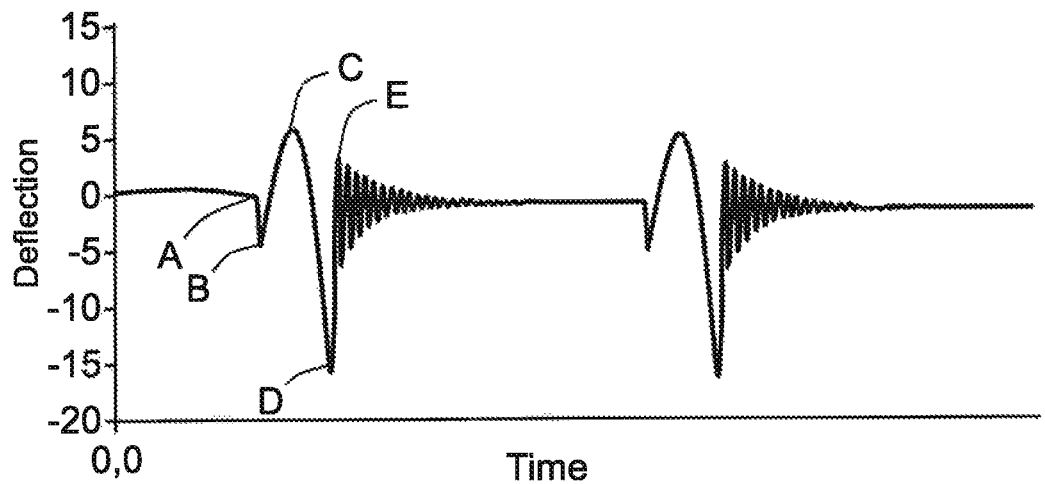
FIG. 2C is a graph of an SPM force curve illustrating probe sample interaction, "ringdown" and illustration of a second probe sample interaction.

It is important to differentiate cantilever deflection and tip-sample interaction force. While cantilever deflection is used to gauge the tip-sample interaction force, not all the deflection represents tip-sample interaction force; namely, parasitic forces contribute to cantilever deflection. For example, as shown in FIG. 2C, the cantilever deflection is plotted as a function of time, the figure representing actual deflection data. The oscillation after point "D" is due to cantilever free resonance decaying with time. This resonance deflection is not caused by tip surface interaction and is considered a parasitic deflection contribution (typically corresponding to parasitic cantilever or probe motion). Point E represents a maximum point of deflection at which the tip is not interacting with the sample. The "flat" portion of data also could have a slower variation of the deflection, when the tip is not interacting with the sample, typically caused by mechanical coupling of parasitic forces. Such coupling could be due to the modulation actuator itself, and/or cantilever response due to damping forces from air or fluid. It can also arise from laser interference. These parasitic effects will be further illustrated in subsequent figures.

In known force control systems, the control is based on a maximum force occurring in a period. Hence the repulsive force must be higher than any of the parasitic contributions to deflection for true tip-sample interaction to be differentiated from parasitic forces and historically used by the feedback loop. This force differentiation requirement required a relatively high imaging force that could damage the tip and/or the sample, thereby preventing the system from achieving high resolution.

Figure 3:
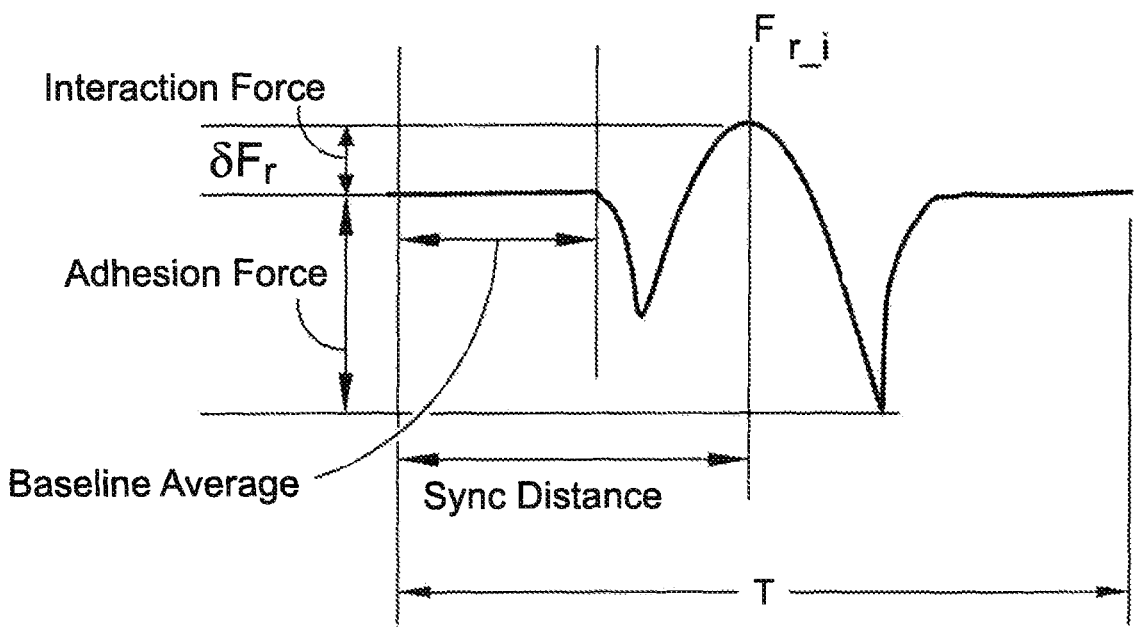
FIG. 3 is a graph of force versus time illustrating determining instantaneous force for feedback control according to the preferred embodiments.

In a preferred embodiment, the RMS or constant deflection is replaced by an instantaneous interaction force $F_{r\_i}$, determined according to FIG. 3, with the controller setpoint being:

$$\delta F_r = F_{r\_i} - F_{baseline} \quad \text{Equation (1)}$$

$F_{baseline}$ is the interaction force when the probe is not contacting the sample. It should be zero. In AFM, the force is usually represented by cantilever deflection. In this case, $F_{baseline}$ corresponds to the cantilever deflection when the tip is not interacting with the surface. $F_{r\_i}$ is the interaction force when the tip is at close proximate contact with the surface. A synchronization algorithm is used to align the start time of each drive period, so that the region $\delta T$ (FIGS. 2A-2B) coincides with the repulsive force and its maximum $F_{r\_max}$. The time from the start of the period to the occurrence of the $F_{r\_max}$ is the synchronization time, which can be precisely determined and controlled (described further below). Synchronization time distance (Sync Distance) can be determined by measuring the phase delay between the deflection response and the modulation drive signal. Once the Sync Distance is determined (when the probe is stationary in the xy direction), the same Sync Distance is used throughout all xy raster scanning positions. During imaging, the feedback operates to maintain $F_{r\_i}$ substantially constant while the value of $F_{r\_i}$ is determined by the Sync Distance. Note that the Sync Distance can also be generalized as the distance from the starting of the modulation period to the instant of interaction.

The synchronizing distance or Sync Distance can be precisely controlled. For example, if the tip oscillation period T is 100 µs, when the synchronizing distance is 48 µs, the interaction force occurring at the 48th µs will be used as the feedback control parameter. The feedback loop will try to maintain an instantaneous interaction force $F_{r\_i}$ (i=48 µs) at the 48th µs from the start of the period. In more general applications, any point of interaction force within the interaction region $\delta T$ can be used for feedback. $\delta T$ can also extends beyond the marked region in FIG. 2B to include the region of $F_{a\_vdw}$ (van der Waals attractive region) and $F_{a\_max}$ (the capillary adhesive region). The capillary adhesive region can also be adhesive interaction due to bonding force induced by functionalized probes and specific bonds on the sample.

To achieve an accurate measurement of the baseline, multiple deflection data points are gathered when the tip is not interacting with the sample and used to generate an averaged baseline level. Again, the non-interaction region (greatest separation/highest distance) can be determined by the Sync Distance because this region should be around the half cycle of the modulation period after the peak force position. The Sync Distance also determines the feedback force operating point, and the actual force is measured by δFr. δFr can be either negative or positive.

Due to adverse affects of drift (e.g., thermal) on the deflection signal, the corresponding force $F_{r\_i}$ may vary over time. The relative force $\delta F_r$ (relative to baseline determination) preferably is used for feedback control instead of $F_{r\_i}$ because it is a more accurate reflection of tip-surface interaction. This relative value removes the adverse influences due to system drift on cantilever deflection.

$\delta F_r$ also represents a controllable force by the feedback loop such that δFr remains constant over time at various positions as the tip scans across the sample.

Figure 4A:
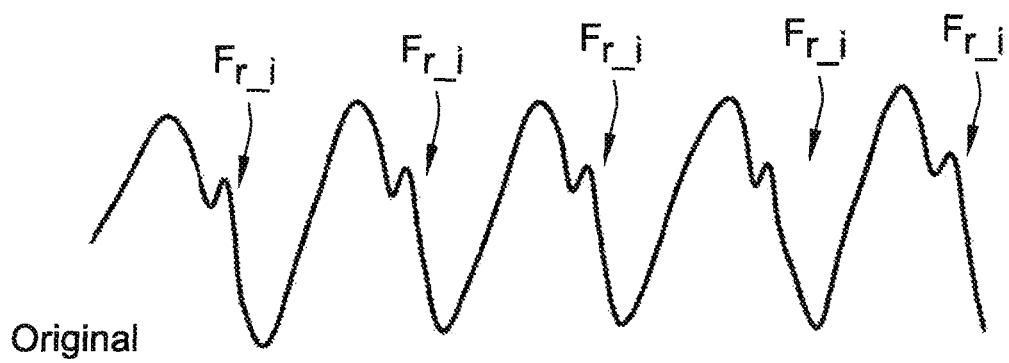
FIG. 4A is a schematic graph illustrating probe deflection versus time illustrating tip sample interaction force modulated periodically with parasitic oscillations in the system.
Figure 4B:
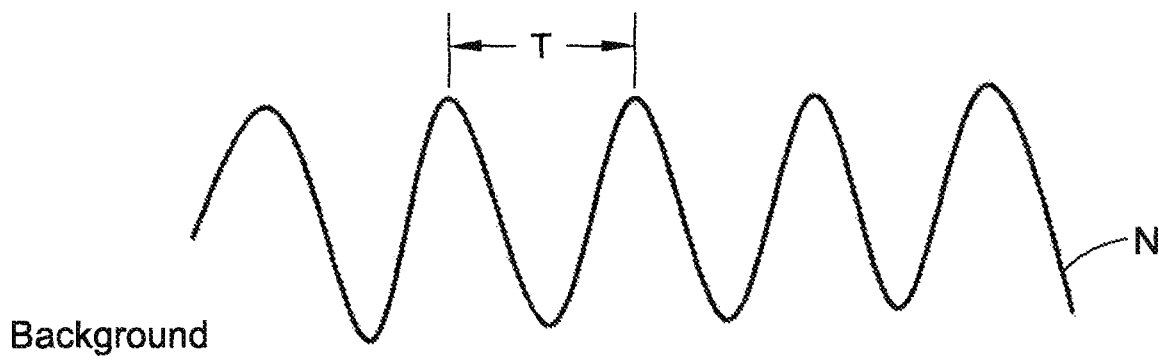
FIG. 4B is a schematic of cantilever probe response versus time with only hydrodynamic background oscillation due to parasitic sources.
Figure 4C:
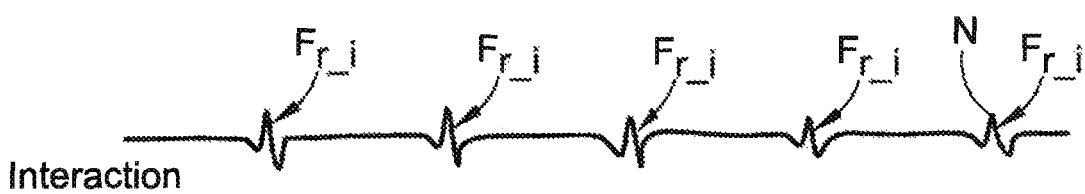
FIG. 4C is a graph of deflection error versus time after subtraction of hydrodynamic background oscillation.

In FIG. 4A-4C, the cantilever response, when interacting with the sample surface, is a mixture of the tip-surface interaction force and the background coupling. Such response is exhibited schematically in FIG. 4A as "Original." The real tip-sample interaction force is only at the $F_{r\_i}$ portion (shown in 4C), which is buried within the background of parasitic cantilever or probe motion. By subtracting the background from the original data (for example, probe motion including due to both interaction forces and parasitic forces), the magnitude of the interaction force can be obtained. The background, illustrated as 4B, can be caused by mechanical coupling of resonances from the AFM system, and/or cantilever response to its environmental medium, such as air and fluid. It can also be induced by laser interference as the cantilever moves relative to the sample. The common characteristic of the background is that cantilever deflection displaying periodic change is similar to the tip trajectory, even when the tip is not interacting with the sample. A successful subtraction of background experimental data is shown in FIGS. 5A-5C.

Figure 5A:
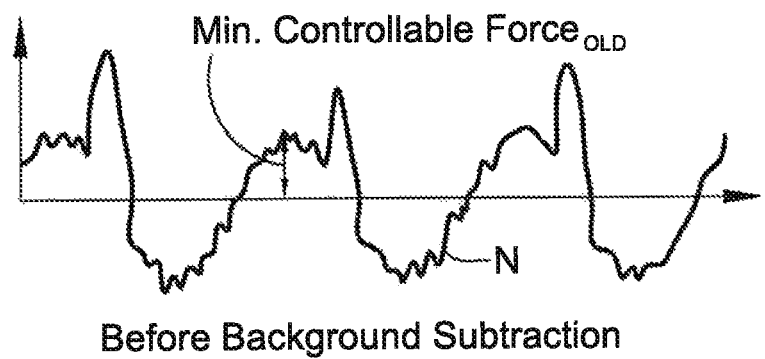
FIGS. 5A-5C is a series of graphs of a) deflection response before background subtraction, b) the subtracted background and c) the deflection error versus time after subtraction of hydrodynamic background oscillation.

More particularly, FIG. 5A shows a schematic illustration of the original probe deflection versus time. As noted, the deflection of the probe is highly influenced by parasitic sources that may be used to control tip-sample interaction. As shown, these periodic parasitic deflections are represented by the low frequency signal that we refer to herein as the "hydrodynamic background," for example or parasitic force in a more general term. The contribution to the probe deflection by these parasitic forces (including hydrodynamic forces, drag forces and air, off-axis motions, laser inference and any other periodic motion occurring when the probe is not interacting with the sample) is large. The actual tip-sample interaction force which should be used as the control signal in the preferred embodiments is superimposed on the parasitic background signal (FIG. 5B), so it can be a challenge detecting the actual tip-sample interaction forces. Stated another way, the minimum controllable force is determined by the background contribution to probe deflection (shown in FIG. 5A as the Min. Controllable Force$_{OLD}$—range of about less than 1000 micro-newtons to less than 10 pico-newtons). Notably, as is always the case, a noise signal "N" having a low amplitude relative to both the parasitic force contribution to the deflection and the contribution to the deflection by the tip-sample interaction force, is present.

Figure 5B:
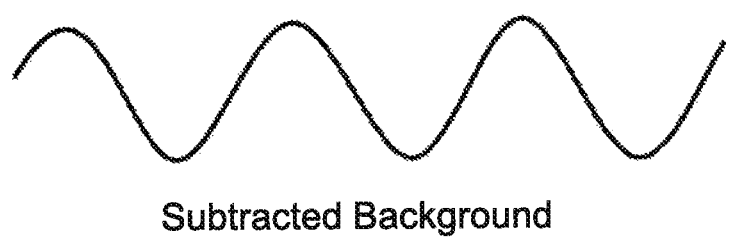
Figure 5C:
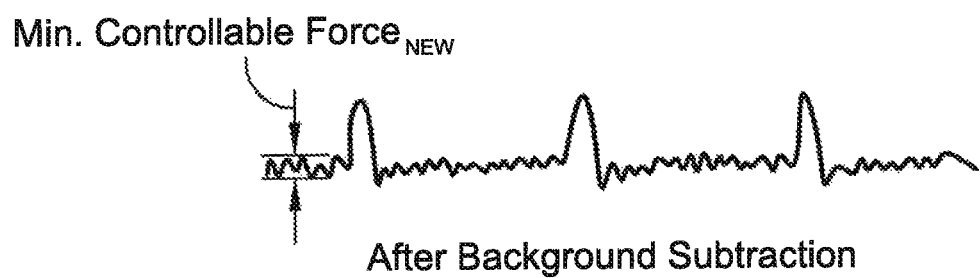

Turning to FIGS. 5B and 5C, one key concept to the present preferred embodiments is the subtraction of the parasitic background signal (FIG. 5B) from the deflection signal, as noted, thereby lowering the minimum controllable force. The background signal is determined by increasing tip-sample separation sufficiently to a controlled distance so that the probe does not interact with the sample, i.e., only parasitic forces are contributing to the detected deflection of the probe. The controlled distance is typically greater than 100 nm, though it can be less, ideally being a distance at which long range interaction forces do not contribute to probe deflection. As shown in FIG. 5C, the tip-sample interaction force contribution to the deflection after subtracting the parasitic background renders a deflection signal having clear peaks associated with the tip-sample interaction. Notably, the non-periodic noise will always be present, and in this case, determines the minimum controllable force as shown in FIG. 5C (Min. Controllable Force$_{NEW}$). For a very soft cantilever with a spring constant of 0.01 N/m and cantilever length of 100 um, this force can be about 1 pN.

It becomes clear that the minimum controllable force employable when performing parasitic background subtraction is lessened greatly (by, for example, three (3) orders of magnitude), allowing the preferred embodiments to control tip-sample separation so the probe-sample interaction forces are reduced to the pN range. The way in which this subtraction may be accomplished in the hardware is described further below with respect to FIG. 10.

Overall, it is primarily this ability to detect such small forces, and to use such forces as a control parameter in an SPM feedback loop, that allows an SPM operating according to the present invention to image a sample using what is referred to herein as "instantaneous force control." Instantaneous force control using real-time force detection offers improved control, thus improving image resolution and minimizing the chance for sample damage. In this context, real-time or instantaneous force detection implies that essentially each point of the varying force illustrated, for example, in FIG. 3 can be detected by the preferred embodiments and used instantaneously to control SPM operation. In other words, the varying forces acting on the probe due to probe-sample interaction during each cycle of the interaction between the probe and sample [or during each cycle of the modulation of the separation between the two, i.e., the force curve modulation] are detected and may be used by the AFM to image the sample in real-time. This instantaneous force control is used to provide AFM control at any interaction point within what would be one cycle of the modulation of the probe-sample separation. Because control is provided prior to completion of any would-be cycle of modulation (prior to the next approach), the feedback delay is greatly reduced. This will be shown further in connection with FIGS. 12A, 12B and 12C.

Yet another benefit in the peak force tapping control is that it does not need to be operated near the cantilever resonance frequency. Such operation can substantially eliminate cantilever delay due to transient resonance response, rendering instantaneous interaction control possible.

Figure 6A:
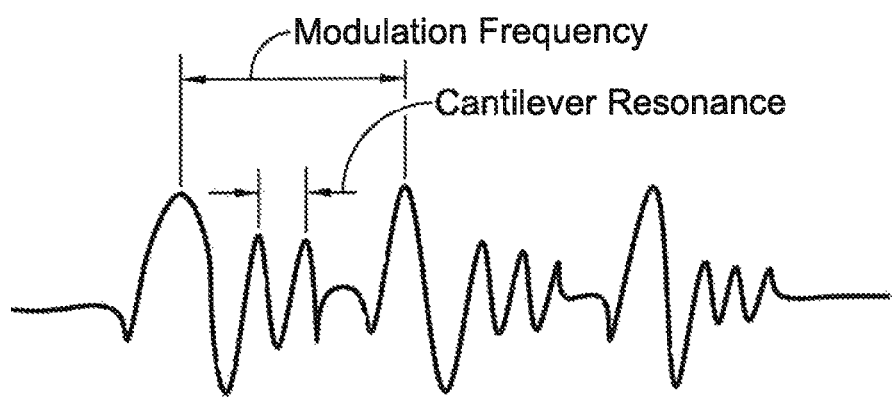
FIG. 6A is a schematic illustration of force versus time illustrating the baseline averaging method of the preferred embodiments.

Turning next to FIG. 6, the preferred embodiments also allow the AFM to operate at high speed by performing baseline averaging of the force curve to extract a zero force point quickly, and allow the system to cause the probe to interact with the sample with little time delay. In contrast to prior techniques represented by FIG. 2C, the modulation frequency of the present AFM is not limited by the requirement that the system wait to re-establish probe-sample interaction until probe "ringdown" completed (after the tip jumps off the sample surface, the decaying of probe oscillation to about 1/e) to stabilize the imaging system. The time required for ringdown is determined by the cantilever dynamics which are proportional to Q/f, where Q is the quality factor of the cantilever and f is the cantilver resonance frequency—typically tens of milliseconds for a conventionally used cantilever to stabilize. In the preferred embodiments, as shown in FIG. 6, upon ringdown, a few cycles of the cantilever resonance frequency are averaged to determine a zero force point (i.e., an at-rest baseline position) in essentially real time, and allow the system to cause the probe to interact with the sample much quicker than the system illustrated in FIG. 2C. In fact, by conducting an average of even one cycle of the cantilever resonance frequency upon ringdown, a robust estimation of the zero point (baseline) can be realized. As a result, modulation frequency can be increased significantly without compromising system stability. Moreover, the added benefit of operating faster, of course, is reducing the effect of noise within the system.

Figure 6B:
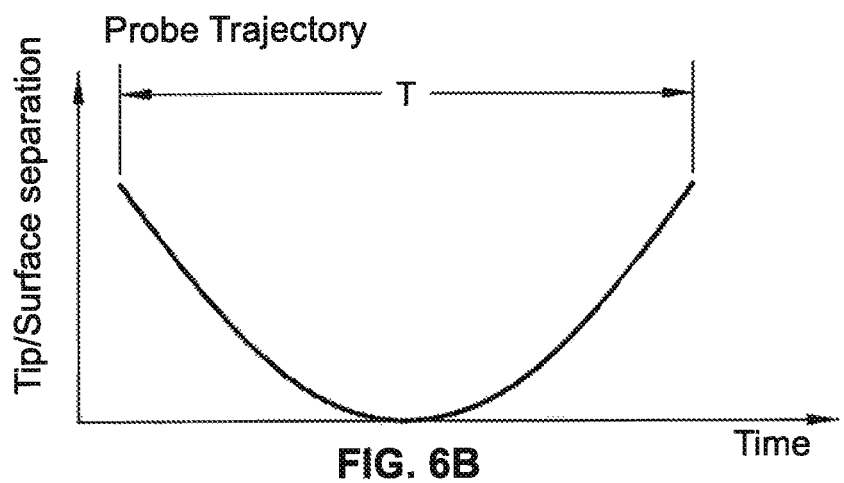
FIG. 6B is a graphic illustration of tip-sample separation versus time.
Figure 6C:
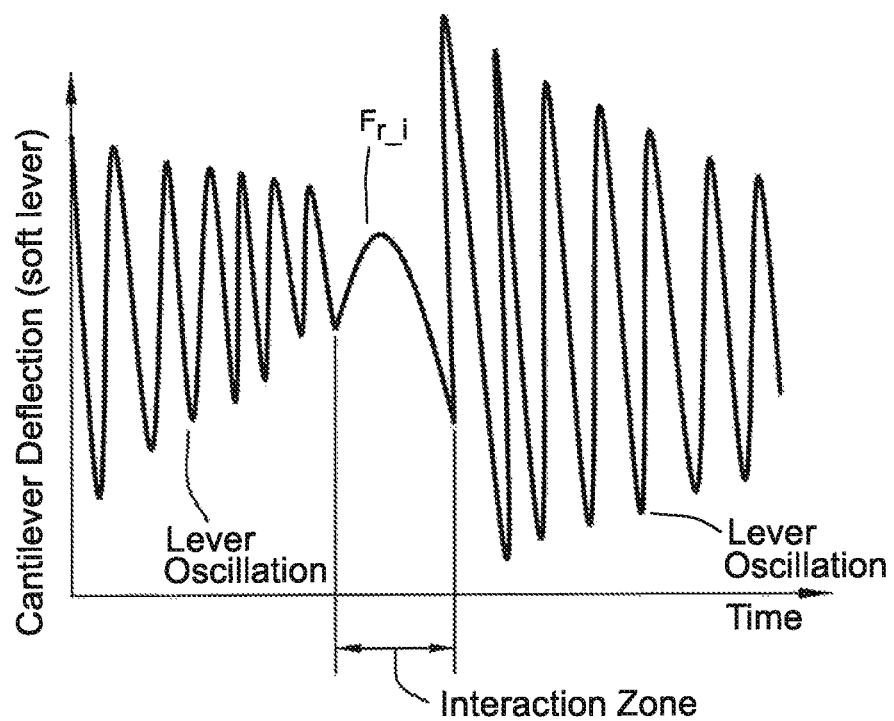
FIG. 6C is a graphic illustration of cantilever deflection versus time.

For measurement with very sensitive force detection, very soft cantilevers (spring constant 0.01 N/m to 0.3 N/m) are typically used. These levers have lower resonance frequency and very long ringdown time. More importantly, the adhesion induced oscillation (snap out of contact) is much stronger, as shown in FIG. 6C. In FIG. 6C, the deflection response of a soft cantilever is plotted as a function of time. The tip trajectory is also plotted as a position reference (FIG. 6B). As can be seen, the parasitic oscillation of the cantilever far outweighs the interaction force, making control basically impossible. Previous to the present invention, a user would have to wait long enough for the oscillation to disappear so that $F_{r\_i}$ becomes the only maximum, in order to have a steady control of the feedback. As the cantilever gets more sensitive, waiting for ringdown becomes prohibitively time consuming. The preferred embodiments of the present invention determine the baseline by separating the interaction zone and non-interaction zone through synchronous alignment to the closest position between the probe and the sample. A region corresponding to an "interaction zone" is locked through a synchronous marker, a reference trigger signal at the beginning of each cycle. Any point of deflection in this region can be used as the feedback parameter for steady state interaction control. All deflection data outside the interaction zone are averaged to a constant and used as the baseline for calculating ΔFr in FIG. 3. By combination of the baseline detection and synchronous control, the relative force δF can be accurately determined instantaneously and controlled. Such control allows $F_{r\_i}$ to be far below parasitic deflection, as illustrated in FIG. 6C.

Steady state again means a constant maximum force or a constant minimum force, or a combination of the characteristics of the interaction force curve shape in each cycle of the probe/sample relative motion.

Another major advantage of the present techniques is the ability to determine the baseline with high amplitude oscillatory data. Since the resonance frequency of the cantilever is known, in an alternative embodiment, the average can be determined in the non-interacting zone by analyzing an integer multiple of cycles of the cantilever resonance frequency. The integer cycle averaging can effectively remove the oscillatory deflection data, yielding a constant baseline.

Notably, cantilever resonance frequency can also be determined by known techniques such as frequency sweep and thermal tune.

Figure 7:
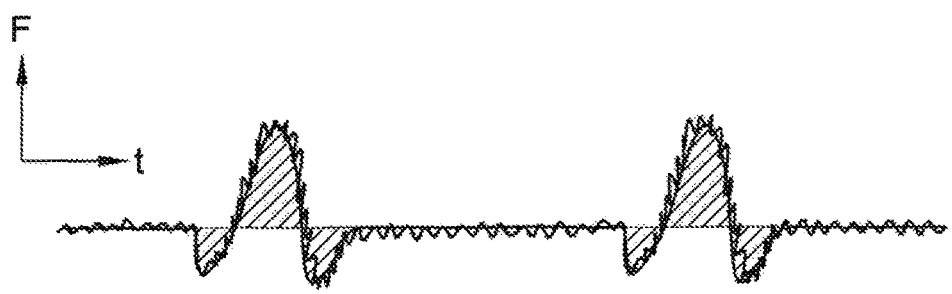
FIG. 7 is a schematic graph of force versus time illustrating the prior art technique of averaging to a force over an entire cycle (RMS) to detect tip sample interaction.
Figure 8A:
FIG. 8A is a schematic force versus time curve illustrating the gated average repulsive force control according to the preferred embodiments.
Figure 8B:
FIG. 8B is an illustration of an input synchronization signal sent with the force response due to tip-sample interaction to realize gated average repulsive force control according to the preferred embodiments.

Turning next to FIGS. 7 and 8A and 8B, the preferred embodiments also employ something referred to herein as "gated average repulsive force control." FIG. 7 schematically shows probe deflection, including a series of interaction periods, upon AFM operation. Prior control techniques using force as a control parameter average the total force over the entire cycle of tip-sample interaction, yielding an RMS value for comparison to the force setpoint. As understood in the art, the forces illustrated by the force curve are complex. Both repulsive and attractive forces operate on the probe tip during a cycle, as described above. By including, for example, the attractive force portion (C-D in FIG. 2C) which tends to cancel repulsive force, force sensitivity and imaging resolution are most often compromised.

Turning to FIGS. 8A and 8B, gated average repulsive force control is illustrated. In this embodiment, a system synchronization signal such as that shown in FIG. 8B is used to "gate" the repulsive force portion (B-C in FIG. 2C) of the force curve (illustrated by the shaded portion "A" of the deflection curve) by excluding the attractive force portion of the force curve. By controlling tip-sample separation based on the repulsive force portion of the force curve, force sensitivity and imaging resolution are increased due to reducing the adverse effect of the attractive force portion of the curve (i.e., attractive interaction forces are long range interaction forces, and therefore sense interaction over a much larger area, yielding lower resolution). Moreover, the gate operates to exclude the noise when performing the gated averaging. Again, the synchronization signal is timed so that only the repulsive force region is used. Such operation is ensured by using the gate at a pre-determined synchronization position as shown and described in connection with FIG. 3.

Figure 9A:
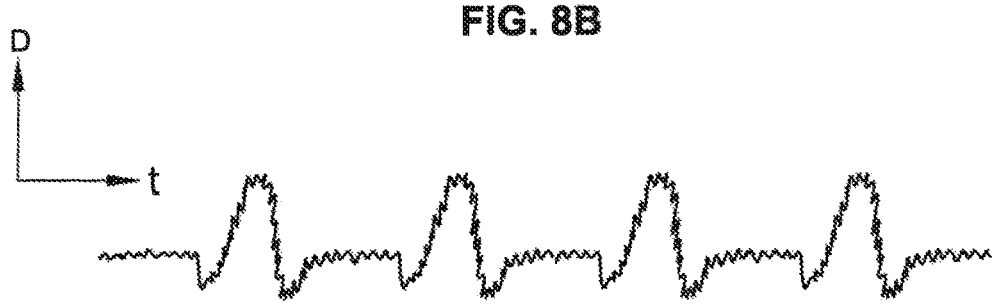
FIG. 9A is a schematic illustration of a series of force curves used in synchronous averaging according to the preferred embodiments.
Figure 9B:
FIG. 9B is a graph illustrating a synchronization signal sent with the deflection applied in the force curve of FIG. 9A.
Figure 9C:
FIG. 9C is a graph illustrating a force curve signal after several cycles of synchronous averaging of FIG. 9A.

Taking the above further, as shown in FIGS. 9A and 9B, synchronous averaging can also be employed to further improve signal-to-noise ratio, and thus ultimately provide control at nearly the zero force point. FIG. 9A, similar to the other tip-sample deflection illustrations, shows several cycles of deflection of the probe as the tip interacts with the sample. As noted previously, a noise signal is always present when making these types of SPM/AFM measurements. By combining the deflection signal with a corresponding synchronization signal, such as that shown in FIG. 9B, synchronous averaging of the deflection is performed. As a result, the effect of noise is reduced greatly according to, $$\frac{D_1 + D_2 + D_3 + D_4 + \ldots D_N}{N} \qquad \text{Equation (2)}$$

Where $D_i$ representing data in the ith cycle. The averaged signal with a signal to noise ratio improved by a factor of $\sqrt{N}$, thereby reducing the minimum controllable force (can use narrow lock-in bandwidth), is shown on FIG. 9C.

Figure 10:
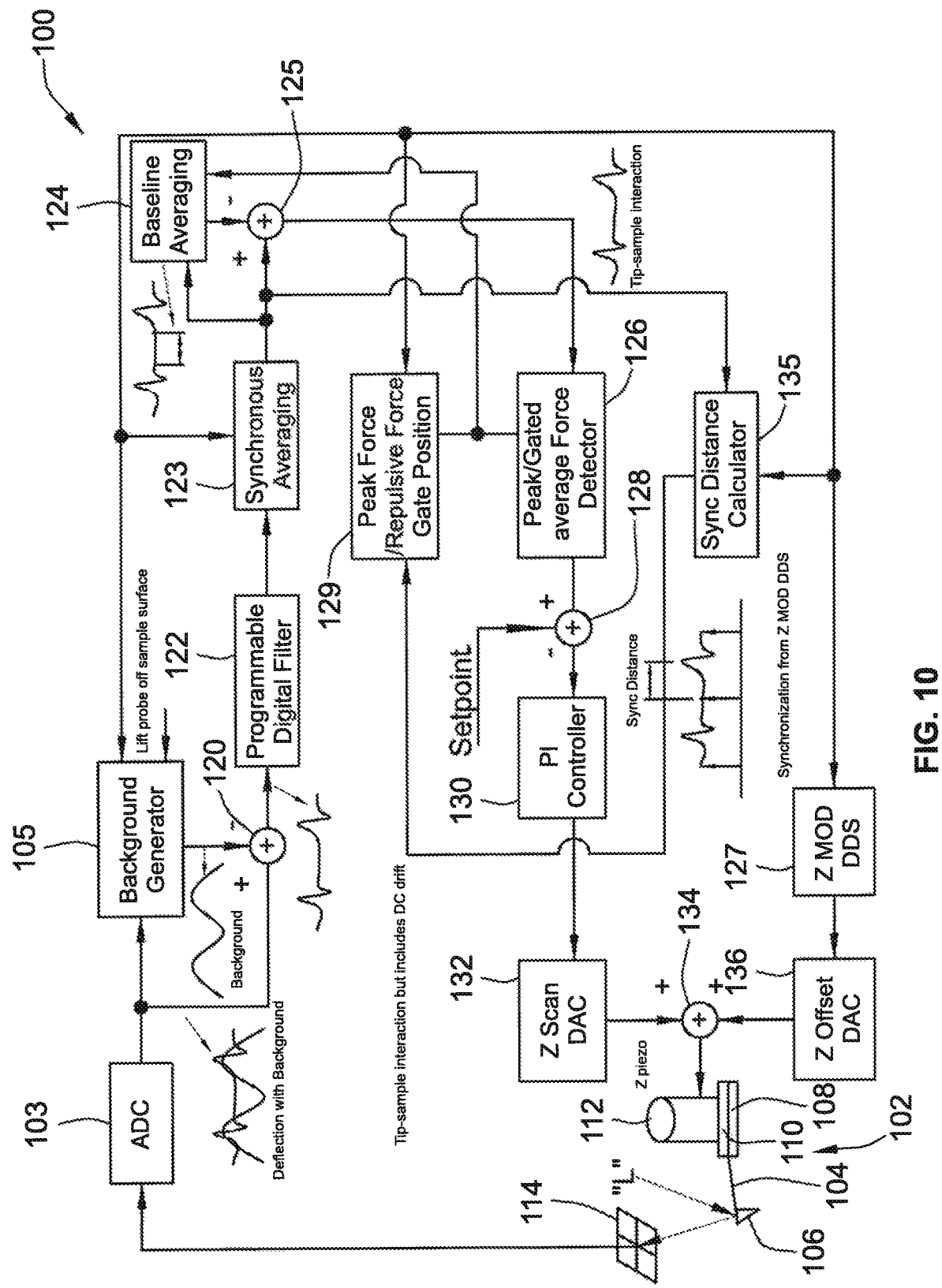
FIG. 10 is a schematic block diagram of an AFM operable in PFT Mode, according to one embodiment.

Turning next to FIG. 10, an AFM 100 operable in PFT Mode includes a probe 102 mounted in a probe holder 108 and having a cantilever 104 supporting a tip 106. In this case, tip-sample separation is modulated by an actuator 112 (for example, an XYZ piezoelectric tube) coupled to the probe holder 108 thereby. However, it should be understood that the preferred embodiments are applicable to those AFM instruments that modulate tip-sample separation by moving the sample in Z.

During operation, probe deflection is measured by bouncing a light beam "L" off the back of the probe and toward a detector 114, such as a four quadrant photodetector. The deflection signal is then transmitted to an analog to digital converter 103. The digitized signal is used for maintaining the tip-sample force low while operating the AFM at high speed.

In the embodiment shown in FIG. 10, probe deflection without tip-sample interaction is transmitted to a background generator 105. The background generator will create a periodic waveform corresponding to the background signal when the tip and sample are not interacting. This waveform can be generated by a DDS (Direct Digital Synthesis function generator) whose amplitude and phase are determined by a lock-in amplifier, and whose input is the background signal. This waveform can also be generated by synchronously averaging multiple cycles of the background with the help of a synchronization signal. A comparator circuit 120 processes the total deflection signal by subtracting the background signal so as to generate a signal representative of tip-sample interaction force independent of the parasitic background (FIGS. 4C and 5C). (Note that, though analog or digital circuitry may be described, it is understood that the operations may be performed in any conventional analog or digital circuitry, though a preferred embodiment utilizes FPGA architecture to implement the invention). This signal is then fed through a digital filter 122 that processes the post-subtraction deflection error to limit the processed ringdown oscillation of the lever to a number of selected cycles. The filtered signal is transmitted to synchronous averaging circuit 123 to further increase the signal to noise ratio. By averaging data in the non-interaction region with the help of synchronization, a baseline is determined from baseline averaging circuit 124. A comparator circuit 125 processes the total deflection signal by subtracting the baseline signal so as to generate a signal representative of tip-sample interaction force with no cantilever DC drift. This signal is further transmitted to a force detector 126.

Sync Distance calculator 135 determines the phase shift between the deflection and the Z modulation DDS (Block 127) that provides the drive and synchronization control in the form of a time delay. Peak force or repulsive force gate position generator 129 generates the timing signal for force detector 126, with the help of the synchronization marker and synchronization time distance. Force detector 126 analyzes the output of summation circuit 125 by either identifying the repulsive peak force or averaged repulsive force within the gated region illustrated in FIG. 8A. Again, by operating force detector 126 this way so force control can be triggered on a selected part of the force curve (e.g., repulsive force region), higher sensitivity is achieved by reducing the effect of the attractive force between the sample and tip. Moreover, signal to noise ratio is improved by excluding noise from the gate of detector 126. The gated repulsive force is then compared to an appropriate setpoint (Block 128), and an error signal is generated and transmitted to a control block (e.g., a PI controller 130). The control signal is then converted to analog (converter 132) and transmitted to a summing circuit 134 for combination with a synchronization signal from Block 127 after the synchronization signal is converted to analog with a converter 136. The output of summing circuit 134 is then applied to the Z-piezo 112 for actuating the z position (in this case, the probe) to maintain essentially steady state interaction between the tip and sample. A corresponding method of operation is described in further detail below in connection with FIG. 13.

Figure 11:
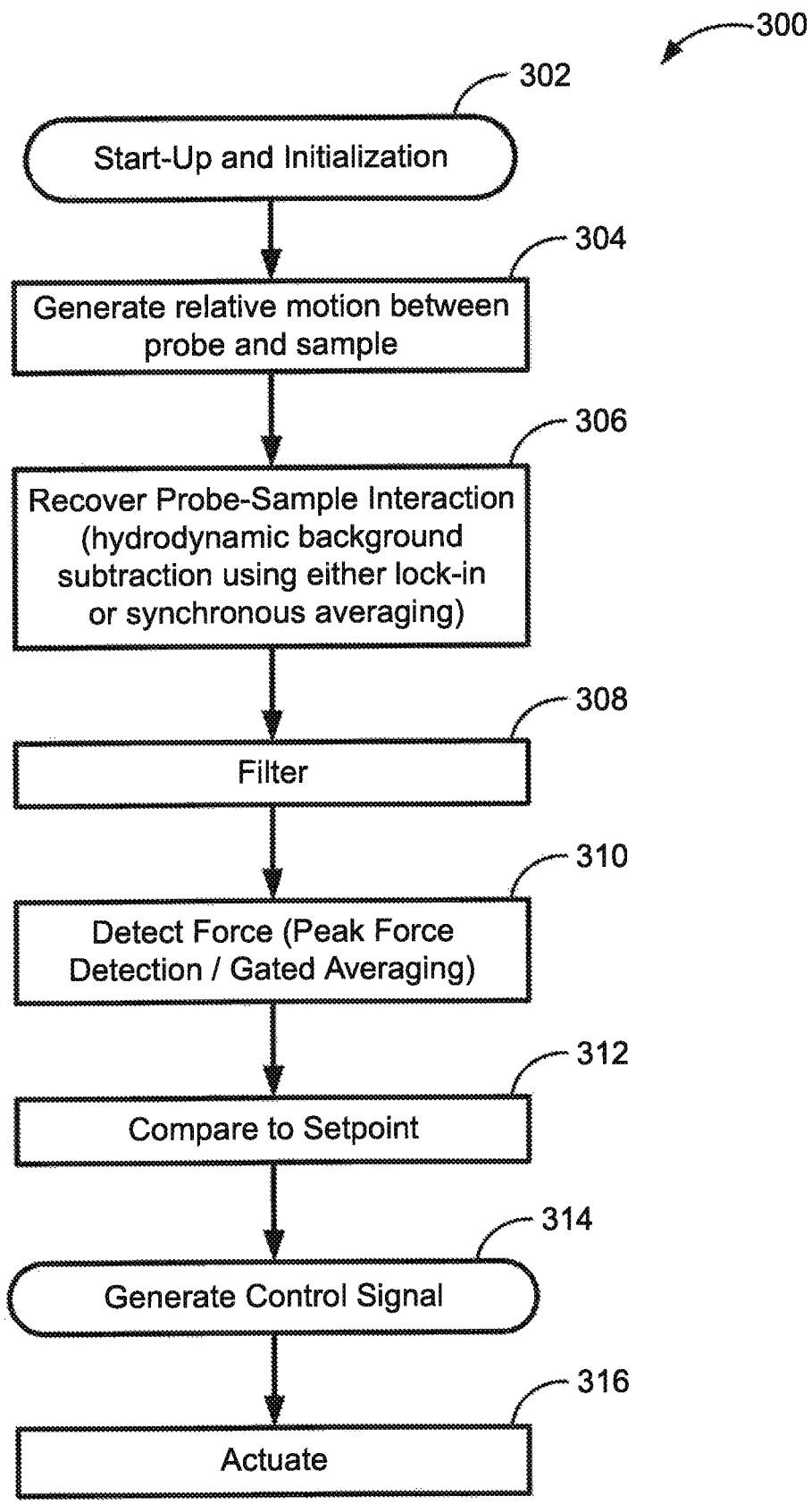
FIG. 11 is a flow diagram illustrating a method according to the preferred embodiments.

Turning to FIG. 11, a method 300 of operating an AFM according to PFT Mode is shown. After a setup and initialization Block 302 (no tuning required), the probe is driven into oscillation and engaged with the sample. Preferably, in Block 304, relative XY motion between the probe and sample is initiated (scanning).

Motion of the probe is then detected; in particular, probe deflection is detected and transmitted to the converter for further processing. In Block 306, the method then operates to recover probe-sample interaction as described above, preferably performing hydrodynamic background subtraction using either lock-in amplification, or more preferably, synchronous averaging of the deflection. After filtering the output in Block 308 (e.g., selecting a number of cycles of ringdown to process), the method detects the force (peak force detection/gated averaging), preferably using the repulsive region of the force curve, in Block 310. In Block 312, the force is then compared to the setpoint force, set according to the user's desired interaction force. The Z-actuator responds to the control signals in Block 316 to adjust tip-sample separation and maintain the setpoint force, with the control signals being used to generate an image of the sample.

Figure 12A:
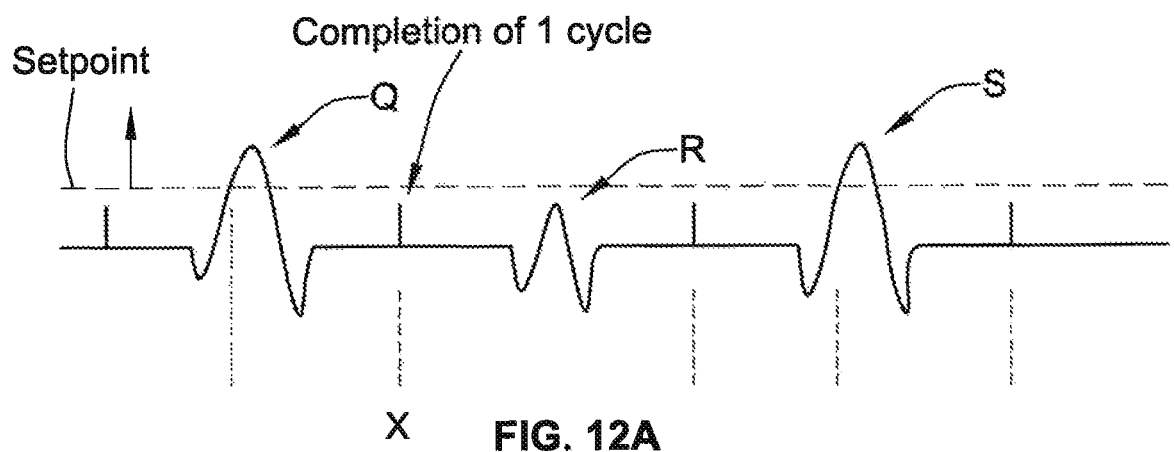
FIG. 12A is a schematic graph of a force curve illustrating the system setpoint and measured deflection.
Figure 12B:
FIG. 12B is a schematic illustration of the feedback error produced according to prior art methods that control AFM operation by triggering on force after completion of one modulation cycle.
Figure 12C:
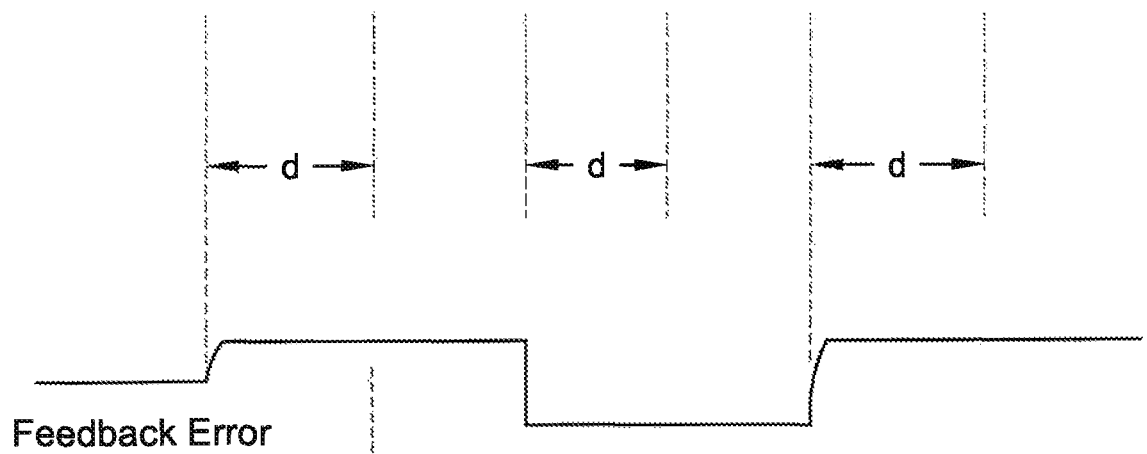
FIG. 12C is a schematic illustration of the feedback error, similar to FIG. 12B, according to the preferred embodiments of the present invention.

Turning to FIGS. 12A-12C, an illustration of the ability of the preferred embodiments to provide instantaneous force feedback is shown. In FIG. 12A, several schematic force versus time curves are shown with different peak repulsive forces. Notably, interactions Q and S exceed the threshold force defined by the setpoint, while interaction R illustrates a peak repulsive force below that of the setpoint. The feedback error is illustrated as shown in FIG. 12B for prior art force feedback systems. More particularly, once the repulsive force exceeds the setpoint, a delay "d" is shown prior to mapping peak repulsive force at X for the first interaction. This is similar for the interaction labeled S in which the feedback error is not established until well after the point at which the repulsive force begins to exceed the setpoint.

To the contrary, as shown in FIG. 12C, the response to any force larger than the setpoint is detected essentially instantaneously, given less feedback delay due to the features of PFT Mode discussed above, including parasitic background subtraction, baseline averaging and gated average, repulsive force control, preferably in combination with synchronous averaging. By being able to quickly identify forces above the setpoint, the forces corresponding to tip-sample interaction can be minimized, thus providing a significant advantage in terms of AFM operation at high speed and high resolution. And this is especially true for rough samples in which sample surface changes can limit response time and/or resolution.

Algortihms

Figure 13:
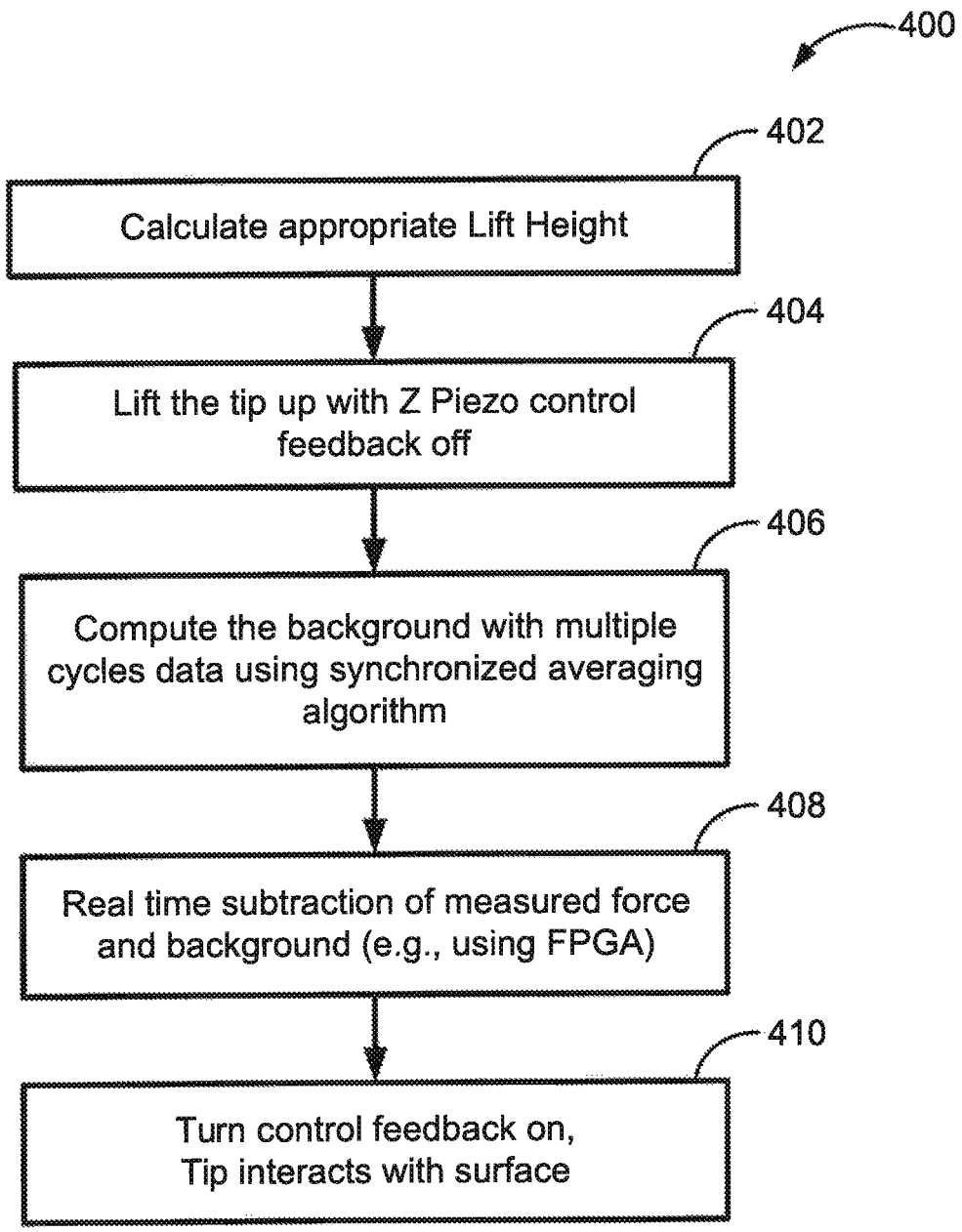
FIG. 13 is a flowchart illustrating a method according to the preferred embodiments illustrating deflection background subtraction.
Figure 14:
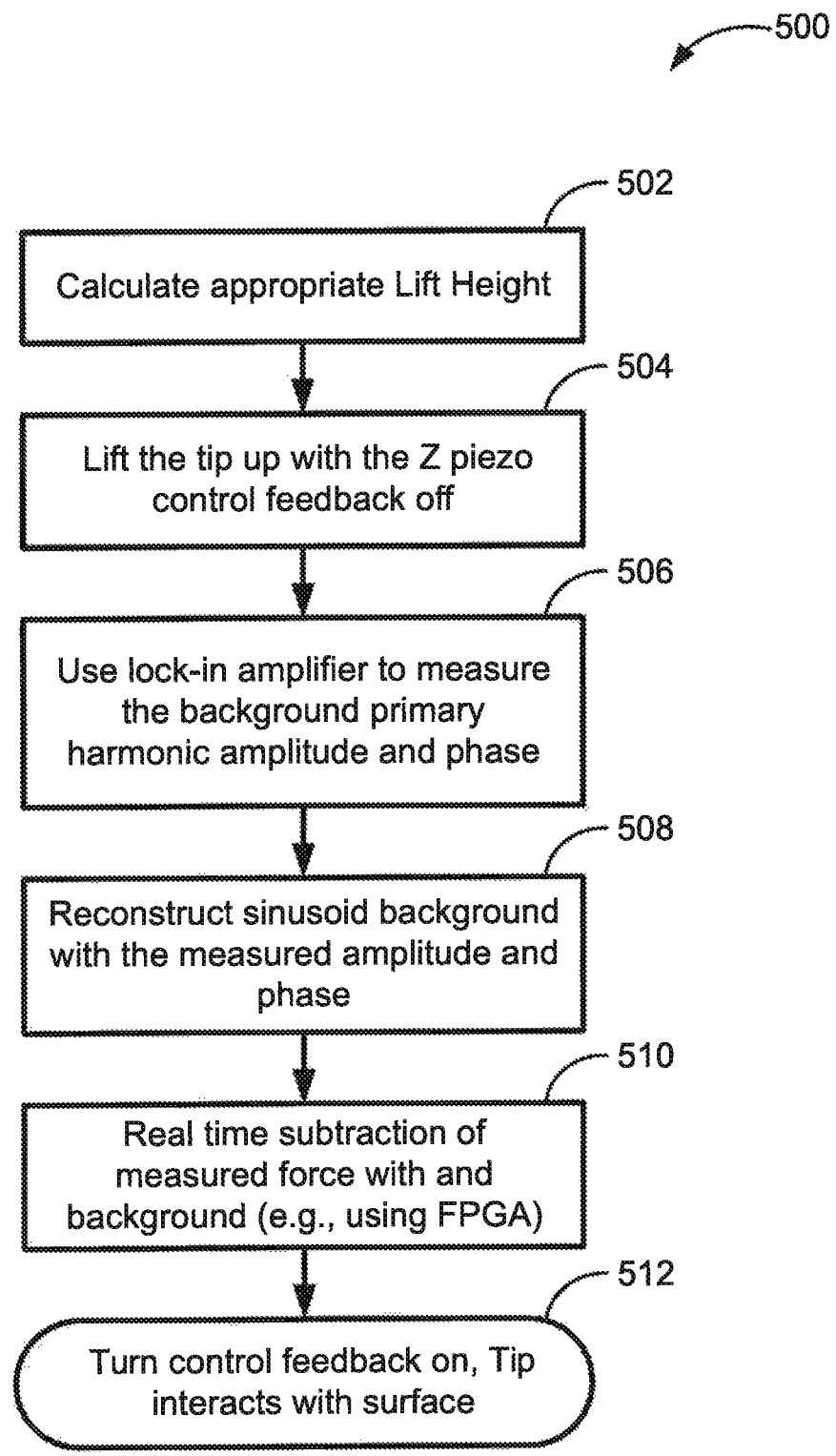
FIG. 14 is a flow diagram illustrating cantilever deflection background subtraction using a lock-in amplifier, according to the preferred embodiments.

To assure accurate subtraction of the background, two schemes have been developed, as shown in FIG. 13 and FIG. 14.

In FIG. 13, an algorithm 400 for the subtraction of cantilever deflection background (parasitic contributions to deflection) is shown. Blocks 402 and 404 assure the tip is far enough away (30 nm, for example) from the sample so that there is no repulsive impulse interaction on the surface, according to a user selection upon set up. Block 406 contains several sub-steps. The AFM system samples cantilever deflection data for multiple cycles and digitizes the data into multiple segments with each segment having a period T. The AFM method aligns each segment of data to the start of the period T, and then averages the data. Next, method 400 uses the averaged segment data as the background for the period T. Block 408 operates to subtract the background obtained from Block 406 from the measured data in each period T using, for example, an FPGA processor. Block 408 uses the background corrected data for feedback.

In FIG. 14, another algorithm 500 for subtracting background deflection is shown. Blocks 502 and 504, calculating lift height and lifting the tip with z feedback off, are used to ensure the tip is not interacting with the sample. Block 506 uses a lock-in amplifier with the drive signal moving the cantilever probe as the reference, and the cantilever deflection data as the lock-in input. In Block 508, the amplitude and phase data obtained from lock-in are used to construct a sinusoidal signal, and this signal is adjusted and used to subtract the deflection data until deflection becomes a constant (within the noise limit). Real time subtraction is performed in Block 510. Once sufficient subtraction is achieved (determined using a constant deflection when the tip is not interacting with the surface), the AFM is able to use the background corrected data for feedback in Block 512.

The background calculated according to FIGS. 13 and 14 varies substantially as the probe approaches the sample surface. Such variation is caused by hydrodynamic force as a function of the probe to sample surface distance. Such variation can also serve as an indicator of the closeness of the probe to the sample before it actually interacts with the sample. With this knowledge, the motorized engaging can proceed at a fast speed until a pre-defined background value is reached; slower engage steps can then be performed.

Figure 15:
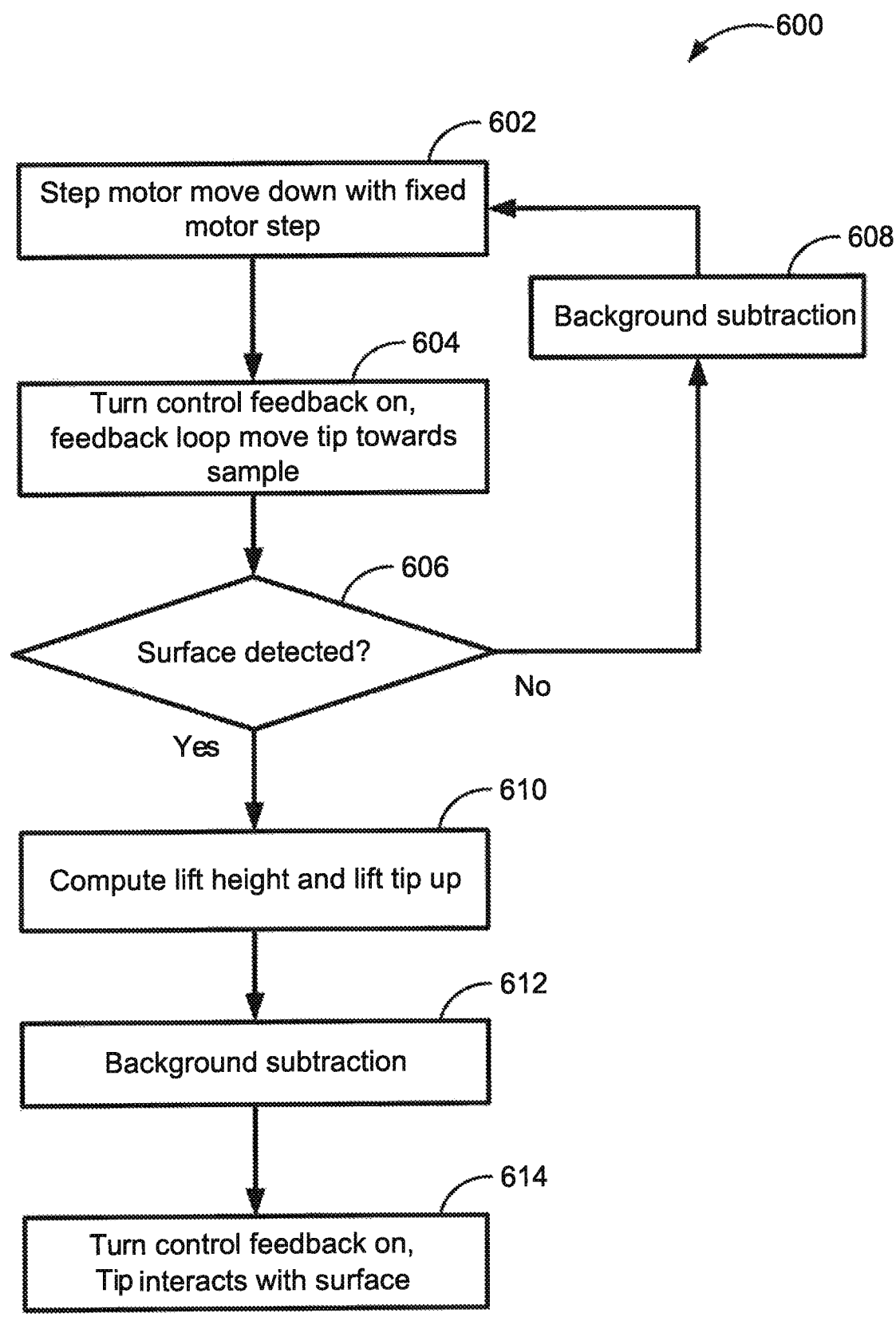
FIG. 15 is a flow diagram illustrating deflection background subtraction in a normal engage process.
Figure 16:
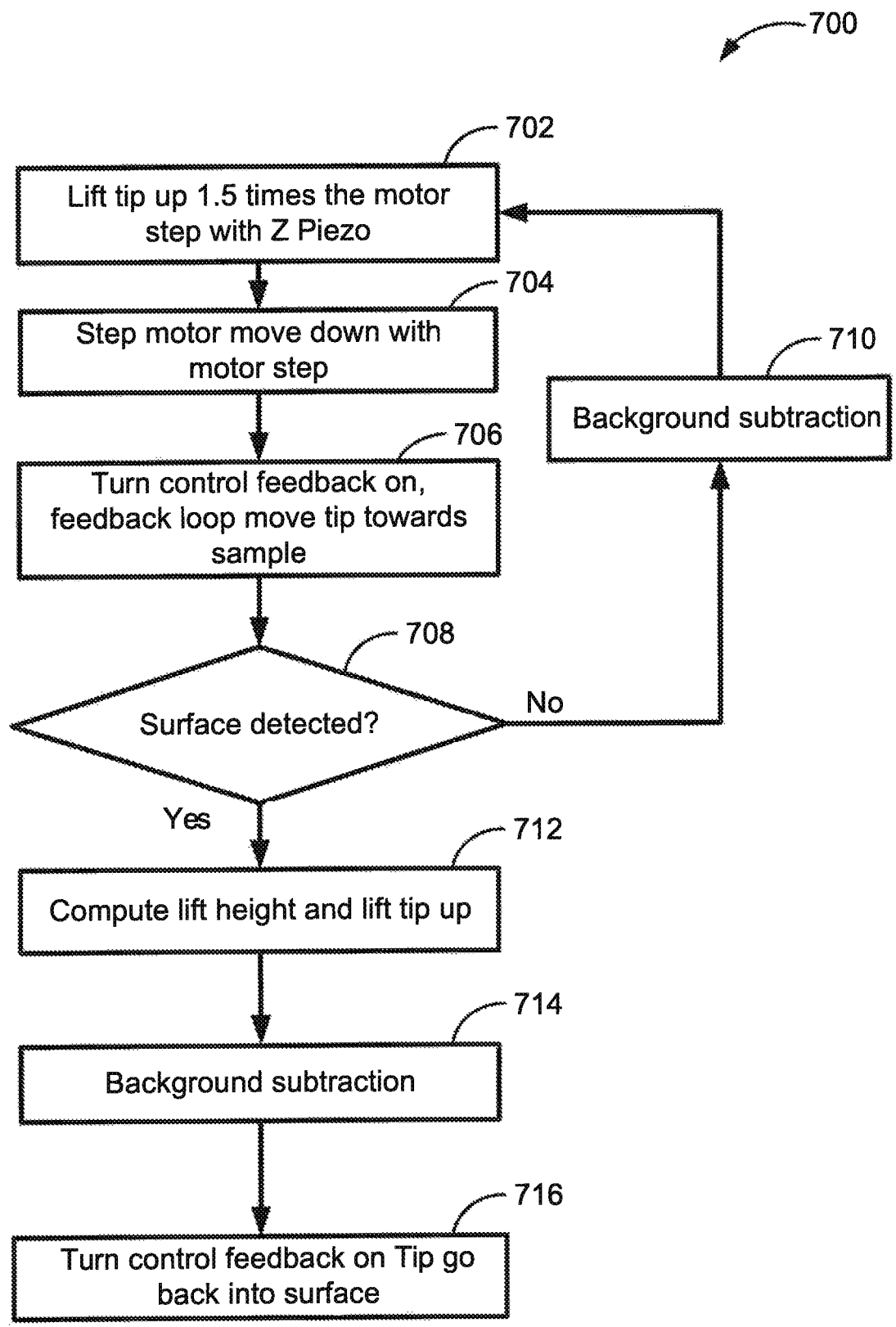
FIG. 16 is a flow diagram illustrating deflection background subtraction in a sewing engage process.

Background subtractions are preferably also executed during engagement of the probe with the sample surface, as shown in FIGS. 15 and 16.

The difference between the two engage methods is that the "normal" engage 600 in FIG. 15 uses a step motor only to drive the probe toward the sample to detect the sample surface. However, FIG. 16 shows a "sewing" engage that moves the probe with the Z-piezo at each motor step as the method 700 searches for the sample surface. Referring initially to FIG. 15, method 600 initially steps, in Block 602, a motor to reduce tip-sample separation according to a fixed step of, e.g., 0.1 nm to about 3 microns. With feedback control on (force detection according to the present techniques), the feedback loop controls the actuator to move the tip, in this case, toward the sample in Block 604. In Block 606, the algorithm determines whether the surface has been detected (i.e., whether the threshold setpoint force has been reached). If not, a background subtraction operation as described above in connection with FIG. 5 is performed prior to further stepping the motor in Block 602. If so, feedback is disengaged, and a lift height is computed by calculating the z movements between peak force and maximum negative adhesion force position, plus a certain margin (for example, 10 nm), and the tip can be raised in Block 610 (e.g., to minimize the chance of crash). Thereafter, in Block 612, a background subtraction operation is performed, and feedback control according to the present techniques is again initiated in Block 614.

In FIG. 16, Blocks 708, 712, 714 and 716 correspond directly with Blocks 606, 610, 612 and 614 of the algorithm 600 of FIG. 15. However, prior to detecting the surface, a sewing engage such as that known in the art is employed to lift the tip in Block 702 prior to stepping the motor down in Block 704; in this case, the lift is 1.5 times the motor step. The amount of lift may be user-selected based on type of sample, etc. Thereafter, feedback is turned on in Block 706 to detect force according to the present techniques. If the surface is not detected, the algorithm 700 performs a background subtraction in Block 710 (similar to Block 608) prior to conducting another lift in Block 702. Once the surface is detected, the SPM can image the sample in Block 716.

Figure 17:
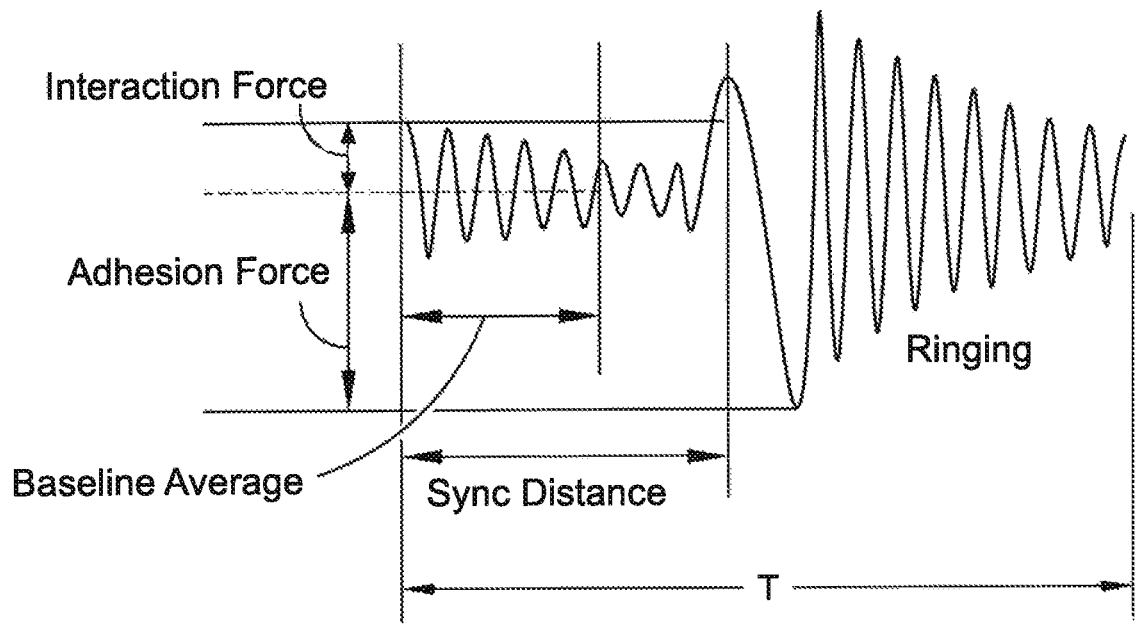
FIG. 17 is a graph of force versus time illustrating baseline calculation according to the preferred embodiments.

FIG. 17 illustrates a practical situation of the tip-sample interaction, and provides a supplemental discussion to the above in connection with FIG. 6. The real tip-sample interaction occurs only in the vicinity of the Sync Distance marker. In the interaction free region there is a residual self-oscillation of the cantilever due to break-off of the adhesion force (aka, ringdown). Such oscillation causes baseline fluctuation, rendering the same fluctuation of $\delta F_r$ shown in FIG. 3. Such variation will become controller noise. In order to minimize baseline fluctuation, the data marked as within the "baseline average" region are averaged into a single constant, represented by the dashed line. This constant data is used as the baseline in calculating $\delta F_r$ in each feedback cycle. The region for "baseline average" can vary depending on the data quality. It needs to be smaller than the Sync Distance to avoid averaging the real tip-sample interaction occurring at about the Sync Distance.

Figure 18:
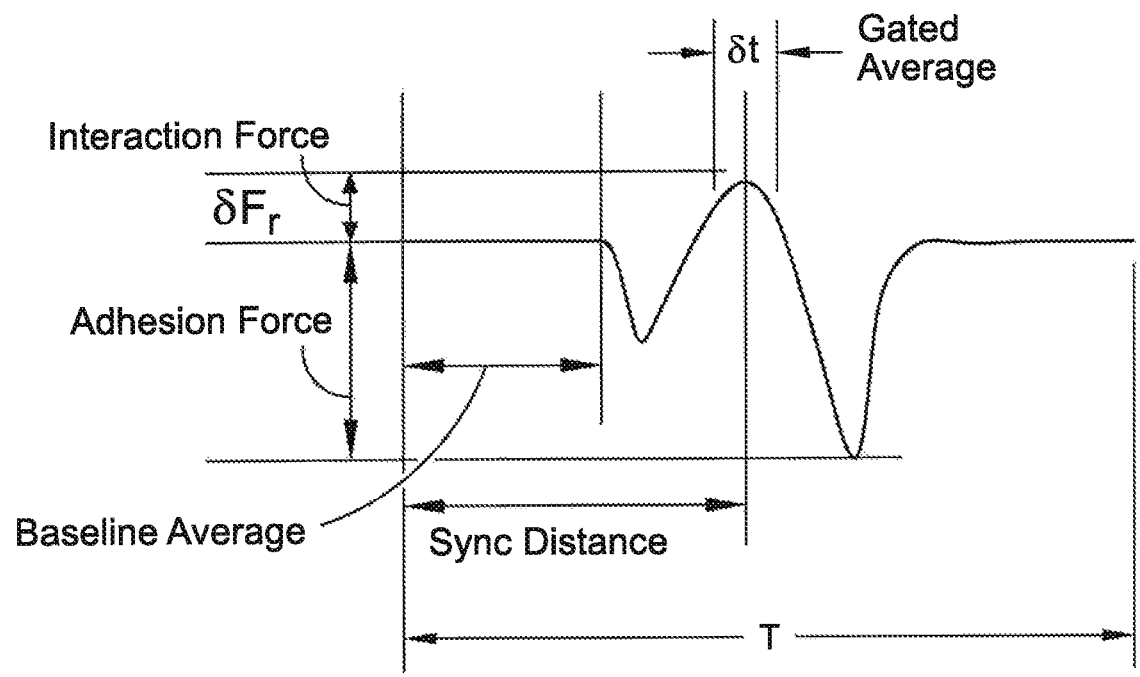
FIG. 18 is a graph of force versus time illustrating an algorithm used to determine instantaneous interaction force.

The instantaneous interaction force can be determined by using the force $\delta F_r$ calculated by Equation (1), in which $F_{r\_i}$ can be an instant value at the Sync Distance. As illustrated in FIG. 18, it can also be a value determined through a gated average (see also FIGS. 7 and 8A/8B). The gated average scheme uses the deflection values in the time zone $\delta t$ and averages all data points in this time zone. Doing so can substantially improve signal to noise ratio. $F_{r\_i}$ serves as the setpoint in feedback control. It can vary from a value causing negative $\delta F_r$ to a high positive $\delta F_r$. A high positive number for $\delta F_r$ means stronger repulsive interaction with the sample.

Figure 19:
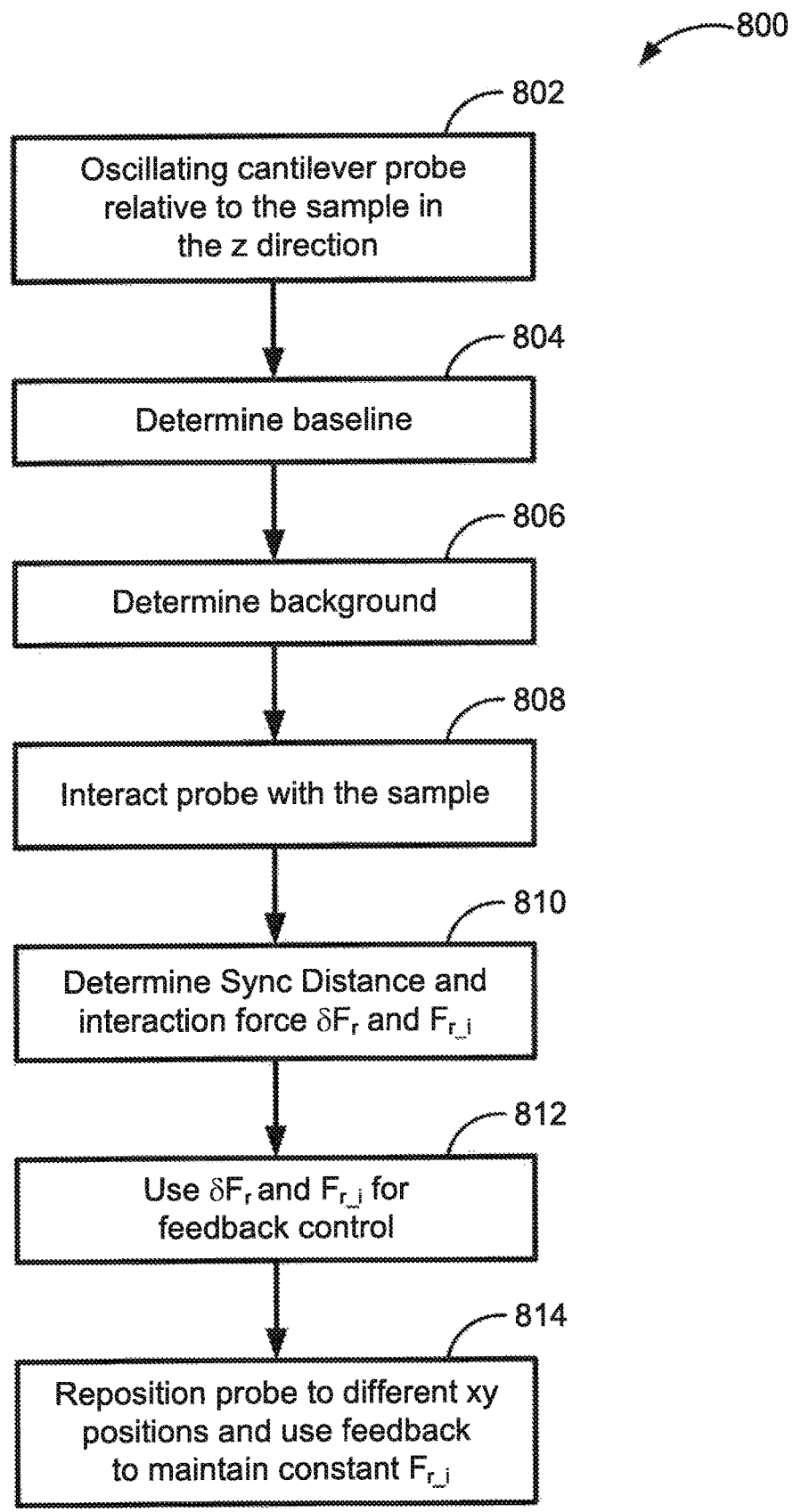
FIG. 19 is a flow diagram illustrating a method of instantaneous force control imaging.

FIG. 19 illustrates a procedure 800 of instantaneous force control used for Peak Force Tapping® (PFT) imaging. In Block 802 an actuator oscillates the probe or the sample, producing relative motion with an amplitude in the range of 0.1 nm to 3 μm, peak-to-peak. At this point, the tip is relatively far away from the sample, and a baseline and background can be determined in Blocks 804 and 806. Once the background is determined, it is also subtracted from the detected deflection in Block 806 to insure the minimum detectable force is as small as possible. Block 808 operates to interact the probe with the sample by an engage, as detailed in FIGS. 15 and 16. Once the sample is interacting with the probe, the deflection data in a period T is sampled and digitized to analyze Sync Distance (FIG. 18), instantaneous force $F_{r\_i}$ and relative force $\delta Fr$ in Block 810. The baseline and background can be re-checked according to FIG. 14 at this Block.

Feedback is then used to maintain $\delta F_r$ and $F_{r\_i}$ at the preset value in Block 812. The XY scanner is also enabled, Block 814, to reposition the probe relative to the sample and eventually generate a topographic image, as well as one or more mechanical images indicative of, for example, elasticity, adhesion, and energy dissipation.

Figure 20A:
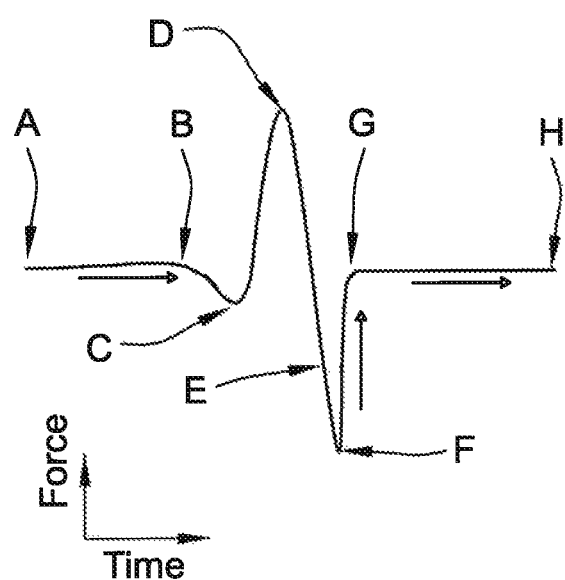
FIGS. 20A and 20B are graphs illustrating force versus time and z position respectively, when using instantaneous force control imaging according to the preferred embodiments.
Figure 20B:
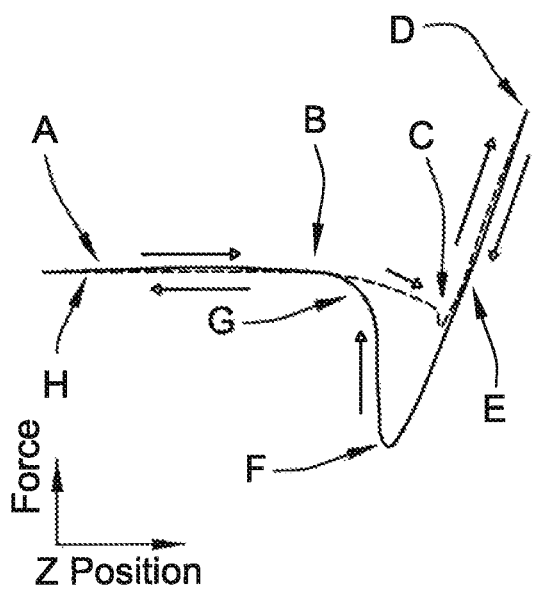

In FIG. 20 the measurement time resolved curve in FIG. 20A is converted to real space data in FIG. 20B. More particularly, FIG. 20A is a plot of the interaction force as a function of time in one modulation period. FIG. 20B is the interaction force as a function of tip-sample distance in one modulation period. The elastic property of the material can be calculated conventionally by using the upper part of the slope (see segment DE in FIG. 20B; segments CDE illustrate short range repulsive interaction) using, for example, the Oliver-Pharr model, or another contact mechanical model (see, e.g., Oliver W C and Pharr G M 2004 *Measurement of Hardness and Elastic Modulus by Instrumented Indentation: Advances in Understanding and Refinements to Methodology J. Mater. Res.* 19 3-20-2004). The Van der Waals attraction force can be determined from the approaching curve (segment BC in FIGS. 20A and 20B), while capillary adhesion, which occurs when the tip departs from the sample, can also be calculated. (see, e.g., "*Theoretical Investigation of the Distance Dependence of Capillary and Van der Waals forces in Scanning Force Microscopy*", Stifter et al., *Physical Review B*, Vol. 62 No. 20, Nov. 15, 2000). By moving the tip in the xy-plane, and repeating these measurements sample properties such as elasticity, Van der Waals adhesion, capillary adhesion (segment EF corresponds to attraction and capillary forces) can be imaged for the entire sample surface, or some part thereof. Furthermore, from the difference of the approaching curve and retrieving (departing) curve, the hardness of the sample can also be imaged.

Figure 1:
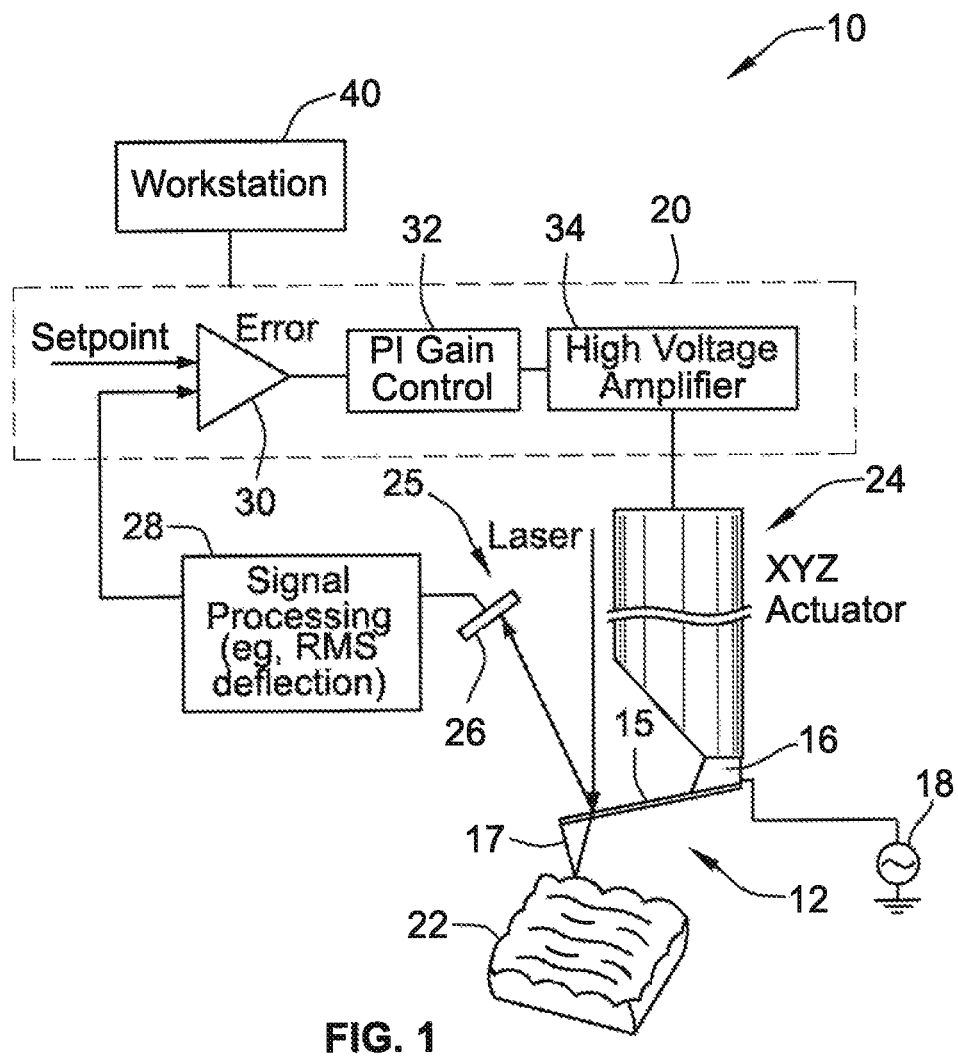
FIG. 1 is a block diagram of a conventional atomic force microscope, appropriately labeled "Prior Art"

FIG. 20B represents two types of data, namely direct measurement data and derived data. Direct measurements data are parameters, such as interaction force that are determined instantaneously within each cycle. The derived data are calculated data within each interaction cycle from any part of the curve. Such data can be deformation, which is calculated by the penetration depth from point C to point D in FIG. 20B. Another example is the dissipation energy defined by the area enclosed in the approaching curve (BCD) and withdraw curve (EFG). Yet another example is the adhesion force calculated through the difference between B and F in FIG. 20B. Any of the derived data can be used as the feedback control parameter. For example, when the deformation is chosen as the feedback parameter, the control loop in FIG. 1 will produce an image based on a constant deformation, instead of constant peak force. Any other derived data can serve the same purpose in the feedback loop.

Figure 21A:
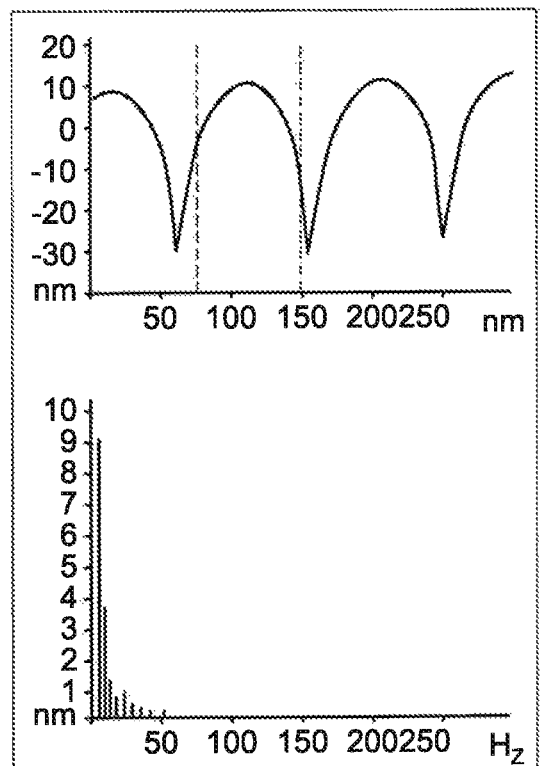
FIGS. 21A and 21B are AFM images illustrating deep trench measurements using TappingMode™ AFM and instantaneous force control mode according to the preferred embodiments.
Figure 21B:
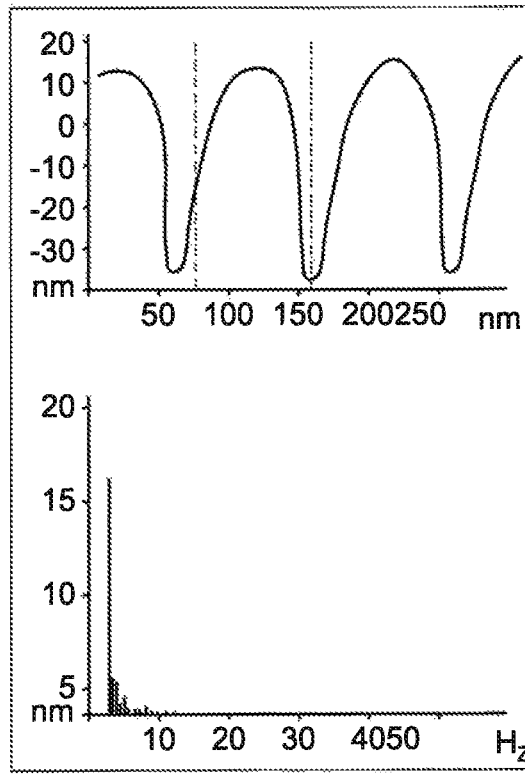

One important application of the instantaneous force controlled imaging is in deep trench measurement. When TappingMode™ AFM is used to image deep trenches (aspect ratio of about 3:1 or more, with the most difficult trenches to image having sub-100 nm width, typically 10 nm-100 nm) the strong attractive force at the side walls can cause amplitude change, resulting in a false measurement of the trench depth. Using direct repulsive force as feedback, the feedback only responds to z-change when the tip is in contact with the sample. As a result, the force controlled feedback can measure deep trenches much more reliably than TappingMode™ AFM. FIGS. 21A and 21B provide a demonstration of this measurement. The measurement uses the same probe and sample at the same sample location. The instantaneous force control feedback loop was able to give a real trench depth measurement with the tip reaching the trench bottom (FIG. 21B). TappingMode™ AFM, on the other hand, moved the tip prematurely, yielding a much shallower depth measurement and no trench bottom was measured (FIG. 21A).

Figure 22A:
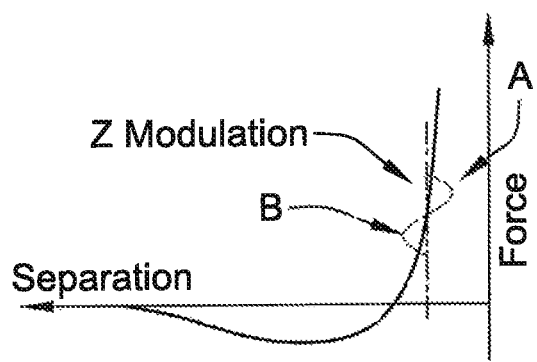
FIG. 22A is a graph of force versus tip-sample separation, illustrating small amplitude repulsive force mode (SARF) according to the preferred embodiments.
Figure 22B:
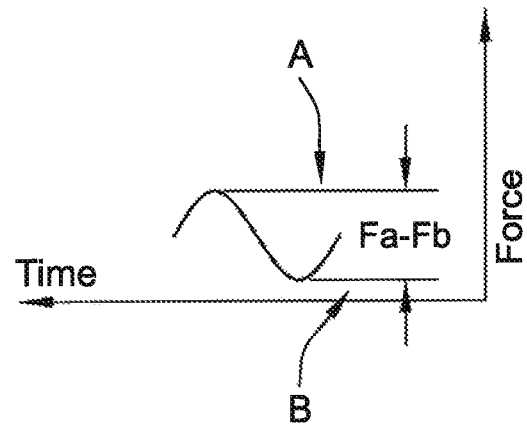
FIG. 22B is a graph illustrating force versus time for the SARF mode.

Referring finally to FIGS. 22A/22B and 23A/23B, additional features of the present invention are described. In FIGS. 22A and 22B, the AFM is operated to modulate Z at an amplitude small enough (e.g., sub-nanometer) to make sure that tip-sample interaction always stays in the repulsive force zone (Small Amplitude Repulsive Force Mode), i.e., a few nanometers away from surface. This is accomplished by using either peak-to-peak force difference ($F_a-F_b$, corresponding to the peak-to-peak Z modulation), or amplitude output of a lock-in amplifier, as feedback. The feedback parameter is proportional to the repulsive force gradient if the amplitude is small enough in which case the force gradient is linear. In this case, feedback is only sensitive to short range chemical bonding forces, forces corresponding to atomic resolution. As a result, the present technique is ideal for high resolution imaging.

Figure 23A:
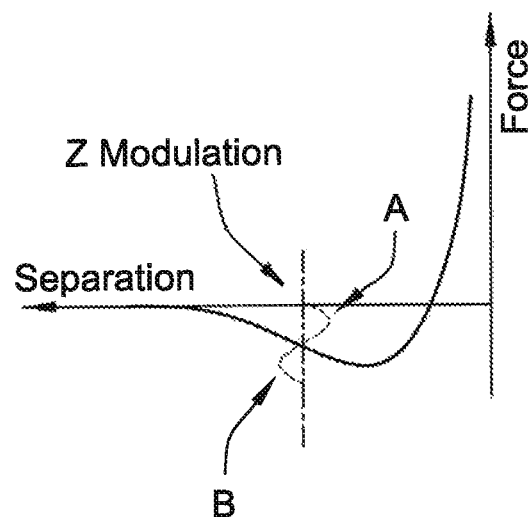
FIG. 23A is a graph of force versus tip-sample separation, illustrating small amplitude attractive force mode (SAAF) according to the preferred embodiments.
Figure 23B:
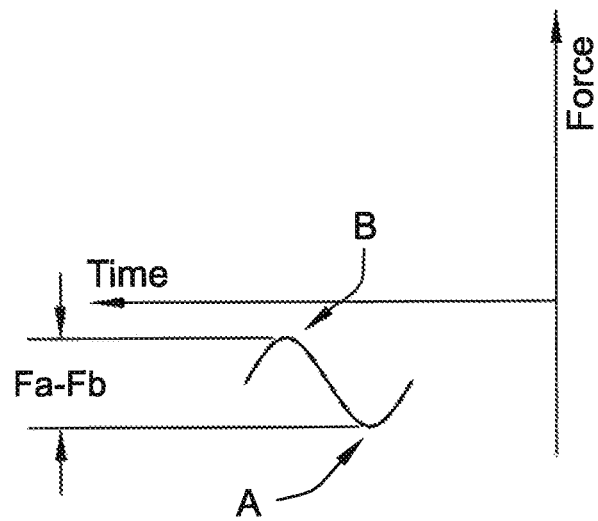
FIG. 23B is a graph illustrating force versus time for the SAAF mode.

In FIGS. 23A and 23B, a similar arrangement to that shown in FIGS. 22A/22B is shown, but the attractive force portion of the force curve is employed (Small Amplitude Attractive Force Mode). In this case, the system modulates Z at an amplitude that is small enough to make sure tip-sample interaction stays in the attractive force zone all the time. Again, either simple peak-to-peak force difference ($F_a-F_b$), or amplitude output of a lock-in amplifier, can be used as feedback given that the feedback parameter is proportional to the attractive force gradient if the amplitude is small enough so that the force gradient is linear. This technique is the least destructive to the sample since the tip does not make contact with the sample. In comparison to the Small Amplitude Repulsive Force Mode, the feedback polarity is inversed.

Advantages—PFT Mode

In sum, the benefits of PFT Mode AFM operation are numerous. Given the inherently stable long term force control, drift-free sample imaging can be achieved along with simultaneous height, stiffness, adhesion, elasticity and plasticity mechanical property measurements at Tapping-Mode™ speeds. Because the technique is not impacted by DC drift (PFT mode creates its own reference every few hundred microseconds), steady operation is not compromised even without an expert operator. This allows the SPM to run for hours, even days (large samples-long time) without substantially compromising image integrity, particularly useful for in-process measurements, like crystal growth and monitoring polymer phase change, which can take several minutes or hours. Notably, a Peak Force Tapping® image can be generated at an operating bandwidth greater than 2 kHz. TappingMode™ bandwidth is about 1 kHz, primarily because cantilever dynamics control speed, e.g., it takes at least several milliseconds to stabilize to return to resonance (greater the amplitude error, the slower). The disclosed embodiments can also eliminate phase interpretation problems because it independently measures elasticity, adhesion, energy dissipation, etc. All these factors contribute to the phase of cantilever oscillation.

Moreover, PFT Mode is insensitive to cantilever dynamics because there is no need to wait for complete cantilever ringdown once the probe releases from the sample. This allows for high speed imaging in vacuum and also allows for arbitrary choice among cantilever options. This difference allows mapping over several orders of magnitude of interaction force, while repulsive force resolution can be used to produce artifact free cellular imaging.

The fact that PFT Mode does not have to operate at the resonance frequency of the probe offers a major advantage when imaging in fluid. Due to various parasitic coupling forces in fluid, cantilever tuning is a key issue in obtaining a fluid image. PFT Mode completely removes the need to tune the cantilever (baseline averaging, background subtraction, etc.). Furthermore, the range of force control and the ability to use a cantilever having a much wider spring constant range (typically, greater than 0.3 N/m for TappingMode™ AFM only, while PFT Mode can use cantilevers having spring constants as low as 0.01 N/m) gives imaging control much more room for biological sample imaging.

Again, this is due to the fact that PFT Mode does not depend on the oscillation energy stored in the cantilever to overcome capillary adhesion forces. Because the technique utilizes an external actuation element (of the feedback circuit, preferably triggering on peak force), the mechanism to overcome the capillary forces is far more powerful than in TappingMode™ wherein the static elastic energy of the cantilever itself (fed by the kinetic energy of the oscillating probe) pulls the tip away from the sample in overcoming the capillary forces. As a result, there is virtually no limitation on the cantilever spring constant to operate stably in presence of a capillary layer. PFT Mode therefore enables stable tapping control operation using a cantilever having a spring constant at least as low as 0.01 N/m.

Yet another benefit of the peak force tapping control is the ability to use cantilevers from 0.01 N/m to 1000 N/m in one mode of AFM operation. It enables high resolution mechanical property mapping of the broadest range of materials on a single instrument from 10 kPa to 100 GPa in elastic modulus.

In addition, given essentially instantaneous force feedback, tip crashing is virtually eliminated. Also, because the deflection is hydrodynamically corrected, no tuning is typically required, and therefore fast, ready setup by virtually any user can be accomplished.

When compared to existing modes of AFM operation, the low force high speed imaging provided by PFT Mode in combination with the low average tracking force and the virtual elimination of lateral forces on the tip, provide a significant advance in high speed imaging over a wide variety of samples. For example, single molecule elasticity can be measured, as well as narrow DNA samples in fluid (e.g., 2 nm wide DNA). By comparison, when imaging DNA in fluid, TappingMode™ AFM has at least a 2 nm lower resolution. Moreover, measuring DNA stiffness in fluid is challenging with TappingMode™ AFM because it does not have property quantification capacity, it primarily is only able to provide relative mechanical property measurements (for example, by looking at contrast in phase images). With the present technique, property measuring down to the molecular level can be achieved.

In the end, PFT Mode can acquire data as good as or better (a resolution [e.g., less than a 100 nm, and more preferably less than about 1 nm laterally], etc.) than that acquired in TappingMode™ AFM without damaging the tip and/or the sample. The technique provides significant speed improvement over other known force feedback techniques, and does so without requiring the use of a small lever. In fact, a rather large lever (>60 µm long) can be operated at sub-resonance in PFT Mode so that the lever response has a bandwidth far beyond that achievable when using a so-called small cantilever (>10 kHz).

Of course, an additional benefit of the present preferred embodiments is that a force curve is generated with every pixel so that the image provides information beyond a typical TappingMode™ AFM image. With every pixel, the user can obtain quantitative information regarding stiffness, adhesion, elasticity, plasticity, etc. And again, because baseline tip-sample separation is re-zeroed with every pixel, drift is minimized so that a large improvement in productivity and image reliability is realized.

In review, the present PFT Mode provides very low force imaging to provide very high resolution using real time property mapping (i.e., instantaneous force control). The force control is inherently stable (essentially drift free), over a term sufficiently long to image a sample with minimal or no user intervention. The system allows faster, simpler set-up because no tuning is required (baseline averaging and hydrodynamic background correction). Moreover, precise control over force basically eliminates tip crash, while the technique/system also essentially eliminates lateral force on the sample surface. The system is also insensitive to cantilever dynamics by not having to wait for probe ringdown before interacting the probe with the sample once it releases from the sample. And, as discussed, a wide range of cantilevers are available to the user to obtain simultaneous measurements of height, stiffness, adhesion, elasticity and plasticity at TappingMode™ AFM speeds (>2 kHz). The present SPM can image samples such as 2 nm wide DNA in fluid with these characteristics, as well make improved mechanical property measurements such as single molecule elasticity.

PFT Mode—Ease of Use

The preferred embodiments of the present invention use PFT Mode to facilitate use of an AFM by a novice substantially on par with that of an expert user. In contrast to TappingMode™ AFM, which operates by controlling tip-sample interaction based on deviations from, for example, a setpoint amplitude or phase of probe oscillation as the tip interacts with the sample (representing a complex relationship relative to tip-sample forces), PFT Mode controls tip-sample interaction based on tip-sample interaction forces at each point along a cycle of probe modulation in oscillating mode. This direct control of the interaction force simplifies the control and allows the preferred embodiments to minimize the effects of complicating variables, including oscillation harmonics and system oscillation, and thus maintain stability.

Figure 24A:
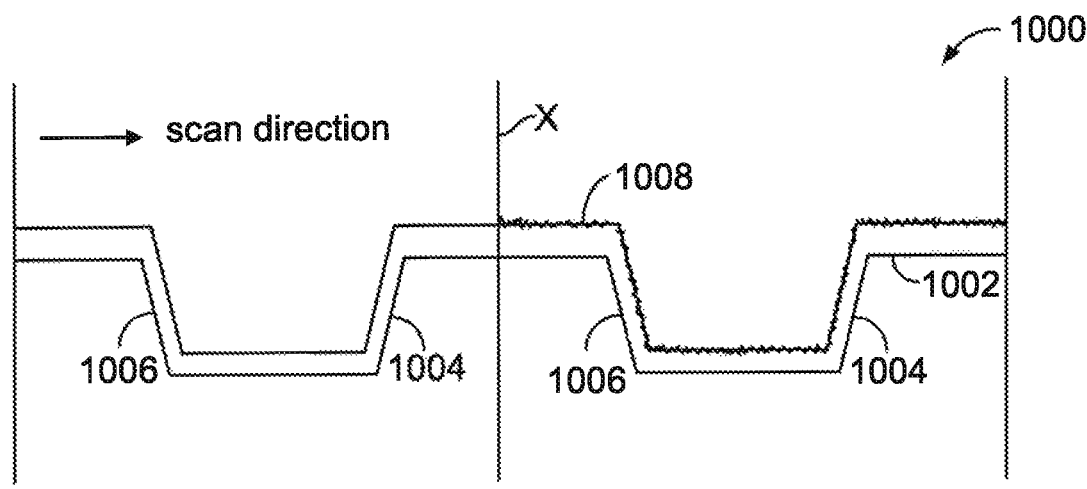
FIG. 24A is a schematic graph of feedback tracking signal versus scan position showing a sample profile and the corresponding tracking signal (height) during AFM imaging, illustrating the difference between stable and unstable feedback.
Figure 24B:
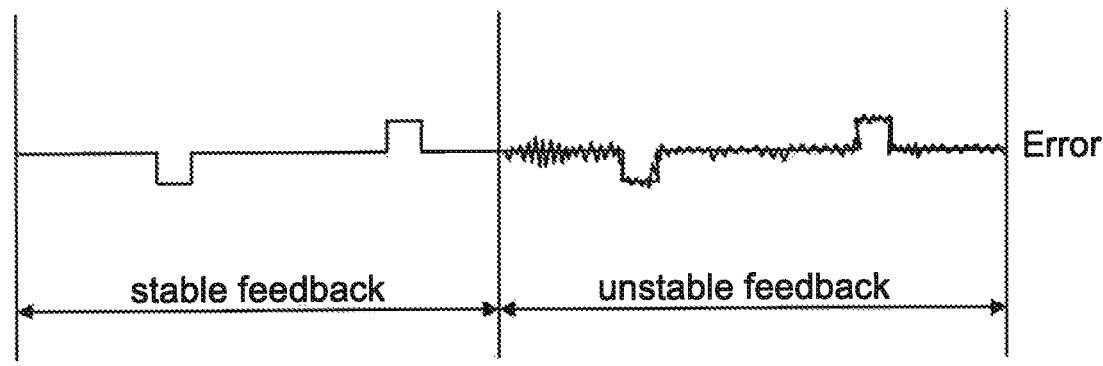
FIG. 24B is a schematic graph the feedback error signal corresponding to the height signal of FIG. 24A.

FIG. 24A shows a schematic graph 1000 of a sample profile (height) 1002 including rising regions 1004 and falling regions 1006. Superimposed on this profile 1002 is a tracking signal or image 1008 obtained by an AFM. As a scan continues in the indicated direction, stable feedback is maintained. Stable feedback refers to a feedback loop that does not tend to be self-excited, i.e., generate oscillatory output regardless of input. At point "X", however, the feedback begins to become unstable, and the image starts to appear noisier. By decreasing feedback gain(s), unstable feedback may become more stable (at a cost—reduced imaging speed, etc.). FIG. 24B is an error signal corresponding to the superimposed tracking signal 1008. Importantly, both the height signal and the error signal of unstable feedback appear noisier than those of stable feedback. This phenomenon will be utilized in the automatic gain scheduling apparatus and method of the present invention described below.

Figure 25:
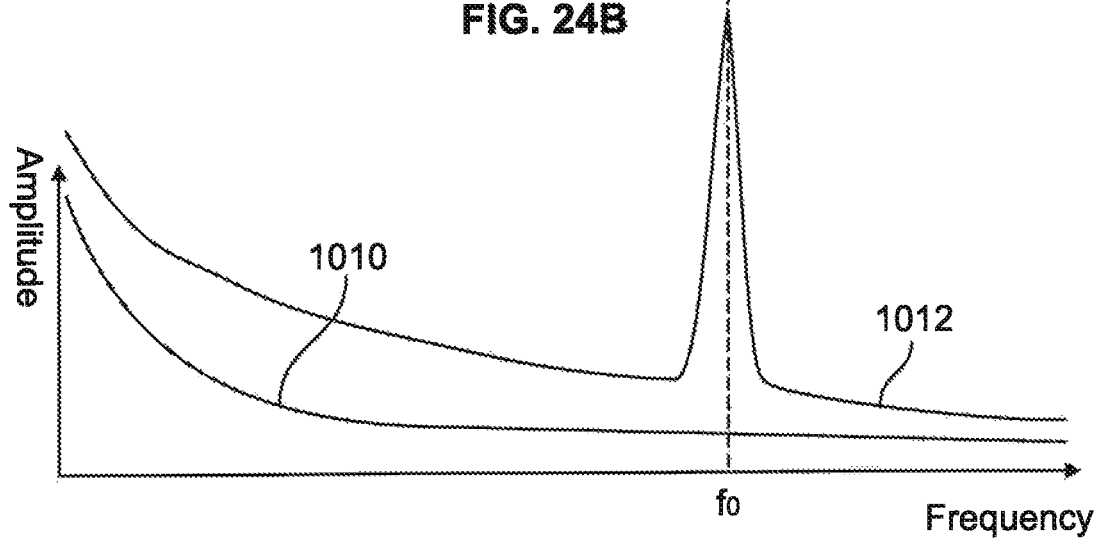
FIG. 25 is a schematic graph of spectrum amplitude versus frequency, illustrating a feedback signal spectrum which is used to detect instability of the feedback loop according to a preferred embodiment.

FIG. 25 illustrates conceptually, using a plot of an amplitude spectrum of the feedback height or error signal, feedback instability detection used by the preferred embodiments. Signal spectra are shown for both stable feedback 1010, and unstable feedback 1012. The feedback instability can be quantitatively measured based on one or more of several criteria. These criteria include, for example, the spectrum amplitude at a certain frequency ($f_0$). Frequency $f_0$ is determined using system identification or from observing the spectrum of the feedback signal when the feedback is unstable. In addition, instability can be quantitatively measured by computing the RMS error, or a standard deviation (see FIGS. 27 and 28 and description below).

Turning to FIGS. 26A-D, an illustration of tip-sample force when the tip loses contact with the sample (also known as "parachuting") is shown. Similar to FIG. 24A, FIG. 26A illustrates a schematic diagram 1020 showing a sample profile 1022 as well as an AFM tracking (height) signal 1024 superimposed thereon. In this case, in the region marked "A", the tip loses contact with the sample surface during the image scan and is parachuting as the control system attempts to return the tip to the sample surface (typically moving either the probe or sample in Z). FIG. 26B shows that, on downward sloping surfaces (1026 in FIG. 26A, for instance), the error signal (the difference between measured tip-sample interaction force and the setpoint) goes negative, causing the control system to attempt to bring the tip and sample back in to contact. In flat regions (1032), the error is zero such that the tip is tracking the surface without correction. On upward sloping surfaces (1030), the error is positive and the control system uses this information to attempt to return oscillation back to the setpoint (typically, by increasing tip-sample separation). In the parachuting region "A" however (corresponding to downward sloping portion 1028 of the sample), the error first indicates a downward sloping portion, but then the tip stops tracking the surface as the tip-sample interaction force goes to zero (see FIG. 26C).

FIG. 26D, showing a zoom on the tip-sample interaction force data, illustrates force curves corresponding to regions of tip-sample interaction (where feedback correction is required), the forces being characterized by an attractive region (snap to contact—Van der Waals forces), a repulsive region as the tip interacts with the surface and continues its cycle of oscillation, an adhesive region as the tip attempts to pull away from the surface, and then a point at which it releases. One advantage of PFT Mode over, for instance, TappingMode™, is that every point on the interaction force curve can be used by the controller to track the surface (without waiting for ringdown prior to driving another cycle of modulation), as discussed at length previously. In the case of a parachuting tip, parachuting can be detected in the presently preferred embodiments by one or more of the following criteria: standard deviation and/or spectrum amplitude at a certain frequency (or frequencies) of feedback error signal is less than a threshold value; feedback error signal is below a threshold value; and/or peak force/adhesion force or peak-to-peak force within an oscillation period is less than a threshold value.

Figure 27:
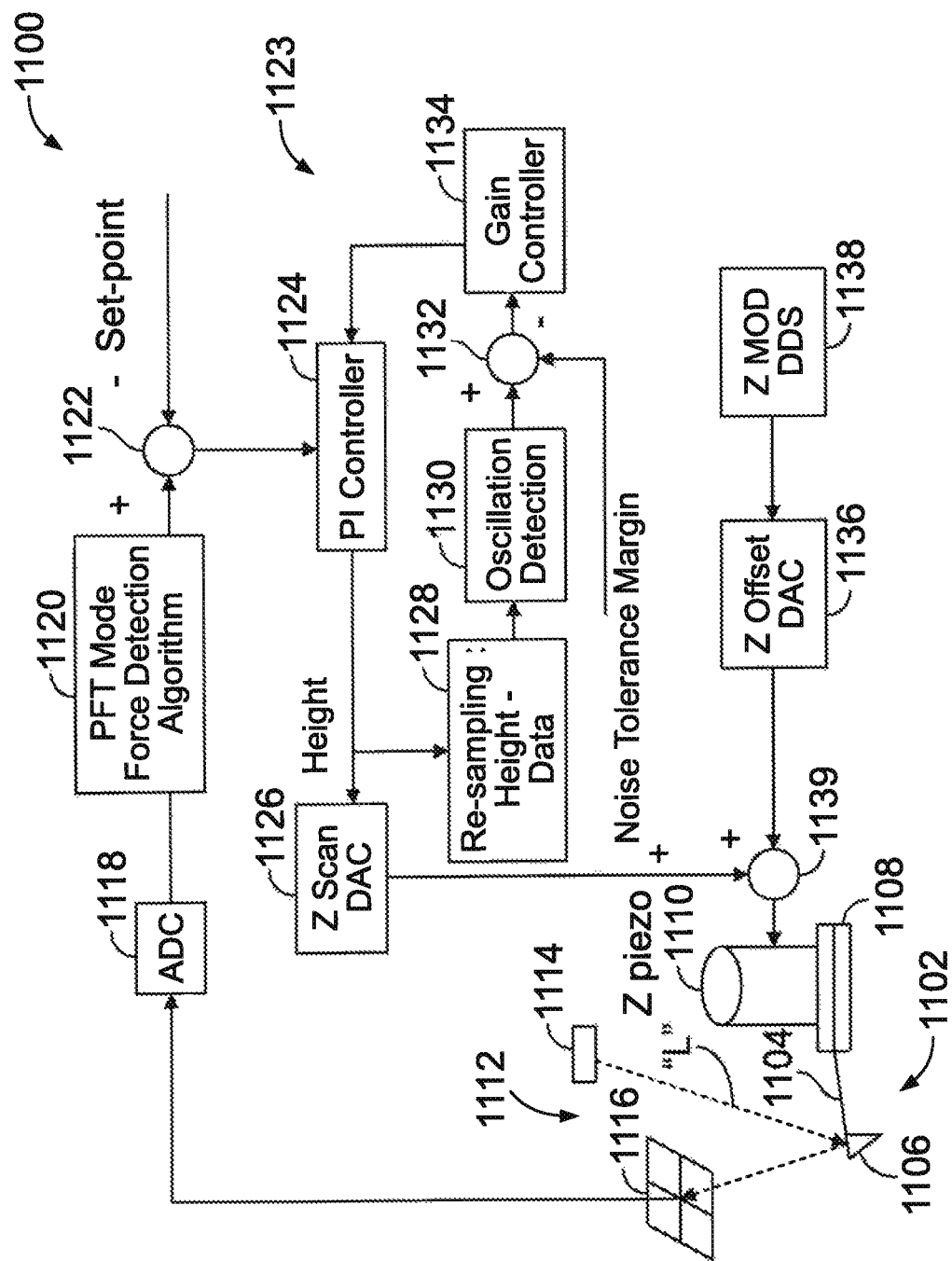
FIG. 27 is a schematic diagram of an AFM according to the preferred embodiments, illustrating gain control in the feedback loop.

An AFM 1100 operable in PFT Mode to minimize the skill required to operate the AFM is shown schematically in FIG. 27. AFM 1100 includes a probe 1102 including a cantilever 1104 supporting a tip 1106. Probe 1102 is mounted in a probe holder 1108 that, in this case, is coupled to an actuator 1110, such as a piezoelectric actuator, that can move tip 1106 of probe 1102 in "Z" (orthogonal to the sample surface). As the probe 1102 interacts with the sample, its deflection is monitored by a deflection detection scheme 1112 including a light source 1114 (e.g., a laser) that directs a beam of light "L" towards the backside of the lever 1104. Lever 1104 reflects the beam "L" towards a detector 1116 (e.g., a quadrant photodetector) that transmits a signal indicative of deflection toward an ADC 1118. After the analog deflection signal is converted to digital by ADC block 1118, the resultant signal is transmitted to a PFT Mode Force Detection block 1120. The resultant force signals (determined according to the above-described apparatus and methods for extracting tip-sample interaction forces point-by-point) are transmitted to a comparison circuit 1122. Preferably, the peak force is compared to the force setpoint, and the error signal is sent to a PI controller 1124. PI controller 1124 outputs a control signal that is transmitted to a Z Scan DAC (digital-to-analog converter) for application to the Z piezoelectric actuator to control tip-sample separation so the force setpoint is maintained.

To facilitate stability, and thus minimize the need for an expert user, the gain is automatically tuned using a gain control circuit 1123. The control signal from PI Controller 1124 used to control the Z piezo 1110 is also transmitted to a block 1128 that re-samples the height data at a position corresponding to, preferably, the peak force (see block 1120). An oscillation detection algorithm 1130 is then employed to determine whether there is oscillation in the height data, i.e., whether there is an onset of instability. If the system is about to oscillate and become unstable, high frequency noise will be detected. The way in which algorithm 1130 determines the amount of noise is described in further detail below in connection with FIG. 28. Oscillation detection algorithm 1130 outputs a signal indicative of the magnitude of the instability, short termed "noise" only for this section. Such instability exhibits itself like noise and is caused by the feedback loop. But it should not be confused with noise in other parts of the system when feedback is not turned on. This noise signal is compared to a noise tolerance margin at summing circuit 1132. The noise tolerance margin is a predetermined parameter associated with the product, it is not sample dependent and it can be adjusted. If the error output of circuit 1132 exceeds the predetermined margin, gain controller 1134 determines an appropriate gain control signal to adjust the gains of controller 1124 by, for example, reducing I gain and P gain in small steps (5%, each iteration, for example) until the magnitude of the instability signal out of 1130 becomes less than the noise tolerance margin. In sum, at each imaging location, the gain may be optimized to ensure system stability.

In operation, the Z Scan control signal output by DAC 1126, and optimized by gain control circuit 1123, is combined with the output of the Z offset DAC 1136 (described further below) and the oscillating drive for PFT Mode provided by a Z modulation DDS (direct digital synthesizer) 1138 at summing circuit 1139. With this automatic gain scheduling active, the need of expert user tuning of the gains during AFM operation is eliminated.

Figure 28:
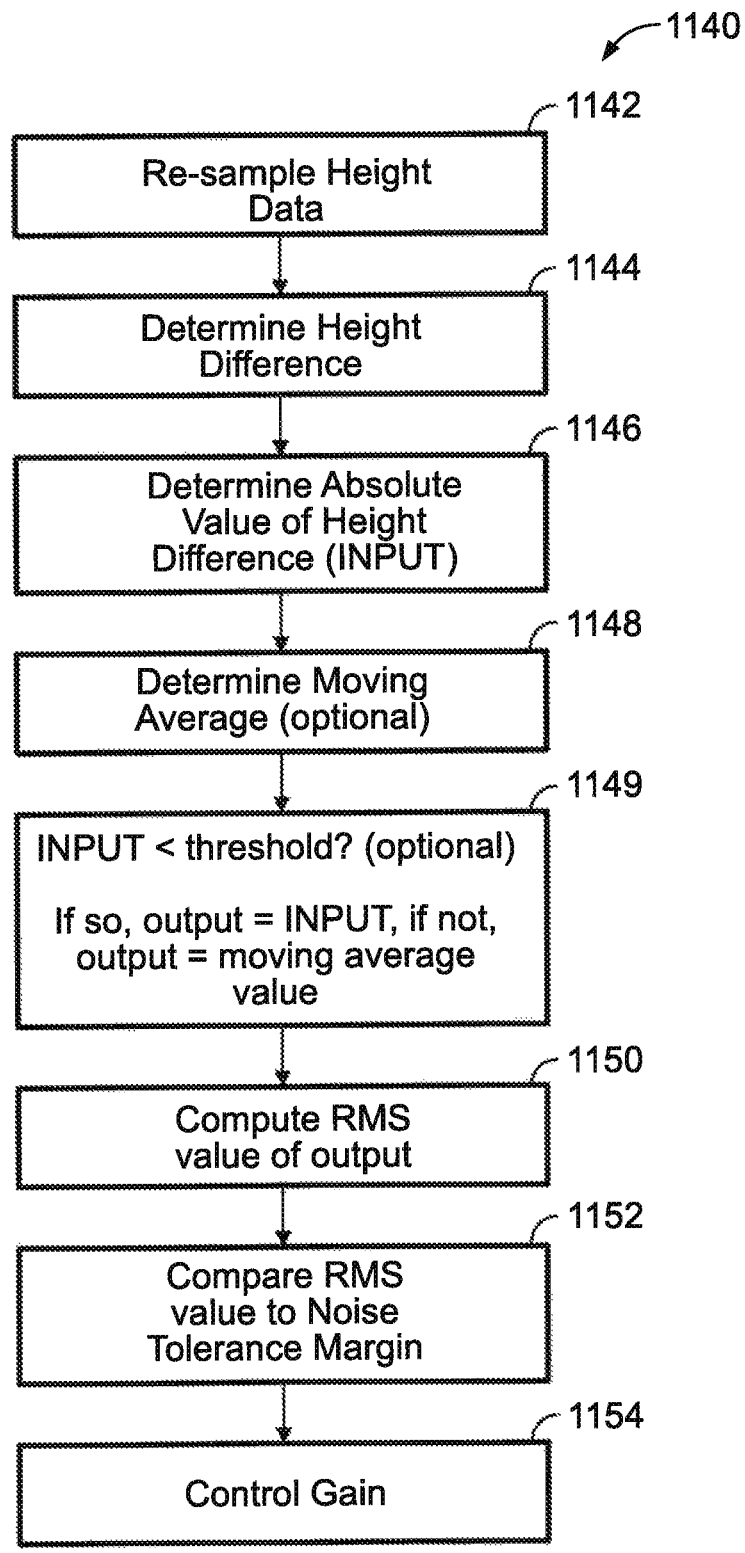
FIG. 28 is a schematic diagram of the oscillation detection algorithm of FIG. 27.
Figure 29:
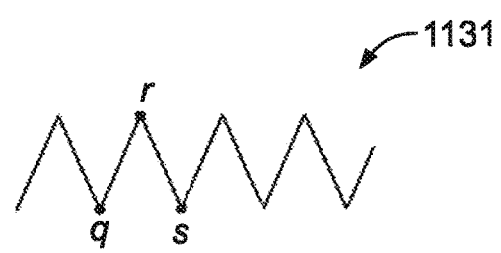
FIG. 29 is a schematic illustration of the data re-sampled and processed by the oscillation detection algorithm of FIG. 28.

One of the critical elements in automated adjustment of feedback gains is the ability to determine instability onset quickly and accurately. This determination is often complicated by unknown topography which may be misinterpreted as the instability induced noise in the gain controller. Turning to FIG. 28, an algorithm 1140 for implementing oscillation detection block 1130 of FIG. 27 is described in further detail. Height information is used to determine the level of instability oscillation because the height is calibrated on any AFM system. A noise tolerance margin is defined as the allowed magnitude of instability induced noise. When this margin is detected using the height signal, such margin provides an absolute value of noise allowed in the feedback system. For example, if the noise tolerance margin is 1 nm, any instability output from 1146 or 1148 is considered acceptable if within this range. For a sample height of 100 nm (range), such margin corresponds to a signal to noise ratio of 100 in the image. However, for flat samples with corrugation less than 1 nm, the noise tolerance margin will be larger than the sample height signal. In such a situation, the noise tolerance margin should be reduced to 0.1 nm to get a reasonably good image (S/N=10). This margin can be self-adjusted based on the sample roughness. The height data obtained during AFM operation reflects both sample topology and system oscillation. In general, algorithm 1140 operates to filter out sample topology in order to determine whether the noise is sufficiently large to indicate an onset of instability. It is important to know that, during scanning, the sample topology usually does not have large changes in adjacent pixels. By calculating the height difference between, for example, three (3) adjacent points, the sample topology can be largely filtered out. This re-sampled height data (1131) is shown schematically in FIG. 29. Though three points such as "q", "r" and "s" are preferably analyzed in the algorithm, more points may be used.

In this regard, referring back to FIG. 28, the height control signal output by PI controller 1124 (FIG. 27) is re-sampled in Block 1142. Re-sampling in this context means extracting the height data points at, preferably, a peak force position of at least three adjacent force curves. In Block 1144, a difference in height between a selected number of data points or pixels is determined. For example, if three points are chosen, the calculation becomes, $$H \text{ Diff}(i) = (H(i-1) + H(i+1) - 2 \cdot H(i))/2 \quad \text{Equation 3}$$

The absolute value of this difference |H Diff(i)| which ideally does not reflect sample topology (and should not), is obtained in Block 1146. This step operates essentially like an oscillation detector. Then, in Block 1148, a moving average may be determined. Determining a moving average is only required for those samples that exhibit significant changes in topology such that the topology might not be filtered out in a given sample used for the height difference calculation. Such samples include, for example, a silicon grating with sharp steps. In such cases, the rapid change in topology is typically short lived. Therefore, by determining a moving average of height differences, which are computed over relatively long periods of time, such spikes should be filtered from the oscillation analysis. More particularly, by comparing the amplitude of the spikes with the moving average data, the spikes are filtered out. And because problematic oscillation noise typically lasts much longer than topology changes, the associated amplitude data tends to be similar to previous moving averaged data.

Continuing with method 1140, in Block 1149, if the absolute value of the difference obtained in Block 1136 is less than some multiple of the moving average, for example, four (4) times the moving average value computed in Block 1148, the output of oscillation detection algorithm 1140 is |H Diff(i)|. If the absolute value of the difference is greater than the multiple, then the output of algorithm 1140 is the moving average value. The RMS value of this quantity is then determined in Block 1150. It is this value that is compared to the "Noise Tolerance Margin" by summing circuit 1152, described above in connection with FIG. 27. Finally, gain control feedback (increasing/decreasing the gain) is determined and transmitted to PI controller 1124 based on the error output of circuit 1132 in Block 1154. Gain is increased if the output of 1130 is lower than Noise Tolerance Margin. Gain is decreased if the output of 1130 is higher than the Noise Tolerance Margin.

Figure 30:
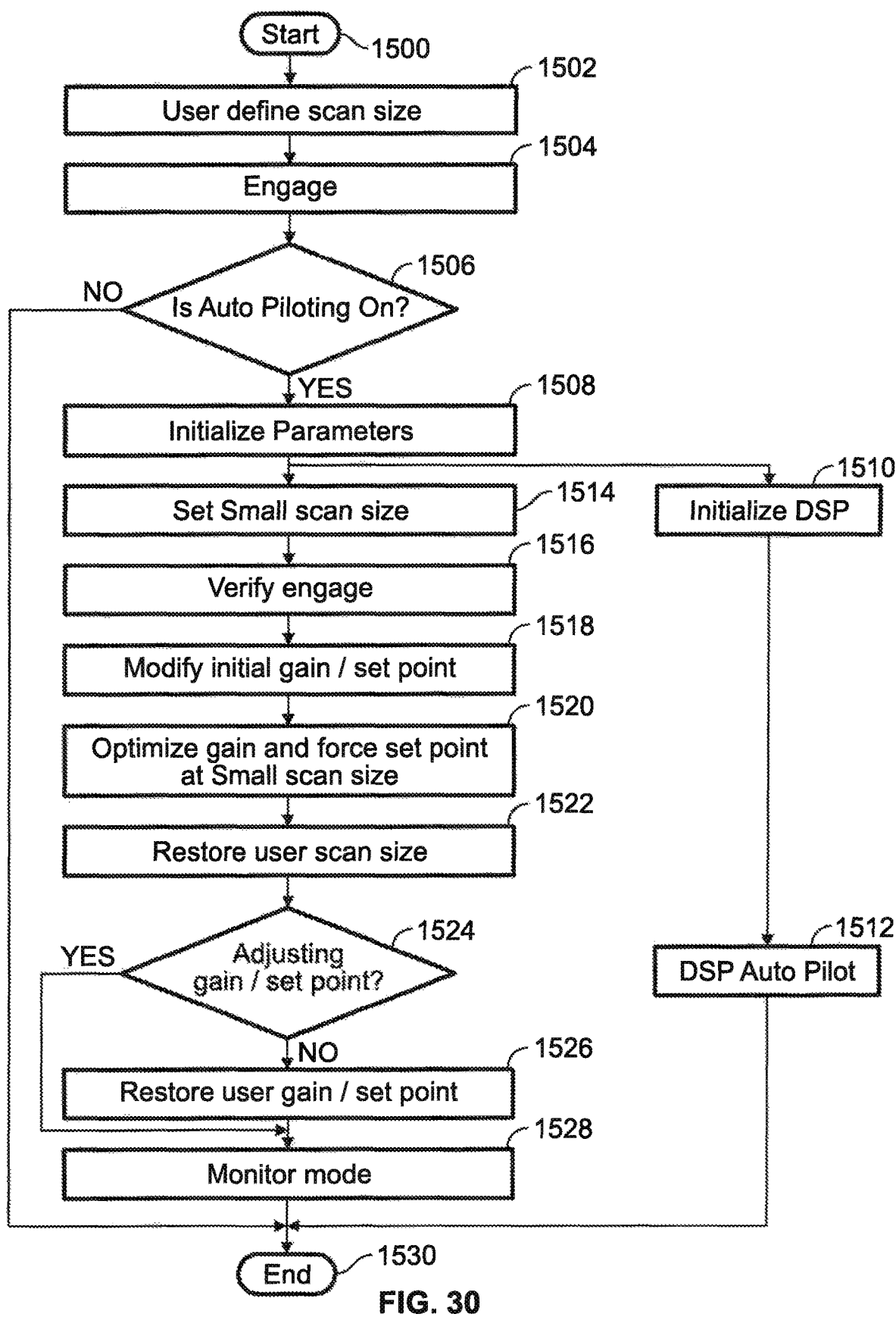
FIG. 30 is a diagram illustrating an implementation of a preferred embodiment of operating an AFM in PFT Mode.

A particular implementation of AFM operation using PFT Mode is illustrated in FIG. 30. To take advantage of PFT Mode and make the instrument user friendly, automatic gain scheduling control (herein also referred to as "auto pilot" or "auto piloting the AFM") as described above is implemented as follows. The user initiates a scan in Block 1500, and then defines a desired scan size in Block 1502. An engage routine is then initiated in Block 1504, bringing the tip and sample in to contact. The AFM system then determines whether "auto piloting" is on in Block 1506. If not, this routine is complete (Block 1530) and the AFM operates using operator controlled feedback without auto gain control (some expert users may prefer to monitor their measurement and make manual gain and setpoint adjustments). If auto piloting is on, operational parameters are initialized in Block 1508 through factory defined default values, as is the DSP in Block 1510. Block 1512 indicates that auto pilot function is implemented in the DSP.

Once the parameters are initialized, scan size is set to a small value in Block 1514. A small scan (10 nm, for example) is performed at low gain to determine an initial peak force setpoint and gain to provide a setpoint reference. For all AFM imaging, minimizing the peak tip-sample interaction force generally leads to improved tip life and sample integrity. The system can determine the minimum set-point based on the knowledge of the base noise in the system. For example, if the force detection noise, when the tip is not interacting with the sample, is 100 pN, the setpoint may be set at 300 pN, allowing enough S/N range for system control. In Block 1516, the engage is verified, and in Block 1518, the system modifies the initial gain and setpoint in an attempt to optimize the same. The optimization is an iterative process including:

1. Determining system background noise by lifting the tip so that there is no interaction;
2. Determining a setpoint, usually 3 times higher than the peak force noise background determined in Step 1; and
3. Increasing the gain (iteratively, in predetermined steps, for example) until the noise is about equal to the noise tolerance margin.

Once the gain and force set-point are determined at small scan size in Block 1520, the system restores the user-input scan size in Block 1522 and begins AFM operation to acquire sample data.

In Block 1524, the system determines whether the algorithm is adjusting the gain or setpoint. If either gain or set-point is not being adjusted by the algorithm, the default gain/set-point value is restored in Block 1526. The system then enters a monitoring loop (Monitoring Mode) in Block 1528. Monitoring Mode determines whether oscillation exceeds the threshold. If so, gain can be adjusted (decreased). If not, gain can be increased for better tracking. Monitoring Mode also operates to detect a parachuting event. If a parachuting event is detected as described above, the setpoint may be increased for optimal performance. Setpoint increase is implemented, preferably, by 5% increments each time (and optionally verifying steps 1-3 outlined above). The above continues until the scan of the user-defined sample scan size is complete.

In sum, the above-described feedback control is able to maintain a substantially identical peak interaction force in each modulation period of probe oscillation/tip-sample interaction. The method automatically determines a setpoint associated with the peak interaction force based on noise background, and automatically determines feedback gain according to an oscillation magnitude of the instability. By doing so, the AFM can be used by a novice without making system adjustments during data acquisition.

Figure 32A:
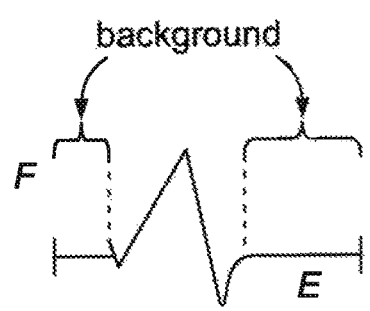
FIG. 32A is a schematic graph of tip-sample interaction force when scan rate can is substantially optimized.
Figure 32B:
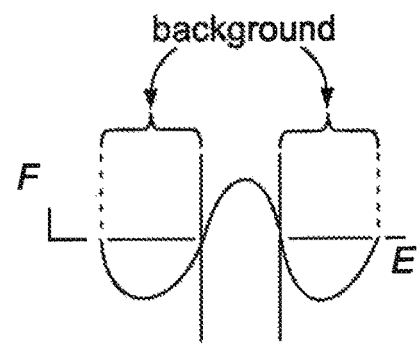
FIG. 32B is a schematic graph of tip-sample interaction force when scan rate is not substantially optimized.
Figure 31:
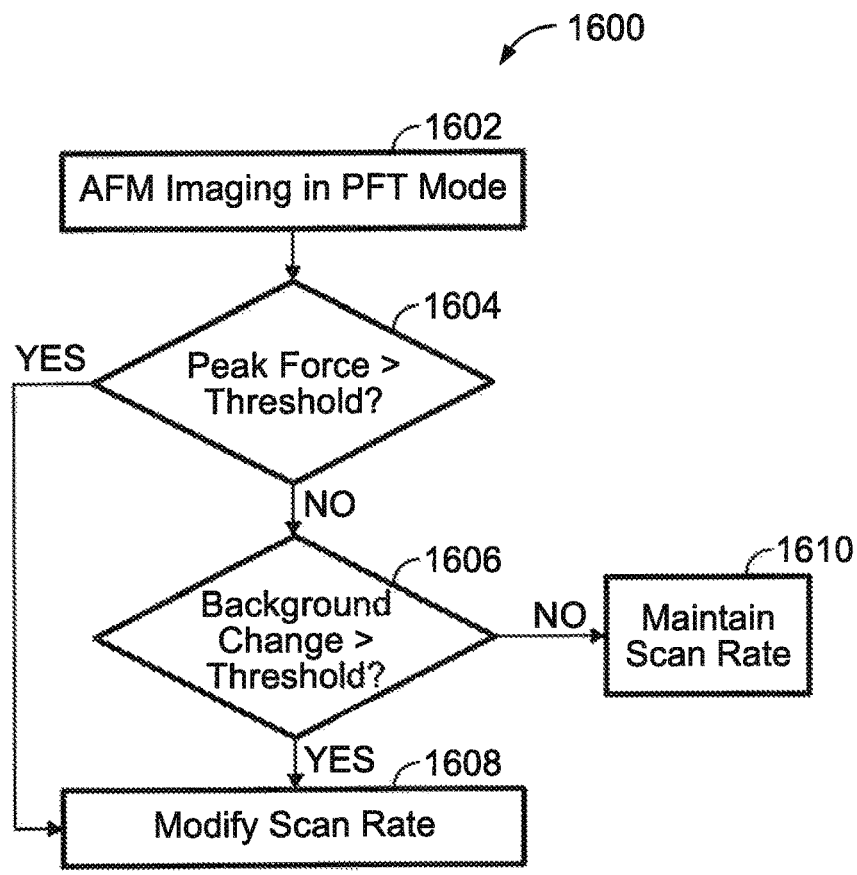
FIG. 31 is a flow diagram of a scan rate control algorithm for use in PFT Mode.

The scan rate may also be automatically adjusted for optimization using PFT Mode. Turning to FIG. 31, a flow chart of a scan control algorithm 1600 is shown. In this case, the AFM is operating in PFT mode in Block 1602, which includes continuous monitoring of the peak force in each cycle of tip-sample interaction. In Block 1604, method 1600 determines whether that peak force is greater than a preset threshold. For example, the threshold may correspond to a measurement greater than 8 volts. If so, a scan rate adjustment signal is transmitted to the scanner to slow the scan an appropriate amount in Block 1608. If not, then the method determines whether the background change is greater than a particular threshold (for example, 0.25 volts) in Block 1606. If so, scan rate is reduced in Block 1608. If not, the current scan rate is maintained in Block 1610. This optimal scan rate control can be optimized at every pixel when operating in PFT Mode. PFT Mode thus strikes the ideal balance between acquiring high quality images, and doing so in the shortest amount of acquisition time. To further explain block 1606, as an example, referring to FIGS. 32A and 32B, FIG. 32A illustrates flat background regions on either side of a cycle of tip-sample interaction force. In FIG. 32B, the background is affected by changes in sample topography—the tip may be stuck in the sample due to it not being able to track the surface. In this case, this background change is identified and used to slow the scan.

Figure 33:
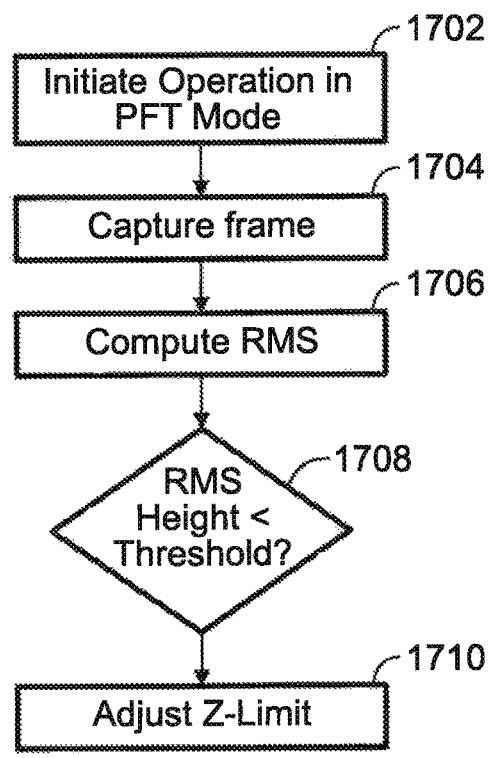
FIG. 33 is a diagram illustrating a method of Z-limit control according to a preferred embodiment.

PFT Mode also enables automatic Z limit control, further facilitating ease of use of this AFM. The Z limit parameter defines the dynamic range of the Z piezo actuator. Preferably, the probe is centered in this range. Z limit influences image resolution in Z, and is sample dependent. For example, if the sample is flat, then the noise amplitude is comparable to peak resolution, and resolution therefore should be reduced to minimize the chance that noise appears in the acquired image. Previously, this was done manually by the user by determining whether or not the sample was flat. In PFT Mode, control of the Z limit parameter is automated. In this regard, turning to FIG. 33, after method 1700 initiates operation in PFT Mode in Block 1702 (Z-limit is set to "full" [full scan range] without knowing the roughness of the sample surface), method 1700 captures one complete frame of the sample surface corresponding to the scan area defined by the user in Block 1704. The RMS height of the frame is then computed in Block 1706. If the RMS height is less than a threshold (e.g., 10 nm), as determined in Block 1708, then the Z-limit is adjusted in Block 1710. For example, for a flat sample that meets the threshold, the Z-limit may be reduced to a particular value, 2 microns for instance, and the frame re-scanned. This may be done iteratively until the user is satisfied with the image and moves on. Preferably, the adjusted Z-limit is maintained until the user changes the scan area.

Figure 34:
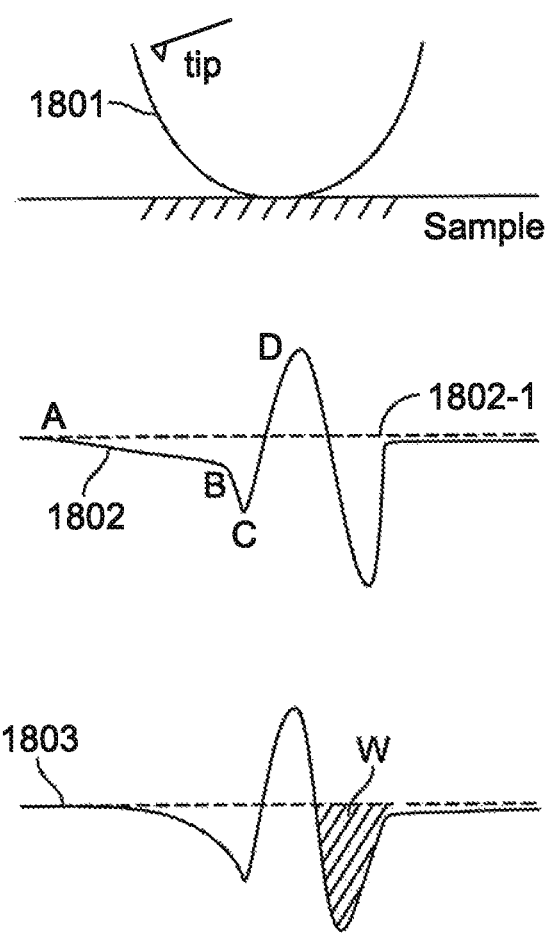
FIG. 34 is a tip-sample interaction force diagram illustrating tip radius monitoring using the techniques of the preferred embodiments.
Figure 37A:
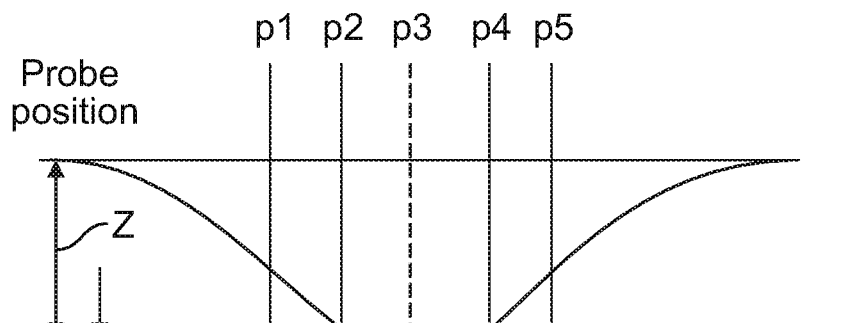
FIGS. 37A-37D illustrate a series of plots similar to FIGS. 35A-35D, using an alternative gated region.
Figure 37B:
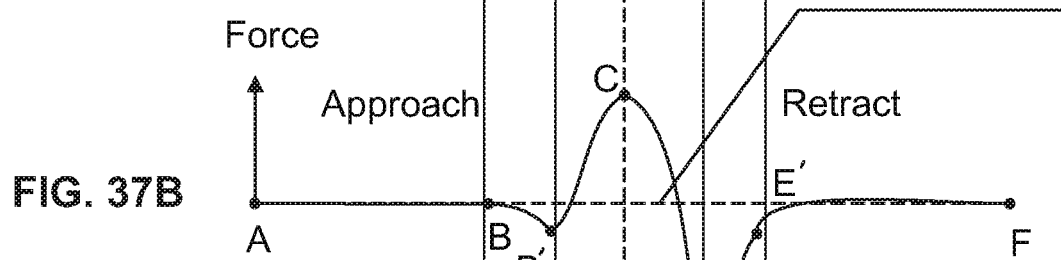
Figure 37C:
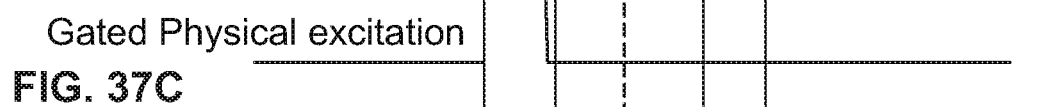
Figure 37D:

In addition to automation, PFT Mode is useful for maximizing the ability to insure quality imaging and obtain mechanical property measurements of the sample, at every scan location (e.g., pixel) of the sample. For instance, PFT Mode can be used to perform tip radius monitoring. One major setback to obtaining high quality images is the difficulty of the user to detect when the sharp probe tip has been compromised. The tip may be compromised by being contaminated (imaging in fluid, imaging an oily sample, etc.), or the physical structure may be compromised during imaging, due to wear (dull tip), for example. A compromised tip can be identified by reviewing a force curve obtained at a sample location. FIG. 34 illustrates the portion of the force curve indicative of tip health. In FIG. 34, schematic graph 1801 represents tip trajectory. This trajectory can be part of a sinusoidal signal and an arbitrary shape defined using the scanner control signal. At positions close to the sample, van der Waals attraction force is plotted as segment A-B in schematic graph 1802 where 1802-1 represents the non-interacting zero force baseline. The slope of this segment is determined using tip radius. A larger tip radius will cause point A to move left, corresponding to an earlier onset of van der Waals force. By analyzing segment A-B, one can estimate tip radius and make a judgment regarding whether the tip is still sharp. In particular, the slope of region A-B provides an indication of a tip artifact (the dashed line schematically illustrating the response when an artifact is present). Because in PFT Mode one or more force curves are generated at each and every pixel, tip force monitoring can occur substantially instantaneously with the scan. Therefore, rather than interrupting imaging and obtaining a test force curve to try to identify whether the tip is compromised, the AFM operating in PFT Mode is able to identify such a condition automatically at every scan location (every few hundred microseconds, for instance). If identified, the scan can be discontinued and the user notified, thereby preventing acquisition of further useless data and allowing the user to replace the compromised tip.

An indication of tip health is contamination. Such contamination is determined by analyzing the shaded area "w" in schematic plot 1803 in FIG. 34, which is known as the work of adhesion. Work of adhesion is higher if the tip is contaminated by water, or another substance, which may form a meniscus when the tip retracts from the surface. Larger work of adhesion represents more severe contamination. Since the force curve is acquired at each pixel, the health of the tip related to contamination can also be continuously monitored.

If the tip is functionalized through certain chemical bonds, such as Poly(ethylene glycol) (PEG) or dendron, the work of adhesion is then purposely introduced. In this case, the functionalized bonds only generate significant work of adhesion when the tip interacts with samples that exhibit particular interaction, at the molecular sites, that generates a bond, for example, to Poly(ethylene glycol) (PEG) or dendron. By monitoring this interaction, the adhesion map may become a chemical or biochemical recognition map.

One can also apply electric, optical, magnetic or thermal perturbation or excitation that is synchronized to the contact point D in schematic graph 1802 of FIG. 34. Synchronous detection of current, voltage, thermal property, magnetic response or optical spectroscopy response can achieve substantial signal to noise improvement since point D represents control at near sample interaction (or near field interaction).

Advantages—PFT Mode and Ease of Use

In sum, PFT Mode provides several operational advantages that enable AFMs to be operated by non-expert users. When considering ease of use, several imaging factors must be accounted for to minimize the need for an expert user. First, stability of the feedback must be maintained and, with the above-described automatic gain tuning/scheduling enabled by PFT Mode, stability is realized without any expert being present to manually adjust the gains. Next, to obtain quality images, the AFM must track the sample surface. By basing control on the instantaneous tip-sample interaction force, the setpoint force can be selected for optimum tracking with minimum error. Scan rate and auto Z-Limit control, as described above, also work to minimize the need for an expert when operating the AFM without compromising imaging speed or the ability to obtain high quality images.

In contrast to known oscillatory modes of AFM operation such as TappingMode™, PFT Mode operates in an entirely different dynamic regime. Oscillation mode setpoint is, typically, an amplitude or phase of the oscillation, a parameter that has a highly complex relationship with the interaction and the force between tip and sample. As discussed herein, PFT Mode considers each point of tip oscillation as the tip interacts with the sample surface and uses the corresponding force information in its feedback scheme. This allows the preferred embodiments to operate without user controlled feedback, with no user adjustments being required during imaging (auto-minimization of the error signal). PFT Mode also provides intermittent contact with the sample (and its understood benefits) with tuning (only requiring a simple pre-image routine—FIG. 30), and allows set-up without tuning. As a result, the novice can image below a certain resolution (for example, 1 nN) and above a certain speed (e.g., 1/2 Hz, 256 pixels) without having to do a tune.

Moreover, by providing a force curve at every pixel, the user is able to obtain deterministic data (e.g., adhesion) at a reasonable speed and at a certain resolution, and can do so while imaging. This is all enabled by feeding back directly on force (tip-sample), which allows responses based on a single interaction between the tip and sample (representing a linear transfer function—direct contrast to known oscillating modes).

Notably, all the above concepts can be employed in the electrical context as well (e.g., STM) whereby the instrument feeds back on current.

Also, because of the complex nature of the feedback, the data obtained in conventional oscillating modes typically requires complex indirect interpretation. PFT Mode allows direct interpretation of the data given that it is force curve based rather than tapping "envelope" based.

Another benefit of operating in PFT Mode includes the ability to image certain samples more effectively. For instance, in semiconductor applications, the inability of AFM to reliably image narrow trenches often causes users wanting to perform such measurements to select metrology instruments other than AFM. However, in PFT Mode there is no damping between the tip and sample (e.g., squeeze film damping), thus enabling confident measurement of high aspect ratio sample features.

In addition, PFT Mode is not subject to control parameter drift. For example, TappingMode™ AFM free air amplitude may change during imaging, causing change in the tip/sample force, and may result in loss of tip/sample interaction. Such drift prevents TappingMode™ AFM to perform long time stable imaging. With PFT Mode, a user can image for more than an hour (including overnight) versus less than an hour using conventional oscillating AFM modes.

Overall, in PFT Mode, there is a de-coupling of the cantilever response to environmental conditions. Imaging in vacuum (fluid) and atmosphere can be accomplished without affecting set-up thus making the instrument very easy to use. The oscillation frequency can be set independent of any cantilever resonance—greatly simplifying use in fluid. In particular, known intermittent contact modes require operation at resonance, while PFT Mode preferably operates at sub-resonance. This, again, is due to the ability to control based on ultra small instantaneous (not average) forces (about 1 µN to 1 pN). As a result, the AFM can also run feedback faster given that cantilever Q is irrelevant at subresonance (the transfer function is independent of the energy store in the cantilever at resonance). Finally, PFT Mode also allows use of cantilevers having sub 1-10 N/m spring constants, as discussed above.

Turning to FIGS. 35A-35D, a series of plots illustrating an alternative method of making physical property measurements of samples using PFT Mode of a sample is shown. In essence, the plots describe gated physical measurements that are substantially concurrent with probe-sample interaction associated with Peak Force Tapping® mode. The vertical lines p1-p5 mark the time stamp of each physical event defined in FIG. 35B, which shows the resultant probe-sample forces experienced during one period of probe-sample interaction in PFT Mode. All the data are plotted for one period of peak force interaction between the tip and sample from time "0" to the end of period T. Line p1 represents the time the probe nears tip-sample interaction, detected by deviation of the interaction force curve at the point B from its zero reference line 1. Line p2 represents the transition of the interaction force at B' where the sign of the first derivative in the force curve changes. B' can be a minimum point or any point near the first derivative transition region. Line p3 represents the peak force point C, exhibiting a local maximum, where the sign of the first force derivative changes again. Line p4 represents another first derivative sign change at the point E. Point E can be a minimum point or any point near the first derivative transition region. At point E', line p5 represents the diminishing of the near proximity interaction force when the interaction force approaches horizontal zero force line 1 (point F).

Interaction force measurement in FIG. 35B is performed by monitoring cantilever probe deflection. The probe surface positioning control in FIG. 35A is performed by an actuator moving the cantilever probe relative to the sample. The trajectory of the tip relative to sample can be sinusoidal, as shown in FIG. 35A, or any arbitrary shape to intentionally increase or decrease any time segment from p1 to p5, as understood in the art. One would want to do so, for example, to increase or decrease the duty cycle. Same modulation frequency to vary p2-p4; for thermal, increase duty cycle; for visco-elastic study, vary p2-p4 to 1% of duty cycle to 50% of duty cycle, for example. A short duty cycle for visco-elastic study allows study of time dependence of the visco-elastic effects. A long duty cycle might be preferred during p1-p2 (non-contact time) for optical measurements, and for temp measurement, increasing duty cycle p2-p4 as long as possible allows the instrument to integrate the signal for a longer time period.

The time zone between p1 and p2 is the proximity interaction zone where the tip is interacting with the sample with detectable negative force (van der Waals) attraction, for example. Other examples include electric or magnetic forces. This region represents long range interaction force, usually exhibiting negative (or attractive) force. The same proximity interaction region occurs again between p4 and p5, where the minimum interaction force includes both, van der Waals force (or electric, magnetic forces), and capillary interaction at the tip of the probe. This region also exhibits negative (attractive) force in most cases.

The time zone between lines p2 and p3 is the contact interaction region. This time is measured by identifying the interaction force that occurs between the two transition points B' and E. The contact region is usually accompanied by the rise of the interaction force to the more positive value as seen between points B' and C. At point C, the Z control starts to retract the probe, but the probe remains in contact with the sample until point E, where the tip of the probe breaks free from the contact and capillary interactions.

Turning next to FIG. 35C, a physical interaction other than mechanical force is applied between the tip and the sample. Such interaction can be a gated voltage between the tip and the sample. It can also be any other externally applied interaction field such as magnetic interactions. In FIG. 35D, a probe physical response, such as an electric current between the tip and the sample, is measured, and measured, in this case, only in the gated region between lines p2 and p4. The gated measurement is synchronized to probe position control in FIG. 35A and force detection illustrated in FIG. 35B (described above). Signals other than those in the gated region are considered parasitic noise and can be subtracted through signal processing. Such signal processing may be in the form of averaging all ineffective (e.g., no current when apply voltage, no contact—absence of physical response) physical response data outside the region between lines p1 and p5, which can be used as a background parasitic signal to be subtracted in each measurement period. A block circuit diagram illustrating this system is shown in FIG. 39.

Figure 39:
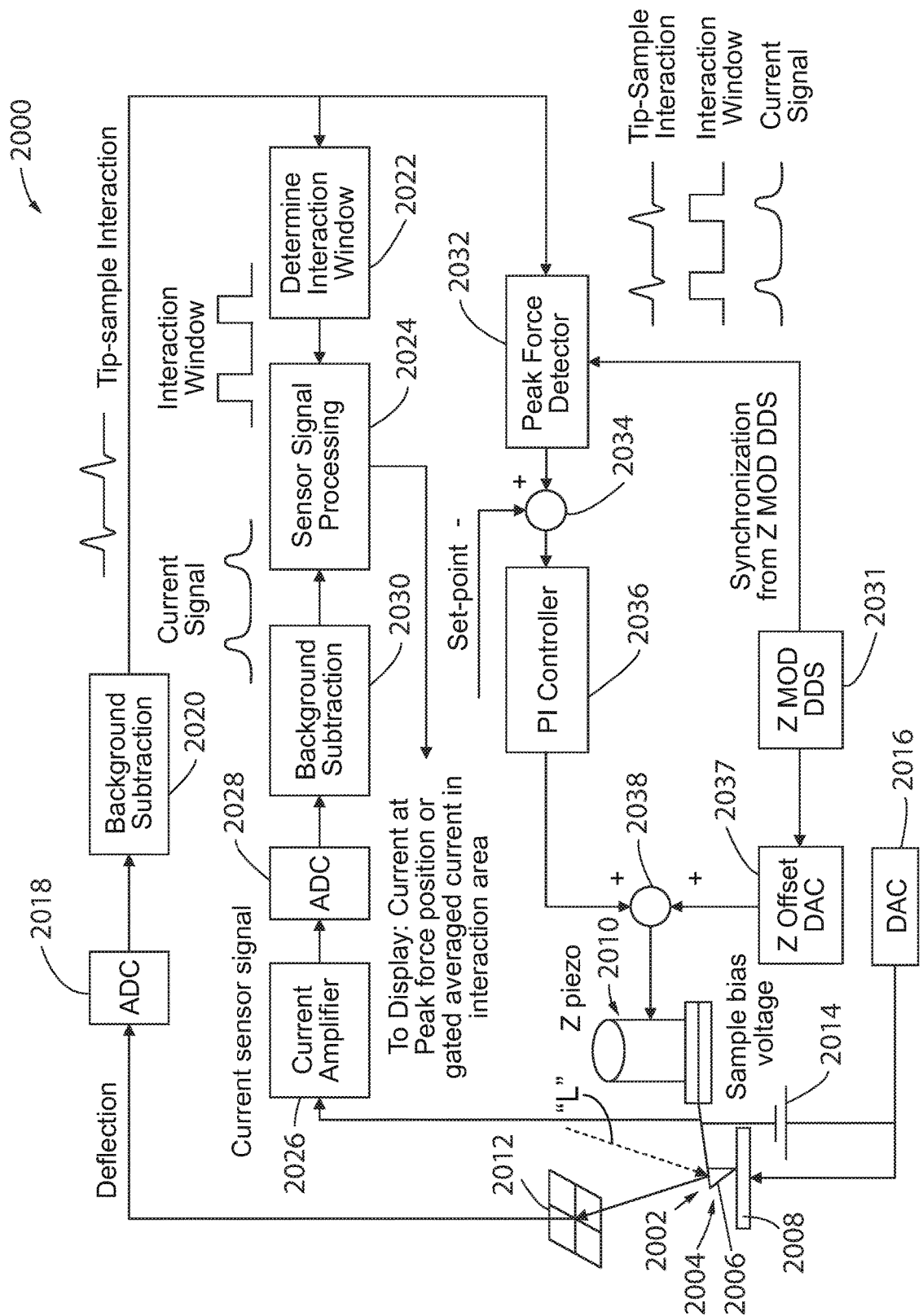
FIG. 39 is a block diagram of an SPM employing PFT Mode to measure physical properties of a sample using a bias voltage to generate a current sensor signal.

In FIG. 39, a PFT system 2000 is shown which includes a probe assembly 2002 including a probe 2004 having a tip 2006 that interacts with a sample 2008. A Z piezo actuator 2010 (tube/stack) drives the probe to oscillate in PFT Mode while a laser beam "L" (source not shown) is reflected off probe 2004 towards a detector 2012 to measure probe deflection. In this case, a bias voltage provided by a source 2014 is applied to provide a bias voltage between probe 2004 and sample 2008, governed by a DAC 2016.

In operation, a deflection signal is transmitted to an analog to digital converter (ADC) 2018 whose output is fed to a background subtraction block 2020 that operates as described previously. The resultant tip-sample interaction signal is then transmitted to a determine interaction window block 2022 which generates a signal that is input to a sensor signal processing block 2024. Processing block 2024 is also fed by a current sensor signal (due to the excitation between the probe and sample) that is amplified by block 2026 and converter to digital by ADC block 2028, with the background subtracted by block 2030. Sensor signal processing block 2024 then generates an output indicative of current at a peak force position, or a gated average current in the interaction area/window. Notably, AFM control in PFT Mode is provided by also transmitting the tip-sample interaction signal, and a synchronization signal from a Z modulation DDS block 2031, to a peak force detector block 2032. The resultant peak force signal is compared to a user-defined set-point by comparator 2034 and the output is sent to a controller 2036 (e.g., a PI controller). The synchronization signal (described above) is also transmitted to a Z offset DAC 2037 and added at block 2038 to the control signal (output of the PI controller) to provide AFM control (in this case, modulate the Z position of the probe). The resultant tip-sample interaction, interaction window and current signals are shown schematically in FIG. 39 as well.

Figure 40:
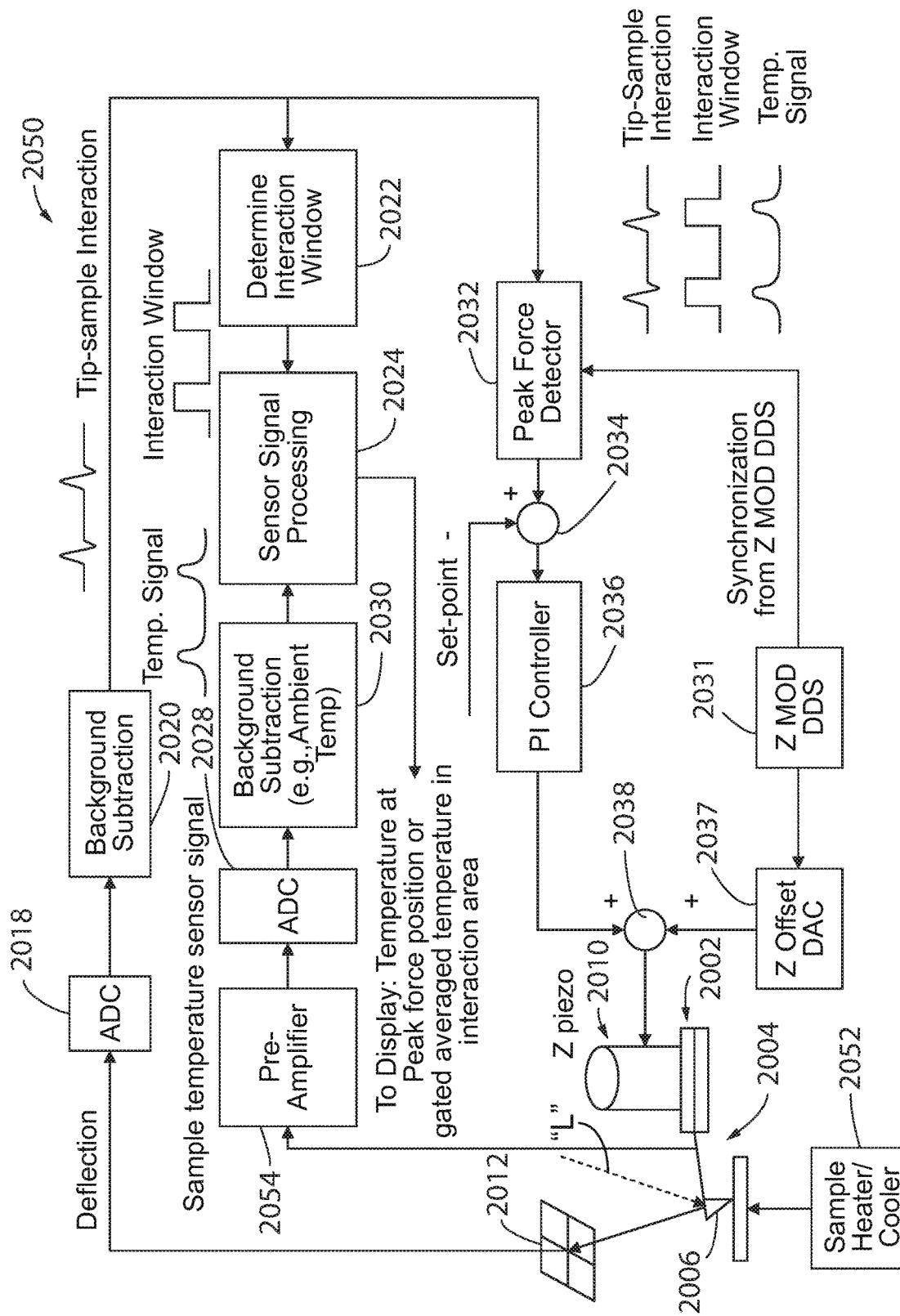
FIG. 40 is a block diagram of an SPM employing PFT Mode to measure physical properties of samples using thermal excitation.

In an alternative embodiment, the physical excitation signal can be heat applied to the sample or the probe, and the gated physical response can be the temperature change in the gated time zone between p2 and p4. The application of the heat or thermal excitation in FIG. 35C can be achieved by allowing a heating element embedded in the probe or the sample and applying a current to the same to produce a selected amount of heat, for instance, so as to perform thermal measurements. A block circuit diagram illustrating this system is shown in FIG. 40. This system 2050 is similar to the above described system 2000 (and like parts/functions are not repeated here), except the external excitation is different. Here, rather than a bias voltage between probe 2004 and sample 2008, a sample heater/cooler 2052 is provided to control the sample temperature. A pre-amplifier 2054 is provided to generate a sample temperature sensor signal that is transmitted to signal processing block 2024 after subtracting an appropriate background (in this case, corresponding circuitry for subtracting ambient temperature, for example). The desired output is temperature at peak force positions or the gated averaged temperature in the interaction area/window. The resultant tip-sample interaction, interaction window and temperature signals are shown schematically in FIG. 40 as well.

Figure 41:
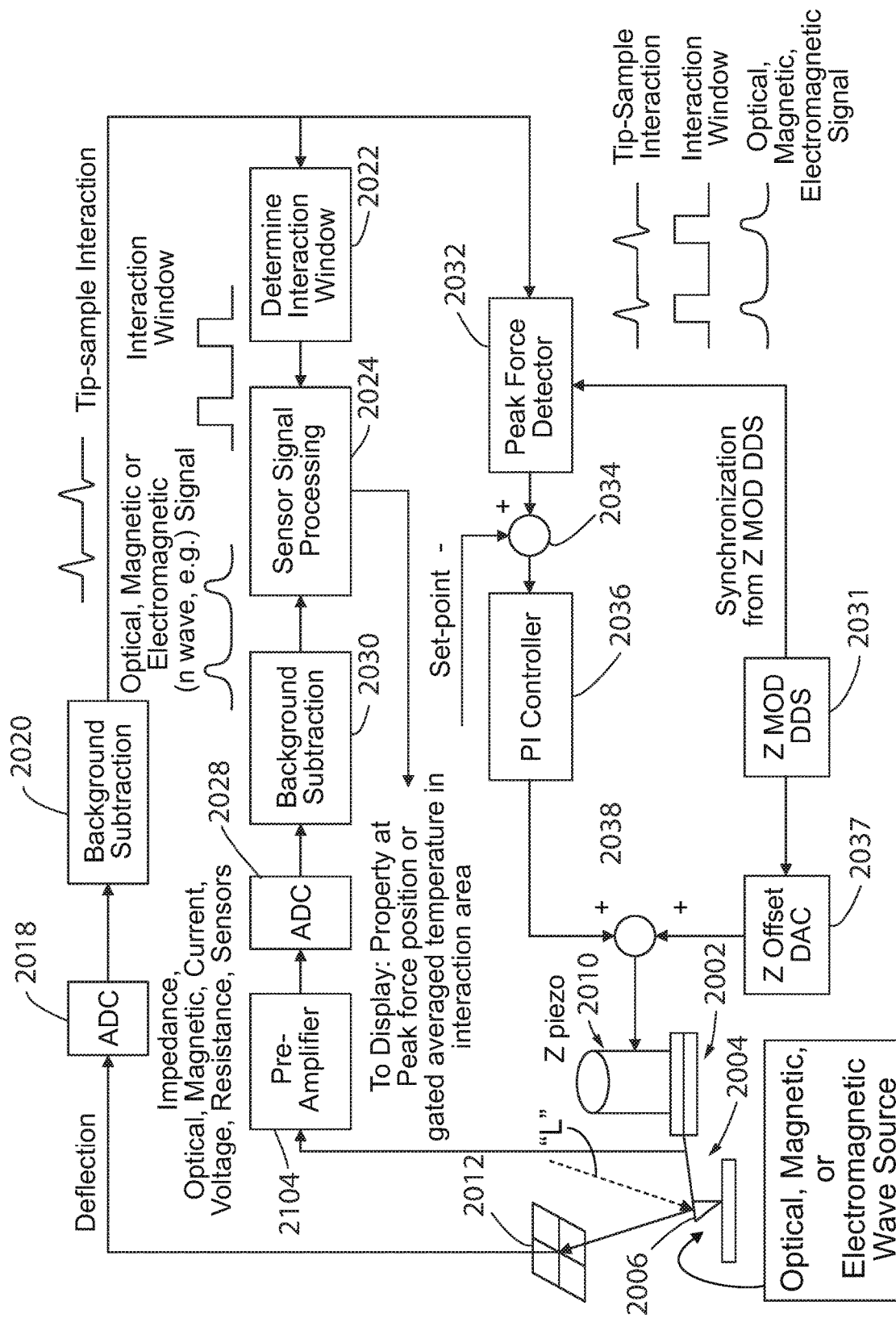
FIG. 41 is a block diagram of an SPM employing PFT Mode to measure physical properties of samples using one of optical, magnetic force, electromagnetic, or a voltage excitation source, for example.

In still further embodiments, the excitation signal in FIG. 35C can be an electromagnetic wave and the detected signal in FIG. 35D can be a change of impedance in the gated time zone between p2 and p4. The application of the electromagnetic wave, such as microwave, can be achieved by applying a wave guide to the sample or to the probe. Alternatively, the excitation signal in FIG. 35C can be optical excitation and the detected signal in FIG. 35D can be a change of optical spectroscopy response in the gated time zone between p2 and p4. In yet another embodiment, the excitation signal in FIG. 35C can be a voltage signal and the detected signal in FIG. 35D can be a change of electric resistance in the gated time zone between p2 and p4. The application of the voltage can be achieved by making a portion of the sample conductive and a portion of the probe conductive, which is electrically connected to the sample. Further, in another embodiment, the excitation signal in FIG. 35C can be a magnetic force and the detected signal in FIG. 35D can be a change of electric or magnetic response in the gated time zone between p2 and p4. The application of the magnetic force can be achieved by using a tip containing a portion of permanent magnet or induced magnet, and the change of electric measurement can be current, voltage or resistance during the time zone p2 to p4. In these alternatives, an array of sample properties may be monitored and imaged unlike any prior AFM techniques, given the added utility of PFT mode. A block circuit diagram illustrating these alternative systems using different forms of excitation is shown in FIG. 41. System 2100 is similar to systems 2000 and 2050, but in this case one or more of an optical, magnetic or electromagnetic wave source 2102 is provided. Here, impedance, optical, magnetic, current, voltage, resistance sensors provide an appropriate signal that is amplified (pre-amplifier block 2104) and an appropriate background is subtracted for signal processing at block 2024. Ultimately, in addition to AFM data provided in PFT Mode, a corresponding property at a peak force position (or a gated average thereof) is displayed. The resultant tip-sample interaction, interaction window and optical (or magnetic or electromagnetic) signals are shown schematically in FIG. 41 as well.

Notably, the best signal-to-noise ratio can typically be achieved using a gated average of the measured current. However, peak current or the average current in one-cycle can be used.

Turning to FIGS. 36A-36D, the above description corresponding to FIGS. 35A-35D is appropriate other than that of FIGS. 35C and 36C. In this case, the excitation signal remains constant while only the physical response measurement occurs in the gated time zone. For example, constant excitation could overheat or burn the sample. Therefore, only excite when needed. In FIGS. 37A-37D, the gated region is changed to the time between p1 and p2, based on the type of physical property measurement the user is making. Note that the excitation in FIG. 37C can be a constant (as in FIG. 36), rather than a gated function. In FIGS. 38A-38D, the gated response occurs in the time zone between p3 and p4. Sometimes the most interesting region to the user is before or after the contact time regions. Before contact, in the region near contact, the interesting data associated with optical, electric, and magnetic properties can be found. Mechanical property measurements are typically made in the contact region. After contact (after the second minimum, for instance), a meniscus may form, and properties such as adhesion can be determined based on the interaction.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A method of operating a scanning probe microscope (SPM) comprising:
   generating relative substantially periodic motion between a probe and a sample;
   detecting the motion of the probe;
   recovering, from the detected probe motion, a substantially instantaneous force between the probe and the sample as the probe and sample interact;
   determining a time zone of interest associated with the recovered substantially instantaneous force;
   generating a constant or gated physical excitation signal between the probe and the sample within a period of the interaction between the probe and the sample, the period including a proximate interaction zone during approach (p1-p2), a contact time (p2-p4) and a proximate interaction zone during tip retraction (p4-p5), wherein the excitation signal is at least one of heat applied to the sample or the probe, an externally applied interaction field, an electromagnetic wave, an optical excitation, a voltage signal, or a magnetic force; and
   synchronously measuring a gated physical response of the probe to the generating step, in a gated time zone of interest within said period of the interaction between the probe and the sample, wherein signals other than those in the gated time zone of interest are considered parasitic noise.

2. The method of claim 1, further comprising controlling a position of the probe based on the recovered instantaneous force.

3. The method of claim 2, wherein the SPM is operated in Peak Force Tapping (PFT) Mode.

\* \* \* \* \*